United States Patent
Fernandez et al.

(10) Patent No.: US 10,587,399 B2
(45) Date of Patent: Mar. 10, 2020

(54) DATA CONVERSION SYSTEMS AND METHODS

(71) Applicant: AgilePQ, Inc., San Diego, CA (US)

(72) Inventors: Sergio A. Fernandez, San Diego, CA (US); Bruce Conway, Williston, ND (US); Drew Conway, Williston, ND (US); David J. Gotrik, Coronado, CA (US); Ayman Ibaida, Mill Park (AU); Dhiah Al-Shammary, Lalor (AU); Alsharif Abuadbba, Victoria (AU); Mark Conway, San Diego, CA (US)

(73) Assignee: AgilePQ, Inc., South Jordan, UT (US)

( * ) Notice: Subject to any disclaimer, the term of this patent is extended or adjusted under 35 U.S.C. 154(b) by 302 days.

(21) Appl. No.: 15/614,328

(22) Filed: Jun. 5, 2017

(65) Prior Publication Data

US 2017/0353302 A1    Dec. 7, 2017

Related U.S. Application Data

(60) Provisional application No. 62/346,451, filed on Jun. 6, 2016, provisional application No. 62/354,615, filed on
(Continued)

(51) Int. Cl.
*H04L 9/06* (2006.01)
*H04L 9/16* (2006.01)
(Continued)

(52) U.S. Cl.
CPC .......... *H04L 9/0662* (2013.01); *H04L 1/0075* (2013.01); *H04L 9/065* (2013.01);
(Continued)

(58) Field of Classification Search
CPC .............................. H04L 9/0062; H04L 9/065
(Continued)

(56) References Cited

U.S. PATENT DOCUMENTS

| | | |
|---|---|---|
| 723,188 A | 3/1903 | Tesla |
| 725,605 A | 4/1903 | Tesla |

(Continued)

FOREIGN PATENT DOCUMENTS

| | | |
|---|---|---|
| EP | 1 521 414 B1 | 4/2005 |
| WO | WO-00/11845 A1 | 3/2000 |

(Continued)

OTHER PUBLICATIONS

Agrawal, Shweta et al., "On the Secrecy Rate of Interference Networks Using Structured Codes," University of Texas, Austin, May 13, 2009.

(Continued)

*Primary Examiner* — Dant B Shaifer Harriman
(74) *Attorney, Agent, or Firm* — Eversheds Sutherland (US) LLP

(57) ABSTRACT

In various embodiments, a computer-readable memory medium coupled to a processor is disclosed. The memory medium is configured to store instructions which cause the processor to retrieve a seed value, receive a digital bit stream, receive a digital bit stream, generate a stream of random bits, using the seed value as a seed to a pseudo random number generator (PRNG), wherein the stream of random bits contains at least as many bits as the digital bit stream, shuffle bits of the stream of random bits to create a random bit buffer, generate an obfuscated digital bit stream by applying a first exclusive OR (XOR) to the digital bit stream and the random bit buffer, wherein the obfuscated digital bit stream has the same number of bits as the digital bit stream, and provide the obfuscated digital bit stream to the communications interface.

17 Claims, 55 Drawing Sheets

Related U.S. Application Data on Jun. 24, 2016, provisional application No. 62/376,876, filed on Aug. 18, 2016, provisional application No. 62/401,609, filed on Sep. 29, 2016, provisional application No. 62/438,443, filed on Dec. 22, 2016.

(51) Int. Cl.

| | | |
|---|---|---|
| *H04L 1/00* | (2006.01) | |
| *H04L 9/12* | (2006.01) | |
| *H04L 9/14* | (2006.01) | |
| *G06F 21/60* | (2013.01) | |

(52) U.S. Cl.
CPC .................. *H04L 9/12* (2013.01); *H04L 9/14* (2013.01); *H04L 9/16* (2013.01); *G06F 21/602* (2013.01); *H04L 1/0061* (2013.01); *H04L 9/06* (2013.01); *H04L 2209/043* (2013.01); *H04L 2209/08* (2013.01); *H04L 2209/16* (2013.01); *H04L 2209/805* (2013.01)

(58) Field of Classification Search
USPC ......................................................... 380/28
See application file for complete search history.

(56) References Cited

U.S. PATENT DOCUMENTS

| | | | |
|---|---|---|---|
| 3,350,646 A | 10/1967 | Graziano et al. | |
| 3,699,450 A | 10/1972 | Rainal | |
| 3,917,935 A | 11/1975 | Lazecki | |
| 4,030,067 A | 6/1977 | Howell et al. | |
| 4,494,238 A | 1/1985 | Groth, Jr. | |
| 4,528,550 A | 7/1985 | Graves et al. | |
| 4,623,999 A | 11/1986 | Patterson | |
| 4,628,517 A | 12/1986 | Schwarz et al. | |
| 4,630,288 A | 12/1986 | Longstaff et al. | |
| 4,649,541 A | 3/1987 | Lahmeyer | |
| 4,694,455 A | 9/1987 | Koga | |
| 4,731,799 A | 3/1988 | Longstaff et al. | |
| 4,733,401 A | 3/1988 | Longstaff | |
| 4,747,103 A | 5/1988 | Iwamura et al. | |
| 4,849,975 A | 7/1989 | Patel | |
| 4,933,956 A | 6/1990 | Forney, Jr. | |
| 4,958,349 A | 9/1990 | Tanner et al. | |
| 5,150,381 A | 9/1992 | Forney et al. | |
| 5,331,320 A | 7/1994 | Cideciyan et al. | |
| 5,548,819 A | 8/1996 | Robb | |
| 5,577,087 A | 11/1996 | Furuya | |
| 5,612,651 A | 3/1997 | Chethik | |
| 5,786,780 A | 7/1998 | Park | |
| 5,799,088 A | 8/1998 | Raike | |
| 5,931,966 A | 8/1999 | Carley | |
| 5,970,097 A | 10/1999 | Ishikawa et al. | |
| 6,084,969 A * | 7/2000 | Wright ................ | H04L 63/0464 |
| | | | 340/7.21 |
| 6,085,340 A | 7/2000 | Postol | |
| 6,223,320 B1 | 4/2001 | Dubey et al. | |
| 6,247,159 B1 | 6/2001 | Shih et al. | |
| 6,553,535 B1 | 4/2003 | Asada et al. | |
| 6,571,368 B1 | 5/2003 | Chen | |
| 6,731,692 B1 | 5/2004 | Bhoja | |
| 6,771,824 B1 | 8/2004 | Chiu et al. | |
| 6,788,696 B2 | 9/2004 | Allan et al. | |
| 6,925,126 B2 | 8/2005 | Lan et al. | |
| 7,000,106 B2 | 2/2006 | Carter et al. | |
| 7,095,707 B2 | 8/2006 | Rakib et al. | |
| 7,106,228 B2 | 9/2006 | Bessette et al. | |
| 7,197,094 B2 | 3/2007 | Tung | |
| 7,197,689 B2 | 3/2007 | Hekstra et al. | |
| 7,277,507 B2 | 10/2007 | Takagi | |
| 7,295,624 B2 | 11/2007 | Onggosanusi et al. | |
| 7,301,983 B1 | 11/2007 | Horne | |
| 7,376,105 B2 | 5/2008 | Asada et al. | |
| 7,400,689 B2 | 7/2008 | Matsumoto et al. | |
| 7,492,807 B1 * | 2/2009 | Buchmann .......... | G06F 13/4234 |
| | | | 375/130 |
| 7,571,316 B2 | 8/2009 | Onno et al. | |
| 7,680,670 B2 | 3/2010 | Lamblin et al. | |
| 7,895,046 B2 | 2/2011 | Andersen | |
| 7,970,215 B2 | 6/2011 | Haque et al. | |
| 7,990,891 B2 | 8/2011 | Lu et al. | |
| 8,005,460 B2 | 8/2011 | Chen et al. | |
| 8,077,534 B2 | 12/2011 | Arsovski et al. | |
| 8,149,810 B1 | 4/2012 | Narasimhan et al. | |
| 8,194,558 B2 | 6/2012 | Choi et al. | |
| 8,219,737 B2 | 7/2012 | Rofougaran | |
| 8,254,484 B2 | 8/2012 | Kim et al. | |
| 8,307,184 B1 | 11/2012 | Nissani (Nissensohn) et al. | |
| 8,320,473 B1 | 11/2012 | Conway | |
| 8,473,812 B2 | 6/2013 | Ramamoorthy et al. | |
| 8,503,559 B2 | 8/2013 | Au-Yeung et al. | |
| 8,539,318 B2 | 9/2013 | Cronie et al. | |
| 8,571,223 B2 | 10/2013 | Du et al. | |
| 8,634,450 B2 | 1/2014 | Vidal et al. | |
| 8,677,215 B2 | 3/2014 | Ramamoorthy et al. | |
| 8,718,170 B2 | 5/2014 | Nissani (Nissensohn) et al. | |
| 8,829,984 B2 | 9/2014 | Batruni | |
| 8,831,159 B2 | 9/2014 | Itkin | |
| 8,855,028 B2 | 10/2014 | Kim | |
| 8,955,069 B1 | 2/2015 | Dotan et al. | |
| 8,984,609 B1 | 3/2015 | Juels et al. | |
| 9,031,156 B2 | 5/2015 | Conway | |
| 9,078,126 B2 | 7/2015 | Yi | |
| 9,118,661 B1 | 8/2015 | Juels et al. | |
| 9,203,556 B2 | 12/2015 | Conway | |
| 9,225,171 B2 | 12/2015 | Chen et al. | |
| 9,225,717 B1 | 12/2015 | Brainard et al. | |
| 9,270,655 B1 | 2/2016 | Juels et al. | |
| 9,350,545 B1 | 5/2016 | Triandopoulos et al. | |
| 9,407,631 B1 | 8/2016 | Triandopoulos et al. | |
| 9,432,360 B1 | 8/2016 | Triandopoulos et al. | |
| 9,444,580 B2 | 9/2016 | Conway | |
| 9,454,654 B1 | 9/2016 | Triandopoulos et al. | |
| 9,455,799 B2 | 9/2016 | Conway | |
| 9,515,989 B1 | 12/2016 | Juels et al. | |
| 9,698,940 B2 | 7/2017 | Conway | |
| 9,774,349 B2 | 9/2017 | Conway | |
| 9,832,649 B1 | 11/2017 | Curran et al. | |
| 9,900,126 B2 | 2/2018 | Conway | |
| 10,056,919 B2 | 8/2018 | Conway | |
| 2001/0048683 A1 | 12/2001 | Allan et al. | |
| 2002/0110196 A1 | 8/2002 | Nguyen | |
| 2002/0191712 A1 | 12/2002 | Gaddam et al. | |
| 2003/0037232 A1 | 2/2003 | Bailiff | |
| 2003/0137438 A1 | 7/2003 | Yokose | |
| 2004/0019546 A1 | 1/2004 | Ta et al. | |
| 2004/0030734 A1 * | 2/2004 | Wells ...................... | G06F 7/588 |
| | | | 708/250 |
| 2004/0088640 A1 | 5/2004 | Lin et al. | |
| 2004/0153291 A1 * | 8/2004 | Kocarev ................. | H04L 9/001 |
| | | | 702/189 |
| 2004/0179685 A1 | 9/2004 | Soliman | |
| 2004/0203456 A1 | 10/2004 | Onggosanusi et al. | |
| 2004/0203600 A1 | 10/2004 | McCorkle | |
| 2005/0204038 A1 | 9/2005 | Medvinsky | |
| 2006/0056538 A1 | 3/2006 | Nam et al. | |
| 2006/0170571 A1 | 8/2006 | Martinian et al. | |
| 2006/0248337 A1 | 11/2006 | Koodli | |
| 2006/0291661 A1 | 12/2006 | Ramzan et al. | |
| 2007/0058808 A1 | 3/2007 | Rudolf | |
| 2007/0162236 A1 | 7/2007 | Lamblin et al. | |
| 2007/0198837 A1 | 8/2007 | Koodli | |
| 2007/0201632 A1 | 8/2007 | Ionescu | |
| 2008/0013724 A1 | 1/2008 | Shamoon et al. | |
| 2008/0071847 A1 | 3/2008 | Cho et al. | |
| 2009/0168868 A1 | 7/2009 | Jahanghir | |
| 2009/0221252 A1 | 9/2009 | Cheung et al. | |
| 2009/0285126 A1 | 11/2009 | Lu et al. | |
| 2010/0232495 A1 | 9/2010 | Citta | |
| 2010/0309793 A1 | 12/2010 | Choi et al. | |
| 2011/0289576 A1 | 11/2011 | Cheng | |
| 2011/0302478 A1 | 12/2011 | Cronie et al. | |
| 2012/0059968 A1 | 3/2012 | Rofougaran | |

(56) References Cited

U.S. PATENT DOCUMENTS

| | | |
|---|---|---|
| 2012/0201337 A1 | 8/2012 | Itkin |
| 2012/0288094 A1 | 11/2012 | Batruni |
| 2013/0003808 A1 | 1/2013 | Au-Yeung et al. |
| 2013/0282940 A1 | 10/2013 | Depta |
| 2015/0043344 A1 | 2/2015 | Conway |
| 2015/0043621 A1 | 2/2015 | Conway |
| 2015/0043668 A1 | 2/2015 | Conway |
| 2015/0043677 A1 | 2/2015 | Conway |
| 2015/0195060 A1 | 7/2015 | Conway |
| 2015/0349921 A1 | 12/2015 | Conway |
| 2016/0254877 A1 | 9/2016 | Conway |
| 2016/0380648 A1 | 12/2016 | Conway |

FOREIGN PATENT DOCUMENTS

| | | |
|---|---|---|
| WO | WO-2004/098067 A1 | 11/2004 |
| WO | WO-2006/049419 A1 | 5/2006 |
| WO | WO-2007/035148 A1 | 3/2007 |
| WO | WO-2009/132601 A1 | 11/2009 |
| WO | WO-2015/020737 A1 | 2/2015 |
| WO | WO-2016/004185 A1 | 1/2016 |

OTHER PUBLICATIONS

Alkim, et al., Post-quantum key exchange—a new hope, 2015 (32 pages).

Anonymous, "Lookup table," Wikipedia, the free encyclopedia, Jul. 9, 2015 (pp. 1-5); Retrieved from the Internet: URL:http://web.archive.org/web/20140621081859/http//en.wikipedia.org/wiki/Lookup_table [retrieved on Sep. 7, 2015].

Belfiore, Jean-Claude, et al., "Secrecy Gain: a Wiretap Lattice Code Design," Department of Communications and Electronics, TELECOM ParisTech, Paris, France, Jul. 8, 2010.

Boutros, Joseph, et al., "Good Lattice Constellations for Both Rayleigh Fading and Gaussian Channels," IEEE Transactions on Information Theory, vol. 42, No. 2, Mar. 1996 (pp. 502-518).

Brennan, Linear Diversity Combining Techniques, Proc. of the IRE, pp. 1075-1102 (Jun. 1959).

Conway, John H., et al., "A Fast Encoding Method for Lattice Codes and Quantizers," IEEE Transactions on Information Theory, vol. IT-29, No. 6, Nov. 1983 (pp. 820-824).

Cooper, et al., Modern Communications and Spread Spectrum, McGraw-Hill, pp. 268-411 (1986).

Currie, R., Developments in Car Hacking, Sans Institute, InfoSec Reading Room, Accepted Dec. 5, 2015 (33 pages).

Forney, D. David Jr., "Coset Codes—Part I: Introduction and Geometrical Classification." IEEE Transactions on Information Theory, vol. 34, No. 5, Sep. 1988 (pp. 1123-1151).

Goeckel, Dennis L., "Adaptive Coding for Time-Varying Channels Using Outdated Fading Estimates," IEEE Transactions on Communications, vol. 47, No. 6, Jun. 1999 (pp. 844-855).

Goldsmith, Andrea J., "Adaptive Coded Modulation for Fading Channels," IEEE Transactions on Communications, vol. 46, No. 5, May 1998 (pp. 595-602).

Goldsmith, Andrea, "Wireless Communications," Stanford University, Copyright 2005 by Cambridge University Press.

He, Xiang, et al., "Providing Secrecy with Lattice Codes," Forty-Sixth Annual Allerton Conference, Allerton House, UIUC, Illinois, USA, Sep. 23-26, 2008 (pp. 1199-1206).

He, Xiang, et al., "Providing Secrecy With Structure Codes: Tools and Applications to Two-User Gaussian Channels," Jul. 30, 2009.

Inglis, Electronic Communications Handbook, McGraw-Hill, pp. 22, 1-22, 19(1988).

International Search Report & Written Opinion dated Aug. 9, 2017 in Int'l PCT Patent Appl Serial No. PCT/US2017/036002.

Khandani, A. K., et al., "Shaping of Multi-dimensional Signal Constellations Using a Lookup Table," Proc. IEEE Int. Conf. Commun. (Chicago, IL), Jun. 1992 (pp. 927-931).

Kim, Taejoon, et al., "Differential Rotation Feedback MIMO System for Temporally Correlated Channels," Global Telecommunications Conference, 2008. IEEE GLOBECOM 2008. IEEE, Nov. 30, 2008-Dec. 4, 2008.

Kurkoski, Brian M., "The E8 Lattice and Error Correction in Multi-Level Flash Memory," University of Electro-Communications, Tokyo, Japan, Feb. 16, 2011.

Lang, Gordon R., et al., "A Leech Lattice Modem," IEEE Journal on Selected Areas in Communications, vol. 7, No. 6, Aug. 1989 (pp. 968-973).

Ling, Cong, et al., "Semantically Secure Lattice Codes for the Gaussian Wiretap Channel," IEEE Transactions on Information Theory, vol. 60, No. 10, Oct. 2014 (pp. 6399-6416).

Lookup Table, Wkipedia, retrieved from http://web.archive.org/web/20140621081859/http://en.wikipedia.org/wiki/Lookup_table, Jun. 21, 2014, 5 pages.

Mansour, Mohamed F., "Efficient Huffman Decoding with Table Lookup," Acoustics, Speech and Signal Processing, 2007. ICASSP 2007. IEEE International Conference (downloaded Apr. 6, 2016).

Mondal, Bishwarup, et al., "Channel Adaptive Quantization for Limited Feedback MIMO Beamforming Systems," IEEE Transactions on Signal Processing, vol. 54, No. 12, Dec. 2006 (p. 4717-4729).

Oggier, Frederique et al., "Lattice Codes for the Wiretap Gaussian Channel: Construction and Analysis," Jan. 9, 2013.

Ostergaard, Jan et al., "Source-Channel Erasure Codes with Lattice Codebooks for Multiple Description Coding," ISIT 2006, Seattle, USA, Jul. 9-14, 2006.

PCT International Preliminary Report and Written Opinion dated Jan. 12, 2017 in Int'l Patent Appl No. PCT/US2015/038802.

PCT International Search Report and Written Opinion dated Sep. 15, 2015 in Int'l PCT Patent Application No. PCT/US2015/038802.

Rhee, Duho et al., "Adaptive Modulation and Coding on Multipath Rayleigh Fading Channels Based on Channel Prediction," Advanced Communication Technology, 2006. ICACT 2006. The 8th International Conference, vol. 1, Feb. 20-22, 2006 (pp. 195-199).

Rohde, et al., Communications Receivers, McGraw-Hill, pp. 462-471 (1988).

Schilling, et al., Spread Spectrum Goes Commercial, IEEE Spectrum, pp. 40-45 (Aug. 1990).

Tiuri, Radio Astronomy Receivers, IEEE Trans. Antennas and Propagation AP-12(7), pp. 930-938 (Dec. 1964).

University of Wyoming, Department of Mathematics, Fall 2005, Bitstreams & Digital Dreams "Error-Correcting Codes," (downloaded Apr. 6, 2016).

Viterbo, Emanuele et al., "Algebraic Number Theory and Code Design for Rayleigh Fading Channels," Publishers Inc., 2004 (pp. 5-18, 21-26, 63-71).

Viterbo, Emanuele, "Tecniche matematiche computazionali per l'analisi ed il progetto di costellazioni a reticolo," Feb. 23, 1995.

Viterbo, Emanuele, et al. "A Universal Lattice Code Decoder for Fading Channels," IEEE Transactions on Information Theory, vol. 45, No. 5, Jul. 1999 (pp. 1639-1642).

U.S. Appl. No. 14/062,535, filed Oct. 24, 2013, U.S. Pat. No. 9,444,580, Sep. 13, 2016.

U.S. Appl. No. 14/099,180, filed Dec. 6, 2013, U.S. Pat. No. 9,031,156, May 12, 2015.

U.S. Appl. No. 14/243,426, filed Apr. 2, 2014, U.S. Pat. No. 9,455,799, Sep. 27, 2016.

U.S. Appl. No. 14/243,438, filed Apr. 2, 2014.

U.S. Appl. No. 14/310,652, filed Jun. 20, 2014, U.S. Pat. No. 9,203,556, Dec. 1, 2015.

U.S. Appl. No. 14/705,626, filed May 6, 2015, U.S. Pat. No. 9,698,940, Jul. 4, 2017.

U.S. Appl. No. 14/863,075, filed Sep. 23, 2015.

U.S. Appl. No. 15/262,966, filed Sep. 12, 2016.

U.S. Appl. No. 15/322,700, filed Dec. 28, 2016.

* cited by examiner

206 →

| Bit Index | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Level 3 swaps

| 3-0 | | | | | | | | | | | | | driven by Bit 0 | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Level 2 swaps

| 2-0 | | | driven by Bit 1 | 2-1 | | | driven by Bit 2 |
|---|---|---|---|---|---|---|---|
| 0 | 1 | 2 | 3 | 4 | 5 | 6 | 7 | 8 | 9 | 10 | 11 | 12 | 13 | 14 | 15 |

Level 1 swaps

| 1-0 | Bit 3 | 1-1 | Bit 4 | 1-2 | Bit 5 | 1-3 | Bit 6 |
|---|---|---|---|---|---|---|---|
| 0 | 1 | 2 | 3 | 4 | 5 | 6 | 7 | 8 | 9 | 10 | 11 | 12 | 13 | 14 | 15 |

Level 0 swaps

| 0-0 Bit 7 | 0-1 Bit 8 | 0-2 Bit 9 | 0-3 Bit 10 | 0-4 Bit 11 | 0-5 Bit 12 | 0-6 Bit 13 | 0-7 Bit 14 |
|---|---|---|---|---|---|---|---|
| 0 | 1 | 2 | 3 | 4 | 5 | 6 | 7 | 8 | 9 | 10 | 11 | 12 | 13 | 14 | 15 |

| Descramble example | | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| | 1 | 1 | 0 | 0 | 0 | 1 | 1 | 0 | 0 | 1 | 1 | 1 | 0 | 1 | 1 | 0 | } 224
| | 0 | 1 | 1 | 0 | 0 | 1 | 1 | 0 | 1 | 1 | 1 | 0 | 1 | 0 | 0 | 0 | } 222

| Bit index | Bit | Level | Swap |
|---|---|---|---|
| 15 | 0 | - | - |
| 14 | 1 | 0 | 7 |
| 13 | 1 | 0 | 6 |
| 12 | 0 | 0 | 5 |
| 11 | 1 | 0 | 4 |
| 10 | 1 | 0 | 3 |
| 9 | 1 | 0 | 2 |
| 8 | 0 | 0 | 1 |
| 7 | 0 | 0 | 0 |
| 6 | 1 | 1 | 3 |
| 5 | 1 | 1 | 2 |
| 4 | 0 | 1 | 1 |
| 3 | 0 | 1 | 0 |
| 2 | 0 | 2 | 1 |
| 1 | 1 | 2 | 0 |
| 0 | 1 | 3 | 0 |

FIG. 9

| word1 | 16 bits | Obfuscate Input Data function configuration or subconfiguration or control command or control feedback |
|---|---|---|
| word2 | 16 bits | Obfuscate Input Data function configuration or subconfiguration or control command or control feedback |
| scramble word | 16 bits | pseudorandom draw used to coordinate obfuscation between encode and decode functions |
| checksum | 16 bits | result of a unique checksum function, used to identify identically configured and shared tables between encode and decode functions |
| quick look | 16 bits | optional value, used to rule out non-DCM encoded frames, or frames intended for another DCM equipped transmit/receive pair |
| frame length | 16 bits | optional value, used to support arbitrary frame length coding |

FIG. 10

Forward Map

| Index | | Contents | |
|---|---|---|---|
| Base 10 | Base 2 | Base 10 | Base 2 |
| 0 | 000 | 2 | 010 |
| 1 | 001 | 4 | 100 |
| 2 | 010 | 3 | 011 |
| 3 | 011 | 5 | 101 |
| 4 | 100 | 1 | 001 |
| 5 | 101 | 7 | 111 |
| 6 | 110 | 0 | 000 |
| 7 | 111 | 6 | 110 |

Encode

Reverse Map

| Index | | Contents | |
|---|---|---|---|
| Base 10 | Base 2 | Base 10 | Base 2 |
| 0 | 000 | 6 | 110 |
| 1 | 001 | 4 | 100 |
| 2 | 010 | 0 | 000 |
| 3 | 011 | 2 | 010 |
| 4 | 100 | 1 | 001 |
| 5 | 101 | 3 | 011 |
| 6 | 110 | 7 | 111 |
| 7 | 111 | 5 | 101 |

Decode

FIG. 13

Forward Map

| Index Base 2 | Contents Base 2 |
|---|---|
| 000 | 010 |
| 001 | 100 |
| 010 | 011 |
| 011 | 101 |
| 100 | 001 |
| 101 | 111 |
| 110 | 000 |
| 111 | 110 |

Indexed Sort

| Index Base 2 | Contents Base 2 |
|---|---|
| 110 | 000 |
| 100 | 001 |
| 000 | 010 |
| 010 | 011 |
| 001 | 100 |
| 011 | 101 |
| 111 | 110 |
| 101 | 111 |

Reverse Map

| Index Base 2 | Contents Base 2 |
|---|---|
| 000 | 110 |
| 001 | 100 |
| 010 | 000 |
| 011 | 010 |
| 100 | 001 |
| 101 | 011 |
| 110 | 111 |
| 111 | 101 |

FIG. 14

Forward Map

| Index | | Contents | | Encode |
|---|---|---|---|---|
| Base 10 | Base 2 | Base 10 | Base 2 | |
| 0 | 000 | 2 | 010 | |
| 1 | 001 | 4 | 100 | |
| 2 | 010 | 3 | 011 | |
| 3 | 011 | 5 | 101 | |
| 4 | 100 | 1 | 001 | |
| 5 | 101 | 7 | 111 | |
| 6 | 110 | 0 | 000 | |
| 7 | 111 | 6 | 110 | | offset value = 3, x = 4

Reverse Map

| Index | | Contents | | Decode |
|---|---|---|---|---|
| Base 10 | Base 2 | Base 10 | Base 2 | |
| 0 | 000 | 6 | 110 | |
| 1 | 001 | 4 | 100 | |
| 2 | 010 | 0 | 000 | |
| 3 | 011 | 2 | 010 | |
| 4 | 100 | 1 | 001 | |
| 5 | 101 | 3 | 011 | |
| 6 | 110 | 7 | 111 | |
| 7 | 111 | 5 | 101 | |

FIG. 15

FIG. 16A random draw 29

| message | h | | e | | l | | l | | o | | | |
|---|---|---|---|---|---|---|---|---|---|---|---|---|
| ascii encode | 0 1 1 0 1 0 0 0 | 0 1 1 0 0 1 0 1 | 0 1 1 0 1 1 0 0 | 0 1 1 0 1 1 0 0 | 0 1 1 0 1 1 1 1 |
| x=base10 value | 3 | 2 | 0 | 6 | 2 | 5 | 5 | 4 | 3 | 3 | 0 | 6 | 7 | 4 |
| index | 0 | 1 | 2 | 3 | 4 | 5 | 6 | 7 | 8 | 9 | 10 | 11 | 12 | 13 |
| offset | 0 | 5 | 2 | 7 | 4 | 1 | 6 | 3 | 0 | 5 | 2 | 7 | 4 | 1 |
| (x+offset)%8 | 3 | 7 | 2 | 5 | 6 | 6 | 3 | 7 | 3 | 0 | 2 | 5 | 3 | 5 |
| encode | 5 | 6 | 3 | 7 | 0 | 0 | 5 | 6 | 5 | 2 | 3 | 7 | 5 | 7 |

FIG. 16B

| encode table | | | decode table | |
|---|---|---|---|---|
| 0 | 2 | | 0 | 6 |
| 1 | 4 | | 1 | 4 |
| 2 | 3 | | 2 | 0 |
| 3 | 5 | | 3 | 2 |
| 4 | 1 | | 4 | 1 |
| 5 | 7 | | 5 | 3 |
| 6 | 0 | | 6 | 7 |
| 7 | 6 | | 7 | 5 | random draw 29

| encoded msg | 5 | 6 | 3 | 7 | 0 | 0 | 5 | 6 | 5 | 2 | 3 | 7 | 5 | 7 |
|---|---|---|---|---|---|---|---|---|---|---|---|---|---|---|
| decode | 3 | 7 | 2 | 5 | 6 | 6 | 3 | 7 | 3 | 0 | 2 | 5 | 3 | 5 |
| index | 0 | 1 | 2 | 3 | 4 | 5 | 6 | 7 | 8 | 9 | 10 | 11 | 12 | 13 |
| offset | 0 | 5 | 2 | 7 | 4 | 1 | 6 | 3 | 0 | 5 | 2 | 7 | 4 | 1 |
| x=base10 value | 3 | 2 | 0 | 6 | 2 | 5 | 5 | 4 | 3 | 3 | 0 | 6 | 7 | 4 |
| ascii encode | 0 1 1 0 1 0 0 0 | 0 1 1 0 0 1 0 1 | 0 1 1 0 1 1 0 0 | 0 1 1 0 1 1 0 0 | 0 1 1 0 1 1 1 1 |
| ascii | h | | e | | l | | l | | o | | | |

FIG. 16C random draw 29

| ascii encode | 0 0 0 0 0 0 0 0 | 0 0 0 0 0 0 0 0 | 0 0 0 0 0 0 0 0 | 0 0 0 0 0 0 0 0 | 0 0 0 0 0 0 0 0 |
|---|---|---|---|---|---|
| x=base10 value | 0 | 0 | 0 | 0 | 0 | 0 | 0 | 0 | 0 | 0 | 0 | 0 | 0 | 0 |
| index | 0 | 1 | 2 | 3 | 4 | 5 | 6 | 7 | 8 | 9 | 10 | 11 | 12 | 13 |
| offset | 0 | 5 | 2 | 7 | 4 | 1 | 6 | 3 | 0 | 5 | 2 | 7 | 4 | 1 |
| (x+offset)%8 | 0 | 5 | 2 | 7 | 4 | 1 | 6 | 3 | 0 | 5 | 2 | 7 | 4 | 1 |
| encode | 2 | 7 | 3 | 6 | 1 | 4 | 0 | 5 | 2 | 7 | 3 | 6 | 1 | 4 |

FIG. 16D random draw 19

| ascii encode | 0 0 0 0 0 0 0 0 | 0 0 0 0 0 0 0 0 | 0 0 0 0 0 0 0 0 | 0 0 0 0 0 0 0 0 | 0 0 0 0 0 0 0 0 |
|---|---|---|---|---|---|
| x=base10 value | 0 | 0 | 0 | 0 | 0 | 0 | 0 | 0 | 0 | 0 | 0 | 0 | 0 | 0 |
| index | 0 | 1 | 2 | 3 | 4 | 5 | 6 | 7 | 8 | 9 | 10 | 11 | 12 | 13 |
| offset | 0 | 3 | 6 | 1 | 4 | 7 | 2 | 5 | 0 | 3 | 6 | 1 | 4 | 7 |
| (x+offset)%8 | 0 | 3 | 6 | 1 | 4 | 7 | 2 | 5 | 0 | 3 | 6 | 1 | 4 | 7 |
| encode | 2 | 5 | 0 | 4 | 1 | 6 | 3 | 7 | 2 | 5 | 0 | 4 | 1 | 6 |

| message | b | | | | y | | | | e | | | |
|---|---|---|---|---|---|---|---|---|---|---|---|---|
| ascii encode | 0 1 | 1 0 | 0 0 | 1 0 | 0 1 | 1 1 | 0 1 | 0 1 | 0 1 | 1 0 | 0 1 | 0 1 |
| input in base 10 | 1 | 2 | 0 | 2 | 1 | 3 | 1 | 1 | 1 | 2 | 1 | 1 |
| x (external data) | 3 | 8 | 2 | 5 | 1 | 7 | 3 | 4 | 1 | 0 | 6 | 5 |
| x%2 | 1 | 0 | 0 | 1 | 1 | 1 | 1 | 0 | 1 | 0 | 0 | 1 |
| index = (2*input+(x%2)) | 3 | 4 | 0 | 5 | 3 | 7 | 3 | 2 | 3 | 4 | 2 | 3 |
| encode base 10 | 5 | 1 | 2 | 7 | 5 | 6 | 5 | 3 | 5 | 1 | 3 | 5 |
| encode | 1 0 1 | 0 0 1 | 0 1 0 | 1 1 1 | 1 0 1 | 1 1 0 | 1 0 1 | 0 1 1 | 1 0 1 | 0 0 1 | 0 1 1 | 1 0 1 |

FIG. 17B

| encode table | | decode table | |
|---|---|---|---|
| 0 | 2 | 0 | 3 |
| 1 | 4 | 1 | 2 |
| 2 | 3 | 2 | 0 |
| 3 | 5 | 3 | 1 |
| 4 | 1 | 4 | 0 |
| 5 | 7 | 5 | 1 |
| 6 | 0 | 6 | 3 |
| 7 | 6 | 7 | 2 |

FIG. 17C

| encoded message | 1 0 1 | 0 0 1 | 0 1 0 | 1 1 1 | 1 0 1 | 1 1 0 | 1 0 1 | 0 1 1 | 1 0 1 | 0 0 1 | 0 1 1 | 1 0 1 |
|---|---|---|---|---|---|---|---|---|---|---|---|---|
| enc msg base 10 | 5 | 1 | 2 | 7 | 5 | 6 | 5 | 3 | 5 | 1 | 3 | 5 |
| decode | 1 | 2 | 0 | 2 | 1 | 3 | 1 | 1 | 1 | 2 | 1 | 1 |
| | 0 1 | 1 0 | 0 0 | 1 0 | 0 1 | 1 1 | 0 1 | 0 1 | 0 1 | 1 0 | 0 1 | 0 1 |
| | b | | | | y | | | | e | | | |

FIG. 18

Case 1

Forward Map

| Input | Index | Contents |
|---|---|---|
| Base 2 | Base 2 | Base 2 |
| 00 | 000 | 010 |
| 00 | 001 | 100 |
| 01 | 010 | 011 |
| 01 | 011 | 101 |
| 10 | 100 | 001 |
| 10 | 101 | 111 |
| 11 | 110 | 000 |
| 11 | 111 | 110 |

Indexed Sort

| Input | Index | Contents |
|---|---|---|
| Base 2 | Base 2 | Base 2 |
| 11 | 110 | 000 |
| 10 | 100 | 001 |
| 00 | 000 | 010 |
| 01 | 010 | 011 |
| 00 | 001 | 100 |
| 10 | 101 | 111 |
| 11 | 111 | 110 |
| 10 | 101 | 111 |

Reverse Map

| Index | Contents |
|---|---|
| Base 2 | Base 2 |
| 000 | 11 |
| 001 | 10 |
| 010 | 00 |
| 011 | 01 |
| 100 | 00 |
| 101 | 10 |
| 110 | 11 |
| 111 | 10 |

Case 2

Forward Map

| Input | Index | Contents |
|---|---|---|
| Base 2 | Base 2 | Base 2 |
| 00 | 000 | 010 |
| 01 | 001 | 100 |
| 10 | 010 | 011 |
| 11 | 011 | 101 |
| 00 | 100 | 001 |
| 01 | 101 | 111 |
| 10 | 110 | 000 |
| 11 | 111 | 110 |

Indexed Sort

| Input | Index | Contents |
|---|---|---|
| Base 2 | Base 2 | Base 2 |
| 10 | 110 | 000 |
| 00 | 100 | 001 |
| 00 | 000 | 010 |
| 10 | 010 | 011 |
| 01 | 001 | 100 |
| 11 | 011 | 101 |
| 11 | 111 | 110 |
| 01 | 101 | 111 |

Reverse Map

| Index | Contents |
|---|---|
| Base 2 | Base 2 |
| 000 | 10 |
| 001 | 00 |
| 010 | 00 |
| 011 | 10 |
| 100 | 01 |
| 101 | 11 |
| 110 | 11 |
| 111 | 01 |

| 0 |  | 0 | 0 | 0 | 0 |
|---|---|---|---|---|---|
| 1 |  | 0 | 0 | 0 | 1 |
| 2 |  | 0 | 0 | 1 | 0 |
| 3 |  | 0 | 0 | 1 | 1 |
| 4 |  | 0 | 1 | 0 | 0 |
| 5 |  | 0 | 1 | 0 | 1 |
| 6 |  | 0 | 1 | 1 | 0 |
| 7 |  | 0 | 1 | 1 | 1 |
| 8 |  | 1 | 0 | 0 | 0 |
| 9 |  | 1 | 0 | 0 | 1 |
| 10 |  | 1 | 0 | 1 | 0 |
| 11 |  | 1 | 0 | 1 | 1 |
| 12 |  | 1 | 1 | 0 | 0 |
| 13 |  | 1 | 1 | 0 | 1 |
| 14 |  | 1 | 1 | 1 | 0 |
| 15 |  | 1 | 1 | 1 | 1 |

4 bit input
7 bit encode

| 0 |  | 0 | 0 | 0 | 0 | 0 | 0 |
|---|---|---|---|---|---|---|---|
| 13 |  | 0 | 0 | 0 | 1 | 1 | 0 | 1 |
| 23 |  | 0 | 0 | 1 | 0 | 1 | 1 | 1 |
| 26 |  | 0 | 0 | 1 | 1 | 0 | 1 | 0 |
| 35 |  | 0 | 1 | 0 | 0 | 0 | 1 | 1 |
| 46 |  | 0 | 1 | 0 | 1 | 1 | 1 | 0 |
| 52 |  | 0 | 1 | 1 | 0 | 1 | 0 | 0 |
| 57 |  | 0 | 1 | 1 | 1 | 0 | 0 | 1 |
| 70 |  | 1 | 0 | 0 | 0 | 1 | 1 | 0 |
| 75 |  | 1 | 0 | 0 | 1 | 0 | 1 | 1 |
| 81 |  | 1 | 0 | 1 | 0 | 0 | 0 | 1 |
| 92 |  | 1 | 0 | 1 | 1 | 1 | 0 | 0 |
| 101 |  | 1 | 1 | 0 | 0 | 1 | 0 | 1 |
| 104 |  | 1 | 1 | 0 | 1 | 0 | 0 | 0 |
| 114 |  | 1 | 1 | 1 | 0 | 0 | 0 | 0 |
| 127 |  | 1 | 1 | 1 | 1 | 1 | 1 | 1 |

| 0 |  | 0 | 0 | 0 | 0 | 0 | 0 | 0 |
|---|---|---|---|---|---|---|---|---|
| 1 |  | 0 | 0 | 0 | 0 | 0 | 0 | 1 |
| 2 |  | 0 | 0 | 0 | 0 | 0 | 1 | 0 |
| 3 |  | 0 | 0 | 0 | 0 | 0 | 1 | 1 |
| 4 |  | 0 | 0 | 0 | 0 | 1 | 0 | 0 |
| 5 |  | 0 | 0 | 0 | 0 | 1 | 0 | 1 |
| 6 |  | 0 | 0 | 0 | 0 | 1 | 1 | 0 |
| 7 |  | 0 | 0 | 0 | 0 | 1 | 1 | 1 |
| 8 |  | 0 | 0 | 0 | 1 | 0 | 0 | 0 |

...

| 124 |  | 1 | 1 | 1 | 1 | 1 | 0 | 0 |
|---|---|---|---|---|---|---|---|---|
| 125 |  | 1 | 1 | 1 | 1 | 1 | 0 | 1 |
| 126 |  | 1 | 1 | 1 | 1 | 1 | 1 | 0 |
| 127 |  | 1 | 1 | 1 | 1 | 1 | 1 | 1 |

7 bit input
4 bit encode

| 0 |  | 0 | 0 | 0 | 0 |
|---|---|---|---|---|---|
| 0 |  | 0 | 0 | 0 | 0 |
| 0 |  | 0 | 0 | 0 | 0 |
| 4 |  | 0 | 1 | 0 | 0 |
| 0 |  | 0 | 0 | 0 | 0 |
| 1 |  | 0 | 0 | 0 | 1 |
| 8 |  | 1 | 0 | 0 | 0 |
| 2 |  | 0 | 0 | 1 | 0 |
| 0 |  | 0 | 0 | 0 | 0 |

...

| 11 |  | 1 | 0 | 1 | 1 |
|---|---|---|---|---|---|
| 15 |  | 1 | 1 | 1 | 1 |
| 15 |  | 1 | 1 | 1 | 1 |
| 15 |  | 1 | 1 | 1 | 1 |

| Initial load | 1 | 2 | 3 | 4 | | | | | |
|---|---|---|---|---|---|---|---|---|---|
| | DEEA | 1AA1 | BAC1 | DBC5 | | | | | |

| PRNG draw | 1 | 2 | 3 | 4 | 5 | 6 | 7 | 8 | 9 | 10 |
|---|---|---|---|---|---|---|---|---|---|---|
| | A019 | BC76 | 039A | 9823 | 2299 | 6532 | 5773 | 33FC | 8382 | 0934 |

| 1 | XOR(1) = PRNG_draw xor Hist_Buff(1) = A019 xor DEEA | 7EF3 |
|---|---|---|
| Service Hist_Buff 1AA1 BAC1 DBC5 7EF3 | | |
| 2 | XOR(2) = PRNG_draw xor Hist_Buff(1) = BC76 xor 1AA1 | A6D7 |
| Service Hist_Buff BAC1 DBC5 7EF3 A6D7 | | |
| 3 | XOR(3) = PRNG_draw xor Hist_Buff(1) = 039A xor BAC1 | B95B |
| Service Hist_Buff DBC5 7EF3 A6D7 B95B | | |
| 4 | XOR(4) = PRNG_draw xor Hist_Buff(1) = 9823 xor DBC5 | 43E6 |
| Service Hist_Buff 7EF3 A6D7 B95B 43E6 | | |
| 5 | XOR(5) = PRNG_draw xor Hist_Buff(1) = 2299 xor 7EF3 | 5C6A |
| Service Hist_Buff A6D7 B95B 43E6 5C6A | | |
| 6 | XOR(6) = PRNG_draw xor Hist_Buff(1) = 6532 xor A6D7 | C3E5 |
| Service Hist_Buff B95B 43E6 5C6A C3E5 | | |
| 7 | XOR(7) = PRNG_draw xor Hist_Buff(1) = 5773 xor B95B | EE28 |
| Service Hist_Buff 43E6 5C6A C3E5 EE28 | | |
| 8 | XOR(8) = PRNG_draw xor Hist_Buff(1) = 33FC xor 43E6 | 701A |
| Service Hist_Buff 5C6A C3E5 EE28 701A | | |
| 9 | XOR(9) = PRNG_draw xor Hist_Buff(1) = 8382 xor 5C6A | DFE8 |
| Service Hist_Buff C3E5 EE28 701A DFE8 | | |
| 10 | XOR(10) = PRNG_draw xor Hist_Buff(1) = 0934 xor C3E5 | CAD1 |
| Service Hist_Buff EE28 701A DFE8 CAD1 | | |

Forward Map

| Index | Contents |
|---|---|
| 00 | 01 |
| 01 | 11 |
| 10 | 00 |
| 11 | 10 |

Reverse Map

| Index | Contents |
|---|---|
| 00 | 10 |
| 01 | 00 |
| 10 | 11 |
| 11 | 01 |

Prefix Forward Map

| Index | Contents |
|---|---|
| 00 | 11 |
| 01 | 00 |
| 10 | 01 |
| 11 | 10 |

Prefix Reverse Map

| Index | Contents |
|---|---|
| 00 | 01 |
| 01 | 10 |
| 10 | 11 |
| 11 | 00 |

Convolved Forward Map

| Index | Contents |
|---|---|
| 00 | 00 |
| 01 | 10 |
| 10 | 11 |
| 11 | 01 |

Convolved Reverse Map

| Index | Contents |
|---|---|
| 00 | 00 |
| 01 | 11 |
| 10 | 01 |
| 11 | 10 |

FIG. 26

| Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| Fwd | 10 | 3 | 8 | 5 | 1 | 7 | 0 | 6 | 12 | 9 | 11 | 4 | 2 | 18 | 14 | 15 | 13 | 25 | 16 | 17 | 19 | 20 | 23 | 26 | 24 | 21 | 22 |
| Rev | 6 | 4 | 12 | 1 | 11 | 3 | 7 | 5 | 2 | 9 | 0 | 10 | 8 | 16 | 14 | 15 | 18 | 19 | 13 | 20 | 21 | 25 | 26 | 22 | 24 | 17 | 23 |

FIG. 29

| Index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 25 |
|---|---|---|---|---|---|---|---|---|---|---|---|---|---|---|---|---|---|---|---|---|---|---|---|---|---|---|---|
| Fwd | 10 | 3 | 8 | 5 | 1 | 7 | 0 | 6 | 12 | 9 | 11 | 4 | 2 | 18 | 14 | 15 | 13 | 25 | 16 | 17 | 19 | 20 | 23 | 26 | 24 | 21 | 22 |
| Rev | 6 | 4 | 12 | 1 | 11 | 3 | 7 | 5 | 2 | 9 | 0 | 10 | 8 | 16 | 14 | 15 | 18 | 19 | 13 | 20 | 21 | 25 | 26 | 22 | 24 | 17 | 23 |

| Pref Fwd | 8 | 1 | 0 | 5 | 3 | 2 | 19 | 6 | 9 | 0 | 12 | 4 | 14 | 7 | 11 | 10 | 26 | 13 | 25 | 20 | 22 | 17 | 23 | 18 | 21 | 15 | 16 | 24 |
| Pref Rev | 2 | 1 | 5 | 4 | 10 | 3 | 7 | 12 | 0 | 8 | 14 | 13 | 9 | 16 | 11 | 24 | 25 | 20 | 22 | 6 | 19 | 23 | 18 | 21 | 26 | 17 | 15 |

| Conv Fwd | 4 | 5 | 9 | 2 | 1 | 6 | 8 | 19 | 7 | 12 | 14 | 3 | 0 | 22 | 10 | 26 | 11 | 16 | 13 | 25 | 20 | 17 | 21 | 24 | 15 | 23 | 18 |
| Conv Rev | 12 | 4 | 3 | 11 | 0 | 1 | 5 | 8 | 6 | 2 | 14 | 16 | 9 | 18 | 10 | 24 | 17 | 21 | 26 | 7 | 20 | 22 | 13 | 25 | 23 | 19 | 15 |

DATA CONVERSION SYSTEMS AND METHODS

CROSS-REFERENCE TO RELATED APPLICATIONS

This application claims the benefit of priority of U.S. Provisional Patent Application No. 62/346,451, filed Jun. 6, 2016, U.S. Provisional Patent Application No. 62/354,615, filed Jun. 24, 2016, U.S. Provisional Patent Application No. 62/376,876, filed Aug. 18, 2016, U.S. Provisional Patent Application No. 62/401,609, filed Sep. 29, 2016, and U.S. Provisional Patent Application No. 62/438,443, filed Dec. 22, 2016, the entire contents of each of which are incorporated herein by reference.

TECHNICAL FIELD

The disclosure generally relates to the field of communication systems, particularly to a data communications system designed to obfuscate data to protect the data from cyber-attacks.

BACKGROUND

Securing data from prying eyes has been an important part of the development of the Internet. For example, hiding information such as credit cards numbers or login information transmitted across a network helps provide a sense of safety to the end user, a sense of definitiveness to the merchant, and a sense of security to the credit card processing company. Various data obfuscation techniques have been developed that help mitigate the risk of the hidden information being revealed.

In addition to needing general obfuscation techniques to secure the transfer of information, specialized techniques are needed with respect to the transfer of information between "intelligent devices." With yearly shipments of more than 10 billion micro controllers that can all exchange information locally or through the Internet, a huge variety of so called "intelligent devices" are enabled. These devices can all be accessed over the internet and the resulting network has commonly been referred to as the Internet of Things (IoT). For example, a large device that can be an IoT device would be a refrigerator that could be connected to the Internet and keep track of the items inside so that when a homeowner runs low on milk the refrigerator automatically orders more milk to the house. On the other end of the spectrum, smaller devices, like sensors to detect if a door or window has been opened as part of a homeowner's alarm system, could be connected to the Internet and alert a homeowner that a door or window has been opened. Another IoT device could be a pacemaker which could communicate with the Internet and provide feedback to a doctor on how a patient's heart is functioning and even allow the doctor to control the pacemaker's settings from a remote location.

The ability to allow for all manner of devices to be connected together also poses challenges and risks. For example, in the case of a pacemaker, authentication and security are critically important so that only authorized individuals can make modifications to the settings of the pacemaker. In addition, because smaller IoT devices tend to run on battery power and because their size often means the circuit boards must be small and therefore are not capable of storing large amounts of information, conservation of energy and compactness of the algorithms that run on the IoT devices are important. Typical IoT devices require a local low power wireless connection along with an Internet connection. For most such applications and solutions, a gateway is required to connect the sensors to the Internet via some form of local infrastructure or using a cellular connection.

Current authentication and security algorithms used for IoT devices, like advanced encryption standard (AES), require lots of processing power and therefore reduce the useful lifetime of a device. Moreover, due to the power and space requirements for implementing AES, many devices simply don't implement security and authentication functions at all. Moreover, use of AES128, for example, requires the algorithm to work in 16 byte blocks, but due to the small payload sizes in an IoT application, padding to 16 byte boundaries is wasteful. Moreover, the small size of IoT devices typically means they lack hardware instruction sets that accelerate AES implementations. Finally, implementing algorithms such as AES require many CPU cycles, which directly effects the useful battery life. What is needed is a way to permit authentication and security of IoT devices that is part of an algorithm that has a small footprint, low power usage, and strong authentication and security.

SUMMARY OF THE DISCLOSURE

The present disclosure provides systems and methods for overcoming drawbacks in the field. For example, the systems and methods disclosed provide stronger obfuscation, faster processing time, lower power consumption, and customization.

One embodiment of the present disclosure relates to a computer-readable memory medium that obfuscates an incoming digital bit stream by including a data portion and a header portion and by using at least two different obfuscation techniques. The first obfuscation technique obfuscates the incoming digital bit stream and the second obfuscation technique is used to obfuscate information in the header portion, which includes information about how the data portion was obfuscated using the first obfuscation technique.

Another embodiment of the present disclosure relates to obtaining information relating to the obfuscation techniques from a policy server.

Yet another embodiment of the present disclosure relates to padding the digital bit stream with additional bits to further obfuscate the transmission.

Yet another embodiment of the present disclosure relates to a method for transferring data between a low power IoT controller and a gateway device, the method comprising retrieving a secret from an internal memory of the lower power IoT controller, generating a table distribution key based on the secret, receiving a first encoded frame from the gateway device, wherein the first encoded frame comprises a first data table, decoding the first encoded data frame using the table distribution key and retrieve the first data table, encoding a second encoded data frame using the first data table, transmitting the second encoded data frame to the gateway device, modifying the first data table to create a second data table, receiving a third encoded data frame from the gateway device, wherein the third encoded data frame is encoded using the second data table, and attempting to decode the third encoded data frame using the second data table.

In accordance with yet another embodiment of the present disclosure, a non-transient computer-readable memory medium operatively coupled to a processor is provided. The memory medium and the processor may be components of a communications device that may further include a communications interface. The memory medium is configured to store instructions. The instructions are configured to implement the methods disclosed herein. The instructions may cause the processor to retrieve a seed value, receive a digital bit stream, receive a digital bit stream, and generate a stream of random bits using the seed value as a seed to a pseudo random number generator (PRNG). The stream of random bits may contain at least as many bits as the digital bit stream. The instructions also may cause the processor to shuffle bits of the stream of random bits to create a random bit buffer, generate an obfuscated digital bit stream, for example, by applying a first exclusive OR (XOR) to the digital bit stream and the random bit buffer. The obfuscated digital bit stream may have the same number of bits as the digital bit stream. Additionally, the instructions may cause the processor to provide the obfuscated digital bit stream to the communications interface for, for example, transmission. The stream of random bits may consist of a power of two number of bytes, for example, 2 bytes, 4 bytes, 8 bytes, 16 bytes, 32 bytes, etc. The shuffling of the bits of the stream of random bits may be done by first initializing a random bit buffer, traversing the bits in the stream of random bits and identifying which bits in stream of random bits is set. For each bit in the stream of random bits that is set, a destination bit location may be calculated and the corresponding bit in the random bit buffer is then set. The initialization of the random bit buffer may involve setting all of the bits to the same value. In accordance with some embodiments, all bits of the random bit buffer are initialized to zero. Calculating the destination bit may be accomplished using a table lookup.

In yet another embodiment, the instructions are further configured to cause the processor to receive a second digital bit stream and to generate a second obfuscated digital bit stream by performing a second XOR with the second digital bit stream and the random bit buffer. In one example, only bits of the random bit buffer not used in the first XOR are used in the second XOR. The instructions further may cause the processor provide the second obfuscated digital bit stream to the communications interface if the second obfuscated digital bit stream has the same number of bits as the second digital bit stream. If the second XOR reaches the end of the random bit buffer but not all buts of the second digital bit stream have been XORed, the instructions may further generate a second stream of random bits from the PRNG, shuffle bits of the second stream of random bits to refill the random bit buffer, and continue to generate the second obfuscated digital bit stream by applying a third XOR to the second digital bit stream and the random bit buffer. First bits of the third XOR may be the first bit of the random bit buffer and the bit after the last bit of the second digital bit stream used in the second XOR. The instructions may further be configured to cause the processor to shuffle the bits of the stream of random bits using a lookup table to identify which bits to swap, generate a shuffled lookup table by swapping a plurality of values in the lookup table based on a plurality of bits in the stream of random bits, and shuffle the bits of the second stream of random bits using the shuffled lookup table to identify which bits to swap. In some embodiments, generating the shuffled lookup table is caused by swapping a prime number of values, for example 17, in the lookup table. In other embodiments, when swapping the values in the table, the last swapped entry of the table is maintained so that when the table is next shuffled the swaps will begin with the next entry in the table.

In accordance with further embodiments of the present disclosure, further methods, non-transient computer-readable memory mediums, and communications devices are provided. A communication device may include a communications interface, a processor, and the non-transient computer-readable memory medium operatively coupled to the processor. The memory medium may store instructions configured to cause the processor generate a random number, receive a digital bit stream, calculate a cyclic redundancy check (CRC) value using at least the digital bit stream, and generate a stream of random bits using the random number as the seed to a PRNG. The stream of random bits may contain the same number of bits as the combined number of bits in the digital bit stream and the CRC value. The instructions may further cause the processor to generate a payload frame by concatenating (1) the random number, and (2) an exclusive OR (XOR) of the stream of random bits with the concatenation of the digital bit stream and the CRC value, shuffle the bits of the payload frame to create an obfuscated payload frame, and provide the obfuscated payload frame to the communications interface. The random number may also be used in the calculation of the CRC value. The random number may be a true random number. The shuffling of the bits of the stream of random bits may be done by first initializing a random bit buffer, traversing the bits in the stream of random bits and identifying which bits in stream of random bits is set. For each bit in the stream of random bits that is set, a destination bit location may be calculated and the corresponding bit in the random bit buffer is then set. The initialization of the random bit buffer may involve setting all of the bits to the same value. In accordance with some embodiments, all bits of the random bit buffer are initialized to zero. Calculating the destination bit may be accomplished using a table lookup.

BRIEF DESCRIPTION OF THE DRAWINGS

FIG. 7 illustrates a bit swapping algorithm for header data, applicable by a data conversion module for a sender.

FIG. 8 illustrates a bit swapping example, applying the algorithm of FIG. 7 to header data by a data conversion module for a sender.

FIG. 9 illustrates a descrambling of a bit swapping, applicable by a data conversion module of a receiver.

FIG. 10 illustrates an example structure of the header information that may be provided by a header data manager to a header obfuscation module.

FIG. 13 illustrates a forward mapping and a reverse mapping function that may be used for input data obfuscation.

FIG. 14 illustrates the creation of a reverse mapping based on a chosen forward mapping via an indexed sort.

FIG. 15 illustrates a forward mapping and a reverse mapping function for a data-driven mapping function that uses data sampled from a single frame with a portion of the input data.

FIG. 16A illustrates an encoding of an input data example based on the data-driven mapping shown in FIG. 15, using a variable offset.

FIG. 16B illustrates an encode table and decode table for the encoding shown in FIG. 16A.

FIG. 16C illustrates a decoding of the input data example of FIG. 16A using the decode table of FIG. 16B.

FIG. 16D illustrates an encoding of an input data example based on a first randomly generated value.

FIG. 16E illustrates an encoding of the input data example of FIG. 16D using a second randomly generated value.

FIG. 17A illustrates an encoding of an input data example based on the data-driven mapping shown in FIG. 15, using asymmetric tables.

FIG. 17B illustrates an encode table and decode table for the encoding shown in FIG. 17A.

FIG. 17C illustrates a decoding of the input data example of FIG. 17A.

FIG. 18 illustrates the creation of a reverse mapping based on a chosen forward mapping, wherein asymmetric tables are used in the forward mapping.

FIG. 19 illustrates an error correcting function implementable with the forward mapping function.

FIG. 20A illustrates the correction of a corrupted data stream via the error correcting function of FIG. 19.

FIG. 20B illustrates a bit error detection via the error correcting function of FIG. 19.

FIG. 21A illustrates a whitening function for obfuscating input data.

FIG. 22A illustrates a transposition function for obfuscating input data by inserting a bit into a bit sequence, according to one embodiment.

FIG. 22B illustrates a transposition function for obfuscating input data by inserting a bit into a bit sequence, according to another embodiment.

FIG. 23A illustrates a transposition function for obfuscating input data by inserting a bit into a bit sequence, according to another embodiment.

FIG. 23B illustrates a transposition function for obfuscating input data by inserting a bit into a bit sequence, according to another embodiment.

FIG. 24A illustrates a transposition function for obfuscating input data by inserting a bit into a bit sequence, according to another embodiment.

FIG. 24B illustrates a transposition function for obfuscating input data by inserting a bit into a bit sequence, according to another embodiment.

FIG. 26 illustrates the use of a prefix forward map and prefix reverse map to further obfuscate input data.

FIG. 29 illustrates a scrambling mapping function for scrambling two data sets together.

FIG. 30 illustrates a convolved scrambling mapping function for scrambling two data sets together.

FIG. 31 illustrates a scramble table including randomly generated values that may be used to scramble two data sets together, according to one embodiment.

FIG. 32 illustrates a scramble table including randomly generated values that may be used to scramble two data sets together, according to another embodiment.

FIG. 33 illustrates a scramble table including randomly generated values that may be used to scramble two data sets together, according to another embodiment.

FIG. 34 illustrates a descrambling table including randomly generated values that may be used to descramble a received data set, according to one embodiment.

DETAILED DESCRIPTION

Referring generally to the figures, systems and methods for data obfuscation of a digital bit stream is described. The systems and methods described herein may be used to encode and decode a data packet to secure the data. Note that the digital bit stream may be referred to as a bit stream, a data stream, a data packet, or data in the present disclosure; and the use of the various terminology in the present disclosure is not limiting.

Referring further to the figures, systems and methods for managing obfuscated communication between multiple devices is described. A communications protocol between multiple devices may be established via key provisioning, and the obfuscation techniques described herein may be used to secure the communications.

Figure 1A:
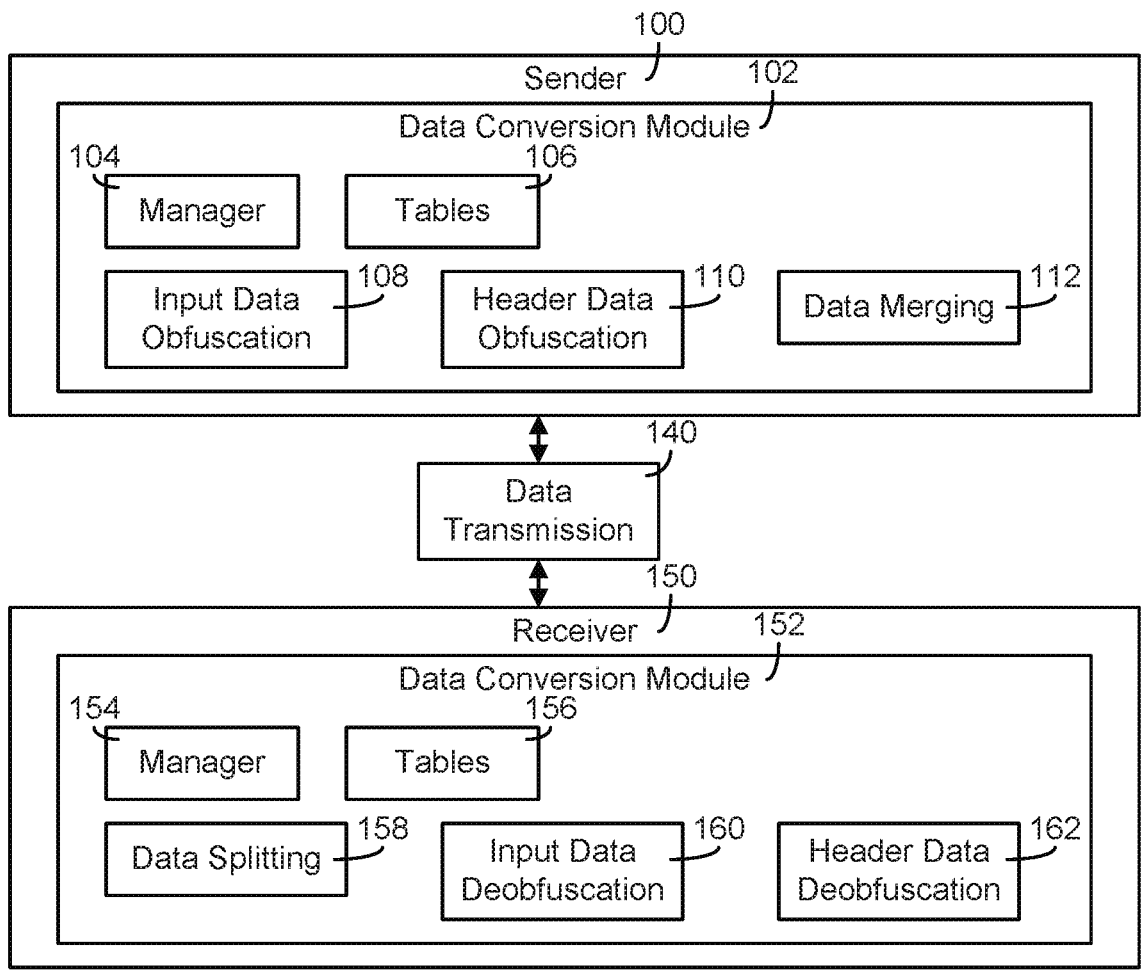
FIG. 1A illustrates a block diagram of one embodiment of a data communications system for transmitting data from one or more senders to one or more receivers.

Referring to FIG. 1A, an embodiment of a data communications system is shown. The data communications system generally includes one or more senders 100 and one or more receivers 150, wherein the one or more senders 100 provide one or more data transmissions to the one or more receivers 150. In the embodiment of FIG. 1A, just one sender 100 and receiver 150 are shown; however, the systems and methods described herein may be implemented for multiple senders and/or receivers without departing from the scope of the present disclosure.

As described above, the data in the data transmission 140 is obfuscated to protect the data transmission from cyber-attacks. During preparation of the data for transmission by the sender 100, a data conversion module 102 obfuscates the data via one or more functions and mappings. The data conversion module 102 obfuscates both the data to be transmitted (referenced to as "input data" in the present disclosure) and the OCTS header information for the data packet to be transmitted (i.e., data that appears in the payload section of a data packet to be transmitted). It should be noted that the use of the terms "header" and "header data" in the present disclosure refer to the OCTS header information instead of the header of the packet in a communications protocol such as TCP/IP (where information such as routing information would be stored). The data conversion module 102 includes a manager 104 configured to control the process of obfuscating the data (e.g., determining which functions and mappings to use and their order) and to provide information that can allow a receiver to deobfuscate (e.g., unscramble) the data. The data conversion module 102 is further shown to include three modules that are used to obfuscate the data. The data conversion module 102 includes an input data obfuscation module 108 to obfuscate the input data, a header data obfuscation module 110 to obfuscate the header data of the data packet, and a data merging module 112 to merge the obfuscated data from the modules 108, 110 together. The data conversion module 102 may include a plurality of tables 106 for use during the obfuscation (e.g., as a key, as described in subsequent figures).

Once the obfuscated data is transmitted and received by a receiver 150, a data conversion module 152 of the receiver 150 inverses the obfuscation process executed at the data conversion module 102 of the sender 100. The data conversion module 152 includes a manager 154 configured to control the process of deobfuscating the data. The data conversion module 152 is further shown to include three modules for deobfuscating the data. The data conversion module 152 includes a data splitting module 158 to split the received data into a header data portion and an input data portion, a input data deobfuscation module 160 to deobfuscate the input data portion, and a header data deobfuscation 162 to deobfuscate the header data portion. The data conversion module 152 may include a plurality of tables 156 for use during the deobfuscation, as described in subsequent figures.

The three modules of the two data conversion modules 102, 152 may be configured to be independently driven. In other words, each module may obfuscate its data according to its own functions, tables, etc. This helps prevent an unauthorized agent from obtaining the original unencoded data because all three independent modules would have to be "broken" by the unauthorized agent in order for the original unencoded data to be recovered by the unauthorized agent. Further, determining how one of the three independent modules obfuscated the data would provide no clue as to how to determine the obfuscation of the other two modules.

In the embodiment of FIG. 1A, the data conversion modules 102, 152 are shown within each of the sender 100 and receiver 150 (e.g., the data conversion modules 102, 152 are within a sender device or receiver device). In various exemplary embodiments, any type of configuration of the data communications system are possible (e.g., the sender 100 may send the data to be obfuscated to a remote data conversion module, the receiver 150 may receive deobfuscated data from a remote data conversion module, etc.). Various functions of the data conversion modules may be carried out in different computing devices, in some embodiments. It should be understood that all such variations are intended to fall within the scope of the present disclosure.

The present disclosure describes a forward mapping and reverse mapping function that may be used to obfuscate and deobfuscate the data. A forward mapping function may generally be applied to substitute a new bit pattern in place of the input bit pattern, while the reverse mapping function reverses the substitution. In some embodiments, the sender 100 may store or contain the forward map and the receiver 150 may store or contain the reverse map. One of skill in the art would understand that the sender need only contain the forward map and the receiver need only contain the reverse map. In addition, one of skill in the art would recognize that given only one of the maps, the other map could be easily derived thus requiring only a single map be provided to both the sender and receiver.

Figure 1B:
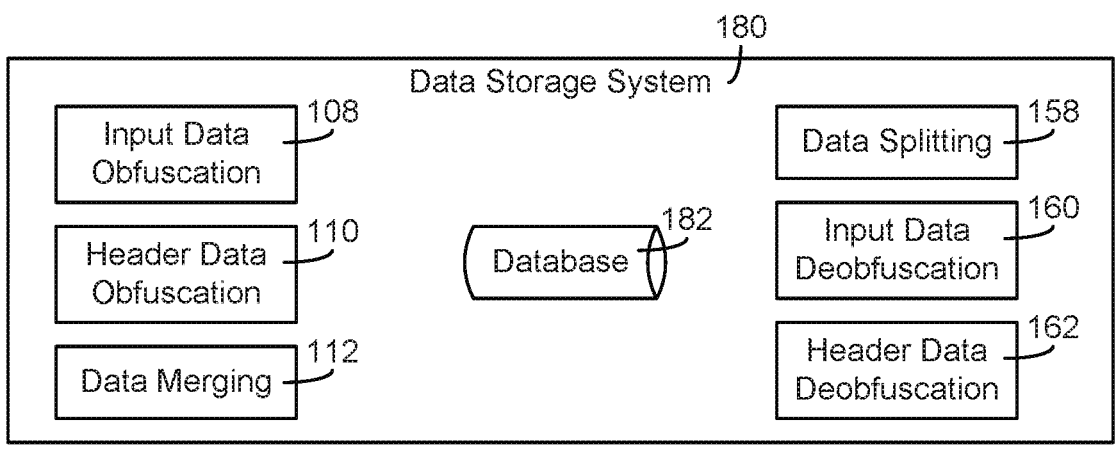
FIG. 1B illustrates a block diagram of one embodiment of a data storage system for storing obfuscated data.

Referring to FIG. 1B, an embodiment of a data storage system 180 is shown. In the embodiment of FIG. 1A, a data obfuscation process is described for a bit data stream to be transmitted from a sender to a receiver (e.g., "data in motion"). However, the data obfuscation process may also or alternatively be applied to data to be stored (e.g., "data at rest"). In the embodiment of FIG. 1B, the data storage system 180 may receive a data packet to be stored in memory of the system (e.g., a database 182). The data storage system 180 may include the input data obfuscation module 108, header data obfuscation module 110, and data merging module 112 as described in FIG. 1A for obfuscating the data before storage. Further, the data storage system 180 may include the data splitting module 158, input data deobfuscation module 160, and header data deobfuscation module 162 for decoding the data after retrieval from the database 182. The data storage system 180 may include one or more managers for managing the processes of encoding the data and decoding retrieved data. While the present disclosure primarily describes a data obfuscation process for data to be transmitted, it should be understood that the systems and methods herein may be applied for data to be stored locally without departing from the scope of the present disclosure. Moreover, while the present disclosure primarily describes a database, the storage need not be in a database format. One of skill in the art would recognize that any form of storage may be used, regardless of whether it contains a database schema. For example, the obfuscated data may be stored in standalone files, as part of the file system, on removable medium, etc. One of skill in the art would also recognize that the system may spread the obfuscation and deobfuscation components on different machines, or even different networks and those different machines and networks may be controlled by different entities.

Figure 2:
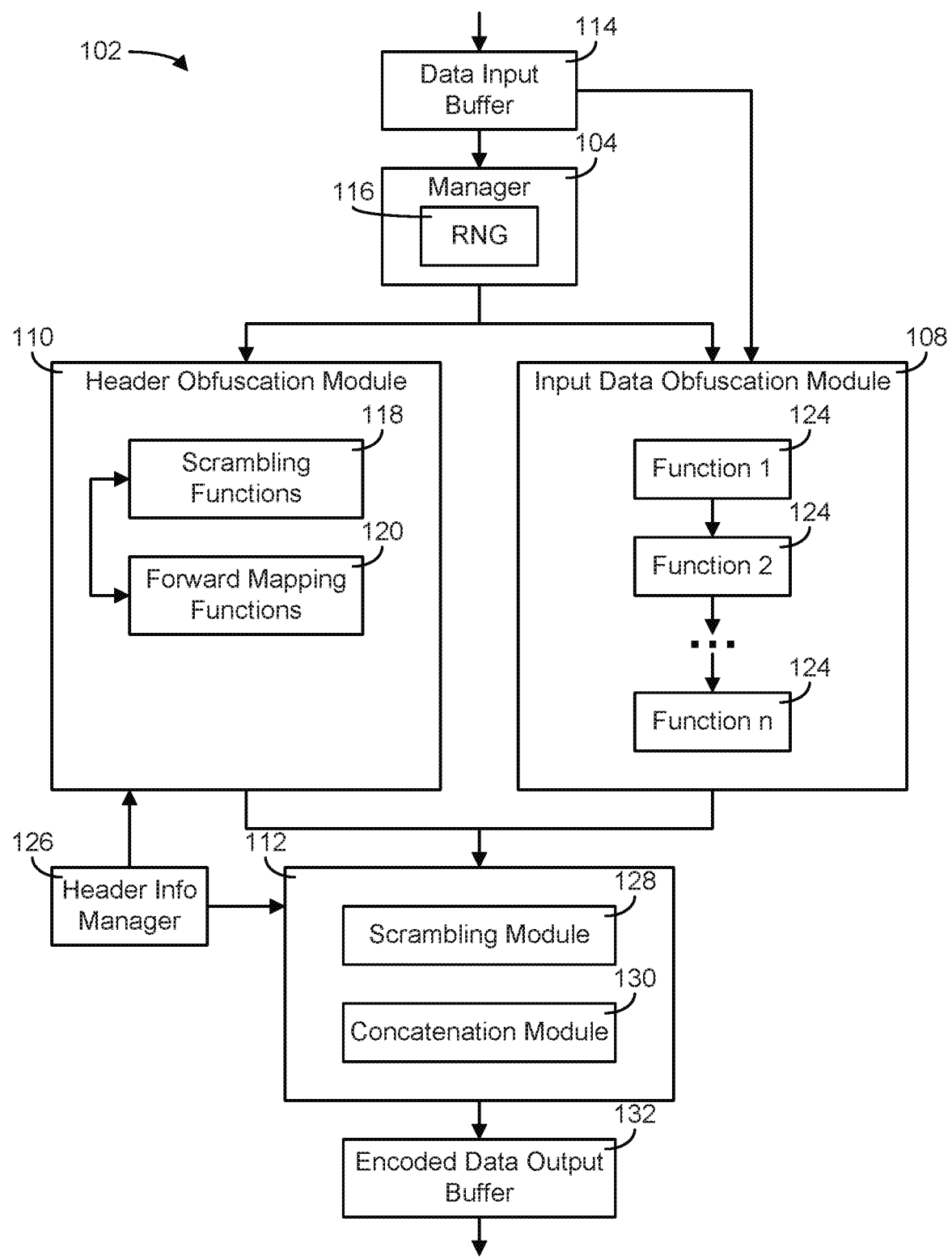
FIG. 2 illustrates a block diagram of one embodiment of a data conversion module for the one or more senders of the data communication system.
Figure 3:
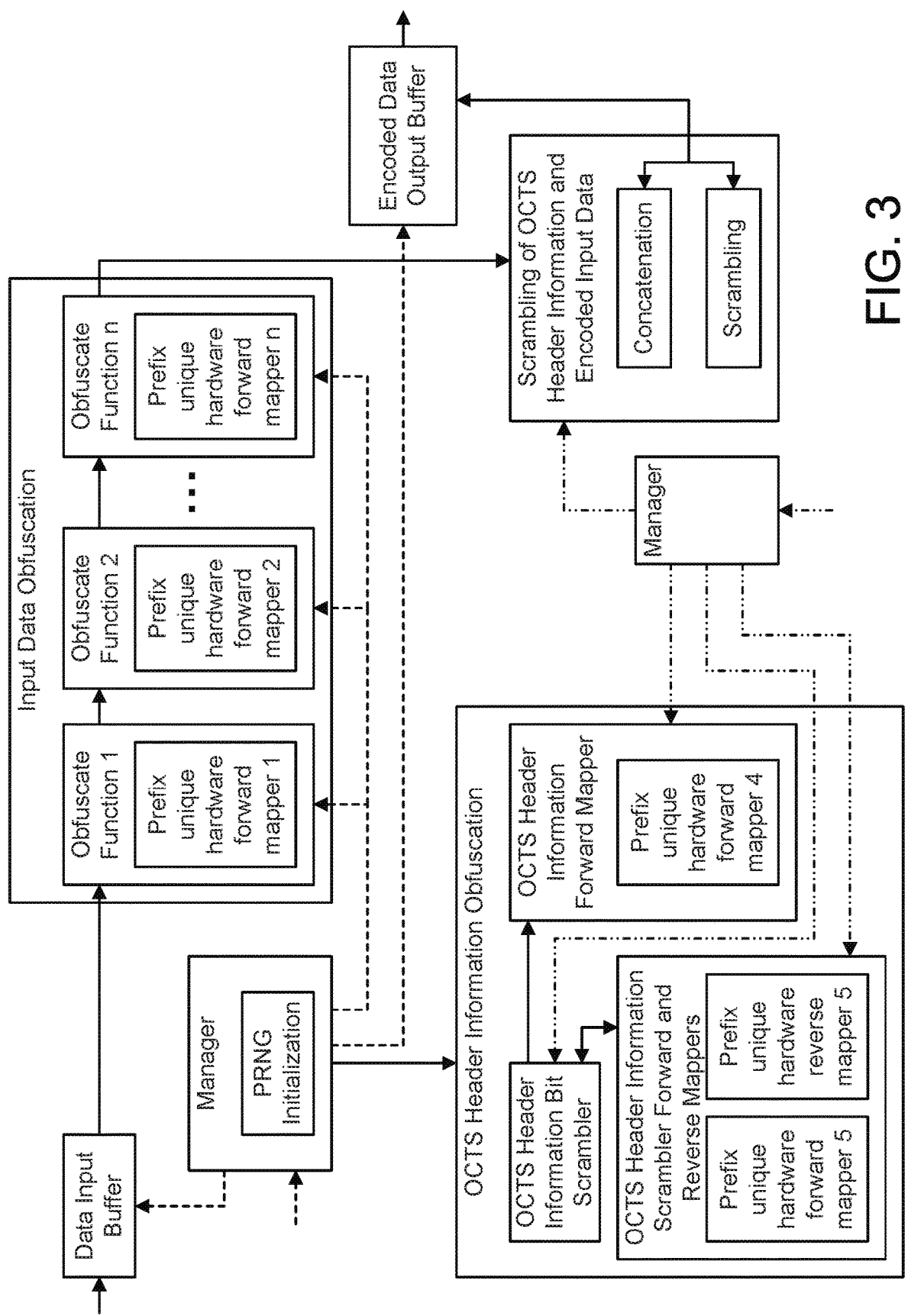
FIG. 3 illustrates a block diagram of another embodiment of a data conversion module for the one or more senders of the data communication system.

Referring now to FIGS. 2-3, the data conversion module 102 of the sender 100 is shown in greater detail. The data conversion module 102 includes a data input buffer 114 configured to receive the input data to be transmitted. The data input buffer 114 accepts the incoming data, formats the data if necessary (e.g., formatting the data to a proper size), and passes the data to the input data obfuscation module 108 for encoding. The data input buffer 114 may further provide and receive data to/from the manager 104.

The manager 104 can serve as an input data control function that establishes a configuration for the obfuscation that will be employed for the data packet to be sent. The manager 104 creates an identifier (e.g., one or more configuration or sub-configurations) that enable a receiver 150 to decode the data packet when received. The manager 104 further handles input data control commands, such as commands indicating that one or more tables that are to be used in the obfuscation of the data should be changed, that a handshake request should be sent or acknowledged, or other commands necessary for setup and control of the obfuscation process. The manager 104 may provide the identifiers and input data control commands to the header obfuscation module 110 as part of the header information. The manager 104 may further include or use a random number generator (RNG) 116. The RNG 116 may be, in some embodiments, a pseudo-RNG (PRNG). The RNG 116 may be used to create an identifier in order to determine which tables and/or functions to use during obfuscation of the input data at the input data obfuscation module 108. A PRNG may also be used to generate a stream of pseudo-random numbers that can be used by the input data obfuscation module 108 for obfuscation functions such as for an exclusive or (XOR) with the data.

The manager 104 may have various levels of sophistication. In one embodiment, the manager 104 may be implemented as a hard coded pass through. In other words, the manager 104 may make no decisions or have any options, and may simply receive an input and automatically generate an output (i.e., receive data, insert the data into a RNG 116, and output the resulting randomized data). In other embodiments, the manager 104 may be more sophisticated, receiving multiple functions and parameters that may be used to determine how to randomly generate values, how to configure the data conversion module 102 for the obfuscation process, and so forth. The manager 104 may receive functions and parameters from multiple servers or other sources, or from a single source within the data conversion module 102. The manager 104 may be able to increase the complexity of the obfuscation based on the amount of data received at the manager.

The input data obfuscation module 108 may include a plurality of functions 124 applicable to the data for obfuscation. The input data obfuscation module 108 may include any number of functions 124 (i.e., the number, type and order of functions used by module 108 may be fixed or may vary based on the randomly chosen value or identifier by the manager 104 and on other settings or properties). For example, the functions 124 used by the input data obfuscation module 108 may be chosen based on user requirements for the data being transmitted, the type of data, the application that the data relates to, and/or the resources available for transmission of the data.

The header obfuscation module 110 includes a plurality of functions for obfuscating the header information. For example, the header obfuscation module 110 includes one or more scrambling functions 118 configured to swap bits within the header data. Further, the header obfuscation module 110 may include one or more forward mapping functions 120 configured to substitute new bit patterns in place of the input data bits in the data packet to be transmitted. The data conversion module 102 is shown to include a header information manager 126 configured to provide an input to the various functions of the header obfuscation module 110.

After input data is obfuscated by the input data obfuscation module 108 and header data is obfuscated by the header obfuscation module 110, a data merging module 112 merges the two data sets together. The data merging module 112 includes a scrambling module 128 and a concatenation module 130 for scrambling bits from both data sets and concatenating the two data sets together. The merged data is provided to an encoded data output buffer 132 for transmission to a receiver 150.

Referring more particularly to FIG. 3, the functionality of the data conversion module 102 is shown in greater detail. The solid lines represent a data path for the data to be obfuscated and transmitted to a receiver 150. The data is received at the data input buffer 114 and provided to the input data obfuscation module 108 for encoding. Further, encoded header information is shown provided by the header obfuscation module 110 to the data merging module 112. The dashed lines represent a data control path; the information used to determine how to obfuscate the data (e.g., which functions to use, which tables to use, etc.). The dot-dashed lines represent a control path between the header information manager 126 and the various functions of the header obfuscation module 110.

Figure 4:
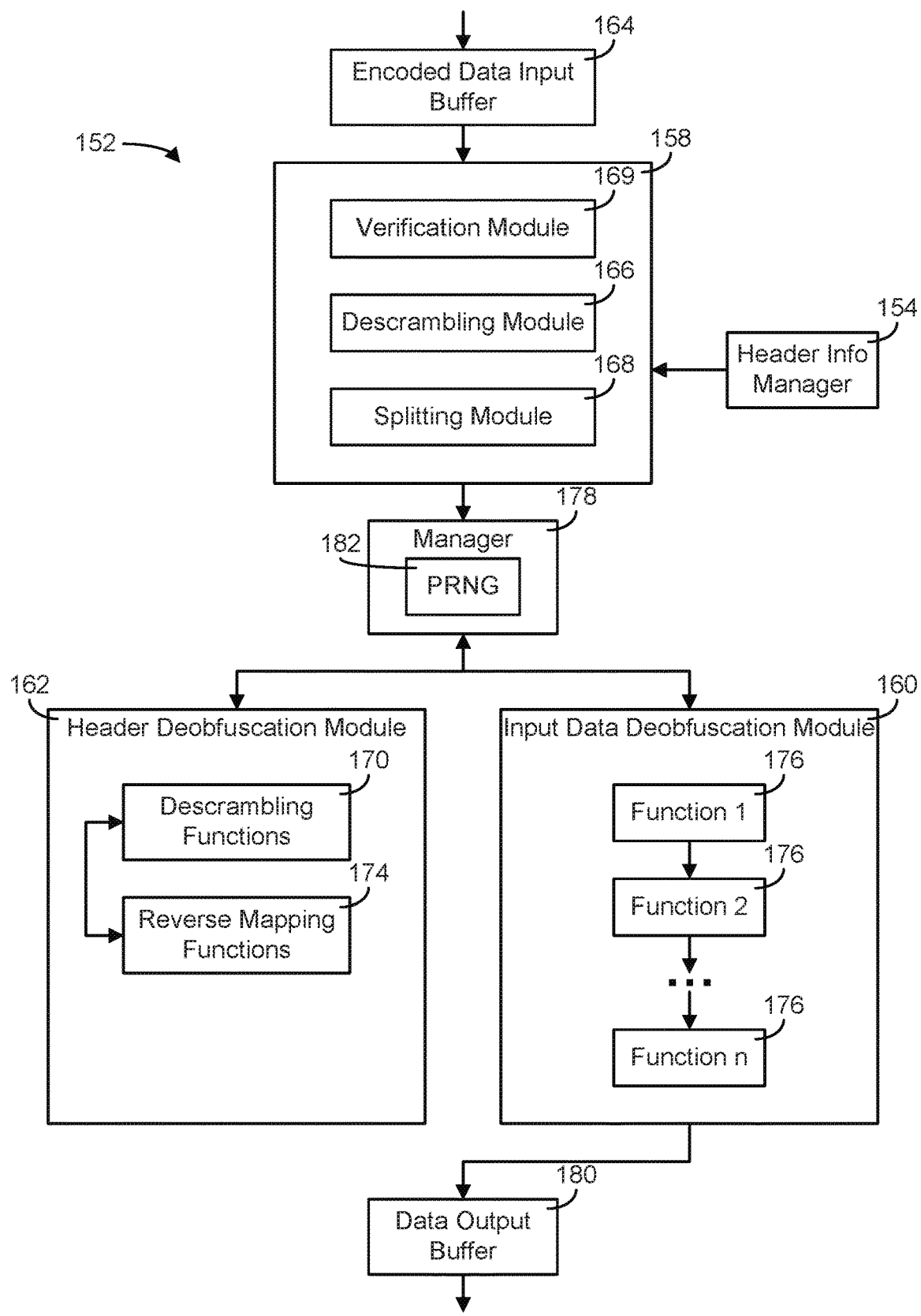
FIG. 4 illustrates a block diagram of one embodiment of a data conversion module for the one or more receivers of the data communication system.
Figure 5:
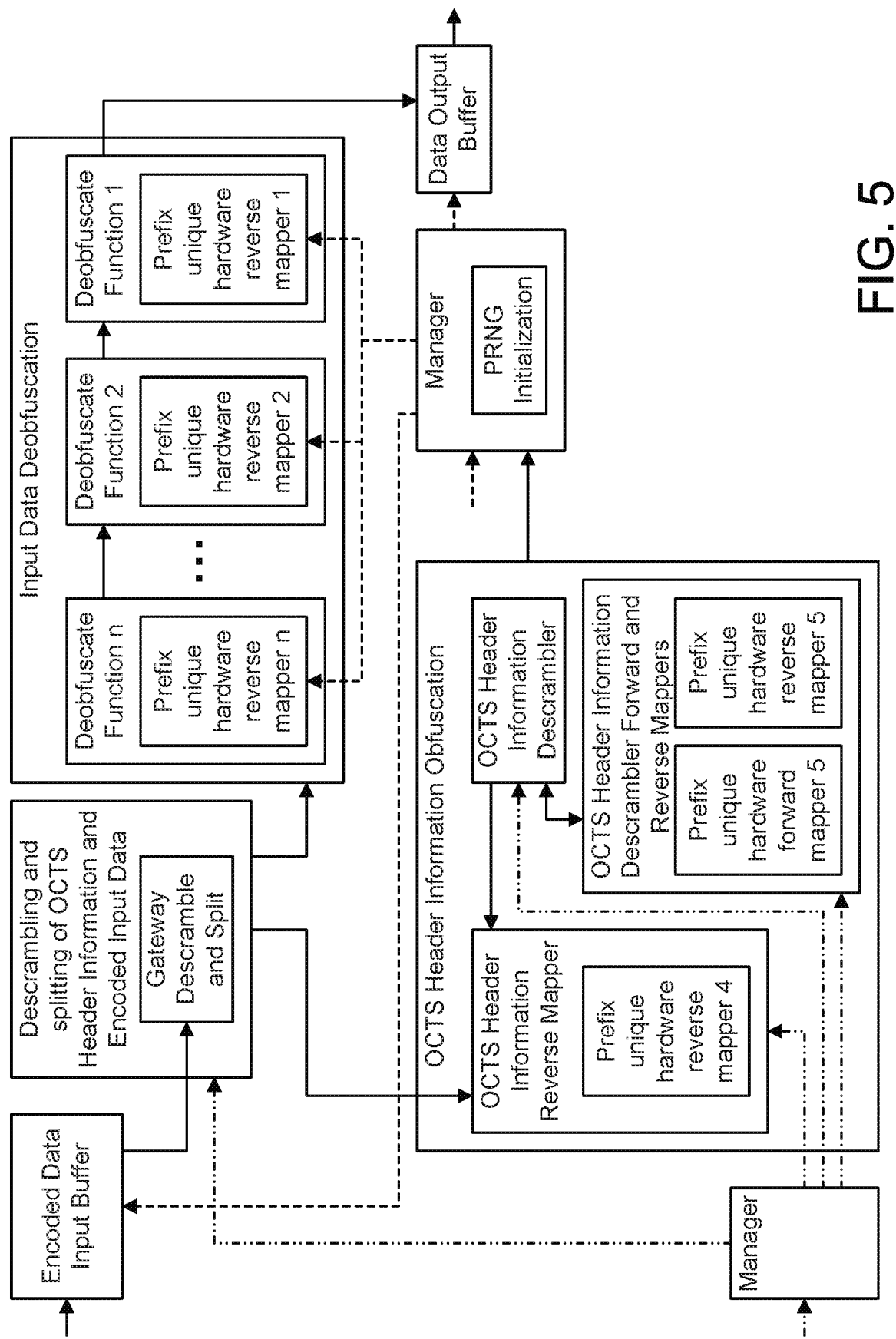
FIG. 5 illustrates a block diagram of another embodiment of a data conversion module for the one or more receivers of the data communication system.

Referring now to FIGS. 4-5, the data conversion module 152 of the receiver 150 is shown in greater detail. Generally, the various components of the data conversion module 152 are the inverse of the components of the data conversion module 102 (i.e., using the same general process to deobfuscate the data as was used to obfuscate the data). The data conversion module 152 includes an encoded data input buffer 164 configured to receive the encoded data and to provide the data to the data splitting module 158. The data splitting module 158 splits the data via the descrambling module 166 (to descramble the bits that were scrambled by the scrambling function 118) and the splitting module 168 (to separate the header data from the input data). The data splitting module 158 receives input from the header information manager 154 to determine the relevant information for the data splitting process (e.g., to identify the portion of the data that includes information about which tables were used during the obfuscation of the data).

In one embodiment, the receiver 150 may receive data packets that are encoded and formatted in a format recognizable by the receiver. For example, the packets may be encoded with OCTS. If the packet received is not an OCTS packet, no further processing of the data packet is required for the receiver. However, some processing of the packet may be required at the data splitting module 158 to determine whether the data packet is OCTS. The data splitting module 158 (or another module of the receiver 150) may include a verification module 169 to determine if the packet is an OCTS packet. The verification module 169 may, for example, check one or more fields (e.g., the quick look field and checksum field as described below) to rule out whether the packet is an OCTS packet. The data splitting module 158 may perform further processing on the data packet if it is an OCTS packet, to allow the packet to be descrambled and decoded.

The split data is provided to the manager 178. Both the header data and the original message are still obfuscated at this point. The manager 178 determines which configuration for the obfuscation was used by the input data obfuscation module 108 for the data packet received. The manager 178 may further include a PRNG 182. The PRNG 182 may be a pseudo-random number generator similar to the RNG 116 of FIG. 2, in one embodiment. For example, if RNG 116 is a PRNG, if the same seed value is used in the RNG 116 and the RNG 182, the output from the RNG 116 and the RNG 182 will be the same. The obfuscated header data is forwarded to the header deobfuscation module 162. The header deobfuscation module 162 includes one or more descrambling functions 170 and one or more reverse mapping functions 174 to deobfuscate the header data, as described in subsequent figures. The header deobfuscation module 162 returns configuration information to the manager 178 relating to the type and number of functions used to obfuscate the data by the data conversion module 102. The information along with the obfuscated input data is forwarded to the input data deobfuscation module 160. Based upon the configuration information determined by manager 178, the input data deobfuscation module 160 may apply one or more functions 176 (which may be related to the functions 124 applied to the input data at the sender 100) to deobfuscate the data. The result of the input data deobfuscation module is stored and then made available in the data output buffer 180.

Referring generally to FIGS. 2 and 4, the RNGs 116, 182 are shown implemented in the manager. In other embodiments, the RNG function may be implemented in any of the other modules of the data conversion modules 102, 152. If the sender 100 uses a true random number generator (instead of a PRNG), the output of the RNG should be sent to the receiver 150, as the receiver needs to receive the output in order to deobfuscate the data. If the sender 100 uses a PRNG, the receiver 150 may be capable of generating the same value with a PRNG given the input to the PRNG.

Referring more particularly to FIG. 5, the functionality of the data conversion module 152 is shown in greater detail. Similarly to FIG. 3, the solid lines represent a data path for the input data and header data to be deobfuscated by the data conversion module. The data is received at the encoded data input buffer 164 and provided to the data splitting module 158, which in turn provides the data to the two deobfuscation modules 160, 162 as described above. The dashed lines represent a data path control path; the information used to determine how to deobfuscate the data (e.g., which functions to use, which tables to use, etc.). The dot-dashed lines represent a header control path between the header information manager 154 and the various functions of the header deobfuscation module 162.

Referring generally to FIGS. 6-11, one embodiment of the header obfuscation process is described in greater detail. More particularly, the header obfuscation module 110 and activity of the data conversion module 102 of the sender 100, and the header deobfuscation module 162 and activity of the data conversion module 152 of the receiver 150 is described in greater detail. First, it should be noted that the header information may serve many purposes in the operation of the system. For example, the header information may be used as the information path for passing control information between the sender 100 and receiver 150. The header information may also be used to identify packets of data that are intended for a specific receiver and therefore reject packets that are intended for other receivers. In this way, the header information can be used to gain entry into a specific assigned secured network. The header information may also be used to determine whether a packet is guaranteed to not be one encoded in accordance with aspects of this invention. Such a determination can be useful in a receiver 150 because determining that a packet is not encoded according to aspects of this invention allows the receiver 150 to bypass the decoding steps entirely; this prevents wasted computing cycles. In addition, the header information may contain the information necessary to enable deobfuscation of the encoded input data. In general the header information is relatively small compared to the size of a packet. For example, in one embodiment, the header information is less than 20 bytes whereas a packet may contain 1500 bytes.

The header obfuscation module 110 generally obfuscates the header information to deny the ability for anyone other than the intended recipient to use or view the data. The header obfuscation module 110 may use a set of unique functions different from those used for obfuscation of the input data or for the data merging, to increase complexity of the overall obfuscation process. Alternatively, the obfuscation module 110 may use the same obfuscation functions as the other modules of the data conversion module. The obfuscation module 110 may use, for example, one or more substitution or mapping functions (e.g., substituting a first bit pattern with a second bit pattern), one or more whitening functions, and/or one or more transposition functions. These functions are described in greater detail in subsequent figures.

Figure 6A:
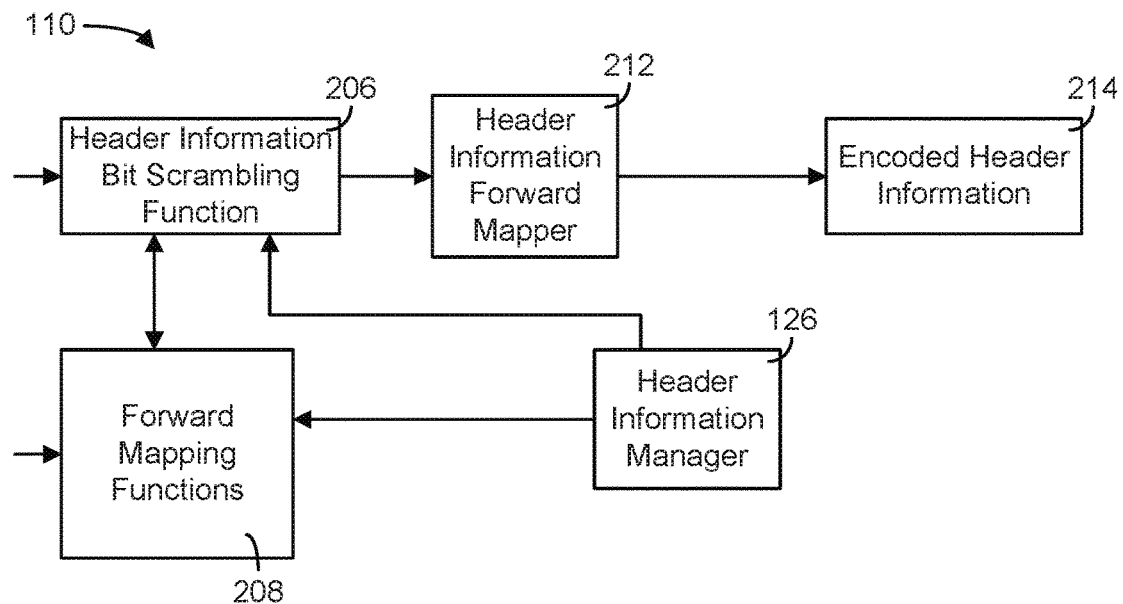
FIG. 6A illustrates a block diagram of one embodiment of obfuscating header information for data to be transmitted by a sender.

Referring now to FIG. 6A, a block diagram of the header obfuscation module 110 of the sender 100 is shown. The output of the header obfuscation module 110 is designed so as not to repeat an output if the sender is forced to retransmit or to send an identical message. In other words, each output of the header obfuscation module 110 should be unique, regardless of if the header information is the same.

In the embodiment of FIG. 6A, two types of obfuscation functions are illustrated. The header obfuscation module 110 includes a header information bit scrambling function 206 and a header information forward mapper 212. In other embodiments, the header obfuscation module 110 may include any number of unique functions.

Figure 8:
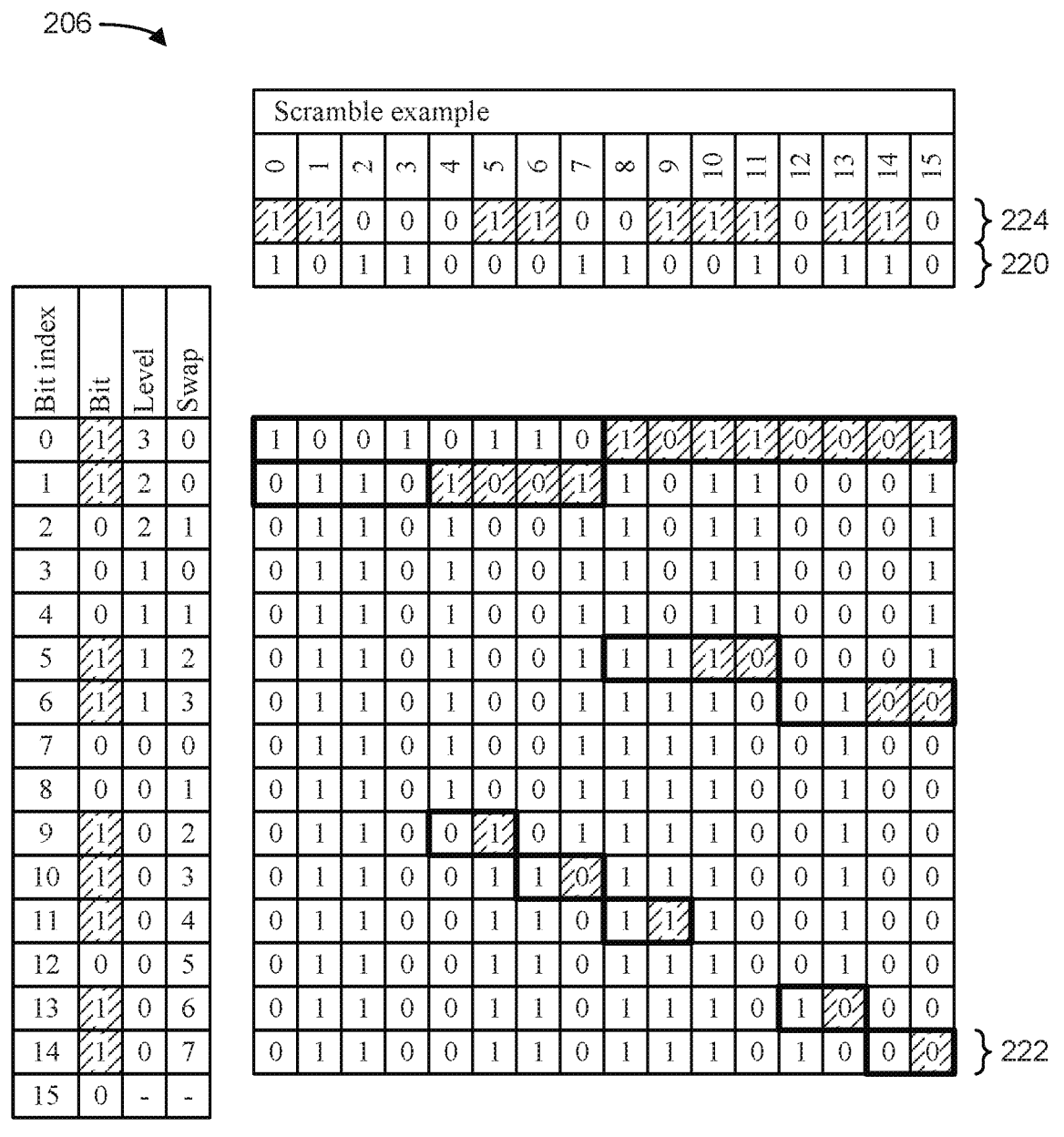

The header information bit scrambling function 206 is generally configured to swap bits within a set number of bits. For example, the function 206 may swap bits within a sixteen bit word, with the capability to move any single bit within the sixteen bits to any other location within the word, and with the capability for performing the inverse function (e.g., at the receiver) or returning each bit to its original location. A function may be used that swaps groups of bits, with both the group size and the locations of the bits being swapped defined by the level and location of the swap. Referring generally to FIGS. 7-9, one such example function is illustrated for a sixteen bit word. While an example with sixteen bits is shown in FIGS. 7-9, it should be understood that in various embodiments, a swapping function may be applicable for any number of bits.

In the embodiment of FIG. 7, a swap function for a sixteen bit word is shown, with each element of the word indexed [0, 15]. The function defines the number of levels at three, resulting in a Level 0 swap, a Level 1 swap, a Level 2 swap, and a Level 3 swap. At Level 3, the bits are grouped into $2^1=2$ groups of 8-bits each; at Level 2, the bits are grouped into $2^2=4$ groups of 4-bits each; and so forth. A scramble key 224 (shown in FIGS. 8-9), also of length sixteen bits may be pre-exchanged, exchanged during an initialization process, or generated by RNG 116. The sixteen bits of the scramble key 224 determine how the bits of the input word are scrambled.

For example, as shown in FIG. 7, the Level 3 swap is shown as driven by Bit 0 of the scramble word. If Bit 0 of the scramble key 224 is 1, a swap between the two groups of bits [0, 7] and [8, 15] is performed. If Bit 0 of the scramble key 224 is a 0, then no swap would be performed. The Level 2 swap is shown as driven by Bits 1 and 2 of the scramble key 224. If Bit 1 of the scramble key 224 is 1, a swap between the two groups [0, 3] and [4, 7] is performed; if Bit 2 of the scramble key 224 is 1, a swap between the two groups [8, 11] and [12, 15] is performed. This process is repeated through each level and bit as shown. Referring to FIG. 8, for the input word 220 received by the function 206, the scrambled word 222 is generated. Each highlighted area illustrates where a swap occurred based on a bit of the scramble key 224 having a value of 1. For example, since Bit 0 was 1, a swap was performed between bits [0, 7] and [8, 15]. The swap function begins with Level 3 and works down to Level 0. Note, that as shown in FIGS. 7-9, only fourteen swaps are necessary and so Bit 15 of the scramble key 224 is ignored.

Referring to FIG. 9, the descrambling of the bit word 220 is shown (performed at the header deobfuscation module 162 as described below with reference to FIG. 6B). The process of descrambling the bit word 220 may be inverted, i.e., starting with Bit 14 (as shown in FIG. 7, Bit 15 is ignored) first and applying the Level 0 swaps through Bit 0 which would apply the Level 0 swap.

Referring again to FIG. 6A, the header information forward mapper 208 (and the reverse mapper 258 of FIG. 6B) is used in the header obfuscation process. Generally speaking, a 'forward map' and 'reverse map' are provided as vector pairs for a mapping function of the header obfuscation process. The forward map provides the function for encoding the header, and the reverse map provides the function for decoding the header. The forward mapping function substitutes new values for some or all of the header values. The reverse map is used to return the encoded value to its original value.

The forward mapper 212 and reverse mapper 258 are matched. The maps used may be a basic map (e.g., a pre-set mapping of a single value to a fixed new value), a data driven map driven as a function of a single variable, or a data driven map driven as a function of multiple variables. The level of complexity of the map may increase based on the level of protection desired. The mappings are described in greater detail with reference to FIGS. 13-14.

The information passed by the manager 104 to the header obfuscation module 110 (and therefore the functions 206, 212 shown in FIG. 6A) may include one or more table identifiers and/or control information, which identify the configuration and tables currently in use in the data path to encode the data. The information may be dependent on the specific OCTS (optimized code table signaling) configuration. Information for communications process management may also be included as part of the control information. The information passed by the manager 104 to the header obfuscation module 110 may further include an output from the RNG 106, or an input that is derived from the output of the RNG sequence used. The information passed by the manager 104 to the header obfuscation module 110 may further include a frame length (to identify the size of the frame length when it may be variable) or any other information needed by the header obfuscation module 110 to encode the header data. Referring also to FIG. 10, a table is shown identifying some information that may be provided by the manager 104 to the header obfuscation module 110. The information may further include a checksum or quick look input, used to verify the data for transmission (i.e., to ensure the received frame was intended for the data conversion module, to validate the header message as accurate and addressed, etc.). The fields shown in FIG. 10 are provided as example fields that may be included in the header information. More generally speaking, the header information includes the information necessary to decode the message and may include information such as a table ID, configuration fields identifying the mapping tables used by the sender, system configuration information, one or more random draw values (instead of just a scramble word), a data size field (which indicates the amount of data that was obfuscated), and/or the optional frame length (which may be used to identify dummy data as described below). The header obfuscation module 110 may obfuscate each field of the header data using a different technique. The above disclosure is not meant to be limited of the types of information that can be passed in the header and one of skill in the art would recognize that other information could be included in the header as necessary to provide information to the decoder to ensure the message is properly decoded.

Referring more particularly to the quick look field, the field may be used to quickly determine if the data packet transmitted was not of the type encoded by the various embodiments disclosed herein. For example, the quick look field may be used to determine if the data packet has an OCTS configuration or not. This allows packets encoded using OCTS to coexist on a network with packets that are not encoded with OCTS. For each packet received the network device can use the quick look field to determine if the packet is not an OCTS packet. If not, then no further OCTS processing is necessary and the packet is handled in the conventional way packets are handled. If, however, the quick look field indicates the packet might be an OCTS encoded packet, then further processing is necessary. In one embodiment, the quick look field may be generated using an XOR function. For example, the quick look field may be the result of an XOR function of two other portions of the header, such as two of the table identifiers. For speed and efficiency, the quick look field itself need not be obfuscated and may be the result of an XOR function of obfuscated portions of the header. In this way, once the location of the quick look field and the fields that will be the inputs to the XOR are received and identified, a single XOR and a single comparison can be quickly performed to determine whether the packet might require further processing. A receiver that receives the data packet may check the quick look field to determine if the data packet is in a proper format (e.g., a OCTS configuration). In various embodiments, other functions than an XOR function may be used to create the quick look field.

Referring more particularly to the checksum field, the field may be obfuscated during header obfuscation. The checksum field may generally be used to detect errors during transmission, storage, or rule out the packet as one encoded using the techniques of the present disclosure. The checksum field may be created based on the all of the data that was obfuscated at the sender 100 or some subset of the data using any of the well-known methods for crating checksums. For example, a checksum may be calculated by using all data to be transmitted except for the quick look field. The checksum function should be able to calculate a checksum for a data set in which: the obfuscation functions are unique from the data path obfuscation functions, the number of input variables differ, the functions used are determined by a random variable, and each element undergoes at least one transformation driven by an obfuscation function. The receiver may calculate its own checksum on the deobfuscated header data of the received data packet to see if it matches the checksum that was passed. In various embodiments, the sender may use any other type of error detection method for providing information in the header that allows the receiver to determine if there was an error during transmission or whether the information provided is malicious. For example, the receiver may check to see if the data size is within permissible bounds, which may indicate either an error during transmission or a malicious attempt to have the receiver perform an analysis on a data buffer larger than that which was received.

Each field in the header information may include a specific and defined number of bits. The bits may be defined such that a receiver can identify the header information during data deobfuscation. For example, the data ID may be 7 bits, the scramble word 4 bits, the quick look field 16 bits, the checksum 16 bits, etc. It should be understood that the header may be formatted in any way and may include any number of bits for any number of fields, so long as the header is identifiable by the receiver.

The header information bit scrambling function 206 and header information forward mapper 212 retrieve header information and PRNG values from the header information manager 126. The header data and PRNG values may define the type of mapping function to use (e.g., which one or more forward mapping functions 208 to use), and may further include identification information that can be used by a receiver to identify the header portion of the obfuscated data. As shown in FIG. 6A, one or more forward mapping functions 208 may be selected and provided to the header information bit scrambling function 206 for use in obfuscating the data; the selection of the functions may be based on information retrieved from the header information manager 126.

Referring still to FIG. 6A, after the header information is scrambled by the header information bit scrambling function 206, the header information forward mapper 212 is configured to map the obfuscated header data. The forward mapper 212 may be as simple as a table lookup or may employ a data driven mapping using a rolling offset. The forward mapper 212 is provided as a second independent obfuscation function, independent of the bit scrambling function 206. After the data is obfuscated by the mapping, the data may be provided as encoded header information 214 to another module of the data conversion module (for combining with input data).

Figure 6B:
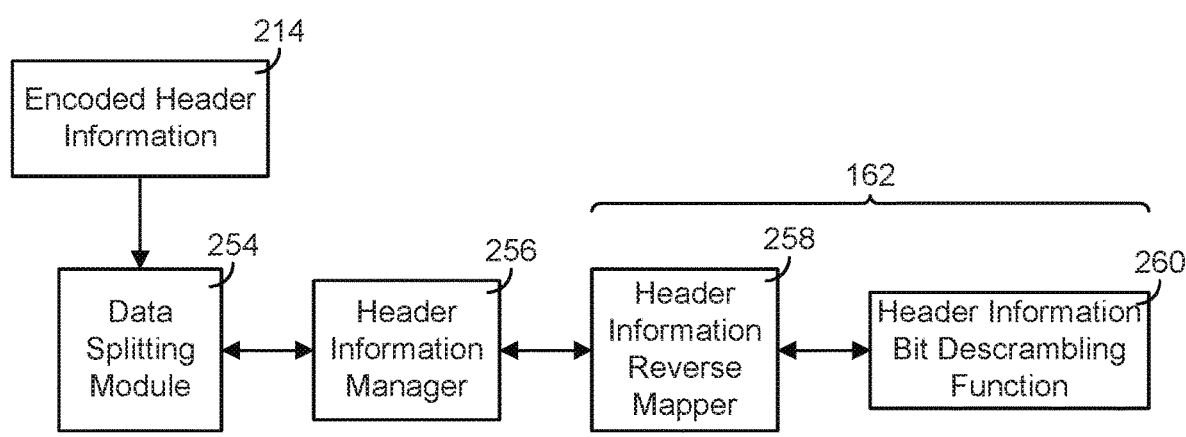
FIG. 6B illustrates a block diagram of one embodiment of deobfuscating header information for data received by a receiver.

Referring now to FIG. 6B, the activities of the receiver 150 and more particularly the header deobfuscation module 162 are shown in greater detail. As described above, the header deobfuscation module 162 may generally reverse the data obfuscation performed by the header obfuscation module 110 of the sender 100. The encoded header information 214 received from the sender 100 and provided to a data splitting module 254 for splitting the encoded data into encoded header information and encoded input data. The header information manager 256 may receive the encoded header information and determine one or more functions or methods, along with parameters associated with the functions or methods, that were used to obfuscate the data. The header deobfuscation module 162 includes a header information reverse mapper 258 to reverse a mapping function applied to the header data, and a header information bit descrambling function 260 to reverse a bit scrambling function applied to the header data.

Figure 11A:
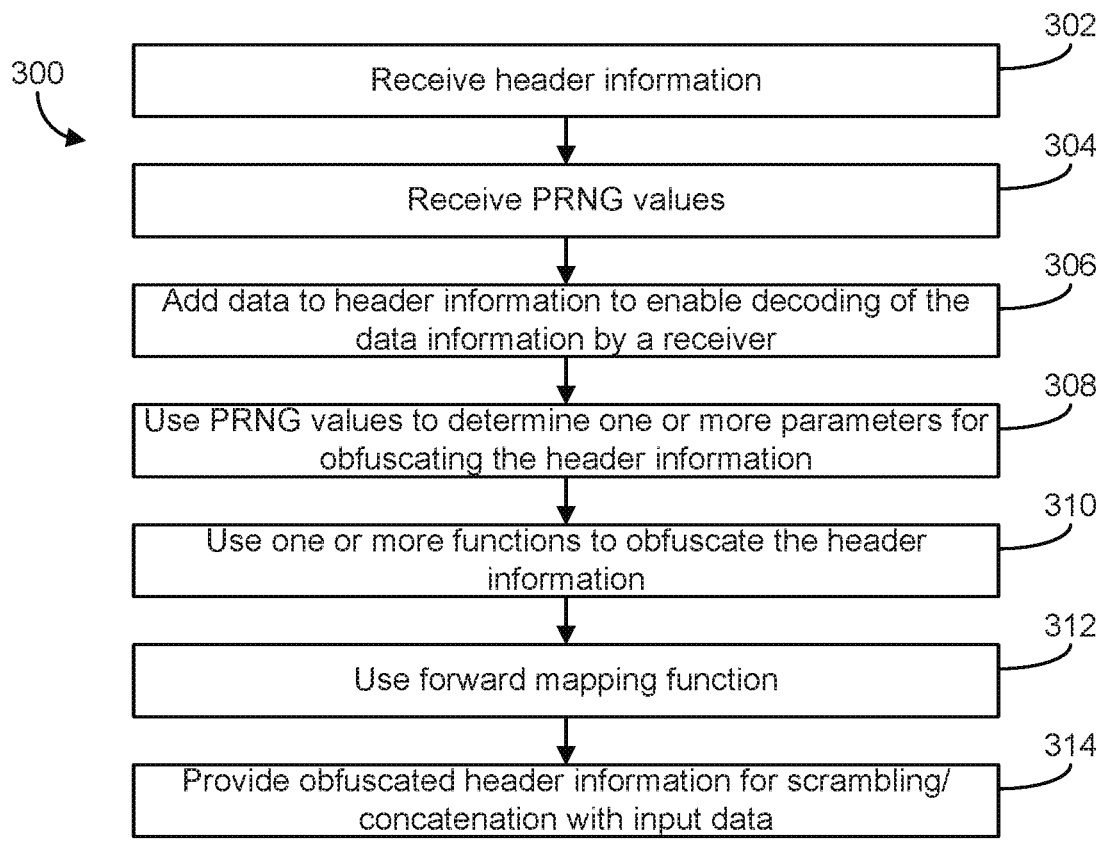
FIG. 11A illustrates a flow chart of a process for encoding header information.

Referring now to FIG. 11A, a flow chart of a process 300 for encoding header information is shown, according to an exemplary embodiment. The process 300 may be executed by, for example, the header obfuscation module 110. The process 300 includes receiving header information (302) and PRNG values (304). The received header information may simply include information relating to the data packet to be encoded and transmitted to a receiver. The PRNG values may include values pseudo-randomly generated based on the header data values. The process 300 further includes adding data to the header information to enable decoding of the data information by the receiver (306).

The process 300 further includes using the PRNG values to determine one or more parameters for obfuscating the header information (308). As described above, the header may identify which look-up tables to use for a bit or byte swapping function, mapping function, which type of mapping or scrambling to use, which header elements to map or scramble, and the like. After identifying how to obfuscate the header information, one or more functions identified are used to obfuscate the header information (310). For example, referring also to FIGS. 7-9, one example of a function that may be used to obfuscate the data is a bit swapping function. In various embodiments, the functions may be identified by the data conversion module, or one or more of the functions may be a unique function set for a particular customer or application (e.g., a particular customer using a particular type of obfuscation function, allowing for an individual or client to add their own personalized protection to the data set). The header data itself may be obfuscated using a single function but it may also be obfuscated using multiple functions where different portions of the header are obfuscated using different functions. In addition some portions of the header may remain unobfuscated or in certain applications it may not be necessary to obfuscate the header at all.

The process 300 further includes using a forward mapping function (312) to further obfuscate the header data. The forward mapping function may be a function identified at block 308, for example. The obfuscated header information is then provided to another module for scrambling and concatenation with input data (314). As described above, input data and header data are obfuscated separately at two different modules and then combined and scrambled at a third module.

Figure 11B:
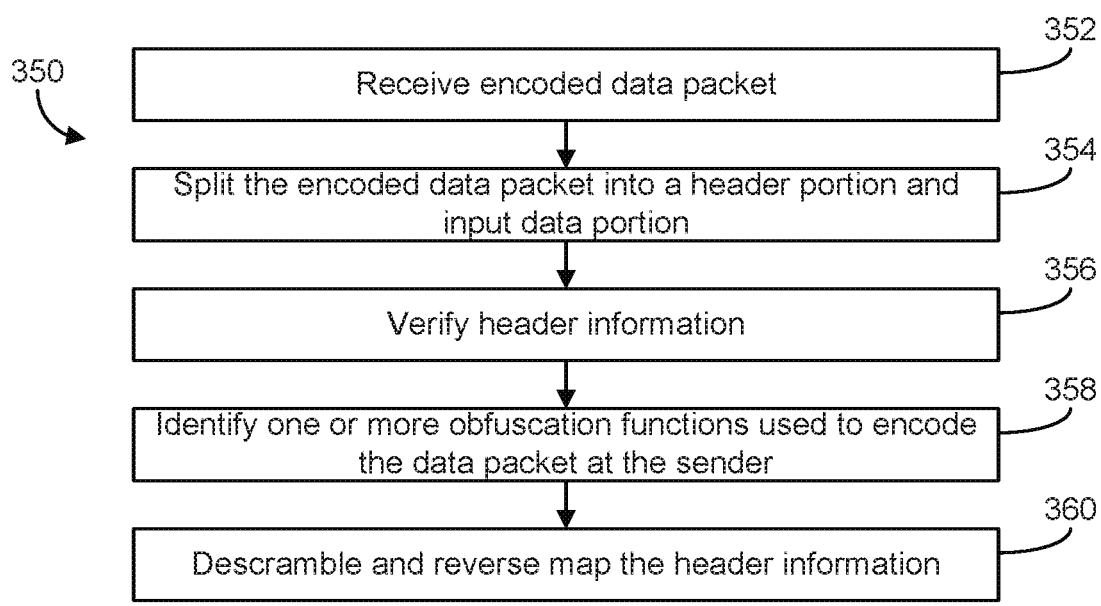
FIG. 11B illustrates a flow chart of a process for decoding header information.

Referring now to FIG. 11B, a flow chart of a process 350 for decoding header information is shown, according to an exemplary embodiment. The process 350 may be executed by, for example, the header deobfuscation module 162. The process 350 includes receiving the encoded data packet (352) from the sender and splitting the data packet into a header portion and an input data portion (354). For example, block 354 generally includes the step of identifying the header information by splitting and descrambling the encoded data packet. The process 350 further includes verifying the header information (356). Referring again to FIG. 10, the verification of the header information may generally include checking the checksum value, looking at the quick look field to determine if the receiver is the intended recipient, etc.

The process 350 further includes identifying one or more obfuscation functions used to encode the data packet (358). For example, a manager 178 of the receiver 150 may review the still-obfuscated header information and obtain a random number from a PRNG. The manager 178 may determine the seed value used by the PRNG of the sender 100 via the header information, and use the same seed value for its PRNG. This may allow the header deobfuscation module 170 to replicate the functions used by the sender 100 to obfuscate the data. The process 350 further includes descrambling and reverse mapping the header information (360). Once the header information is deobfuscated, the information in the header may be used to deobfuscate the input data (described in greater detail in subsequent figures).

Figure 11C:
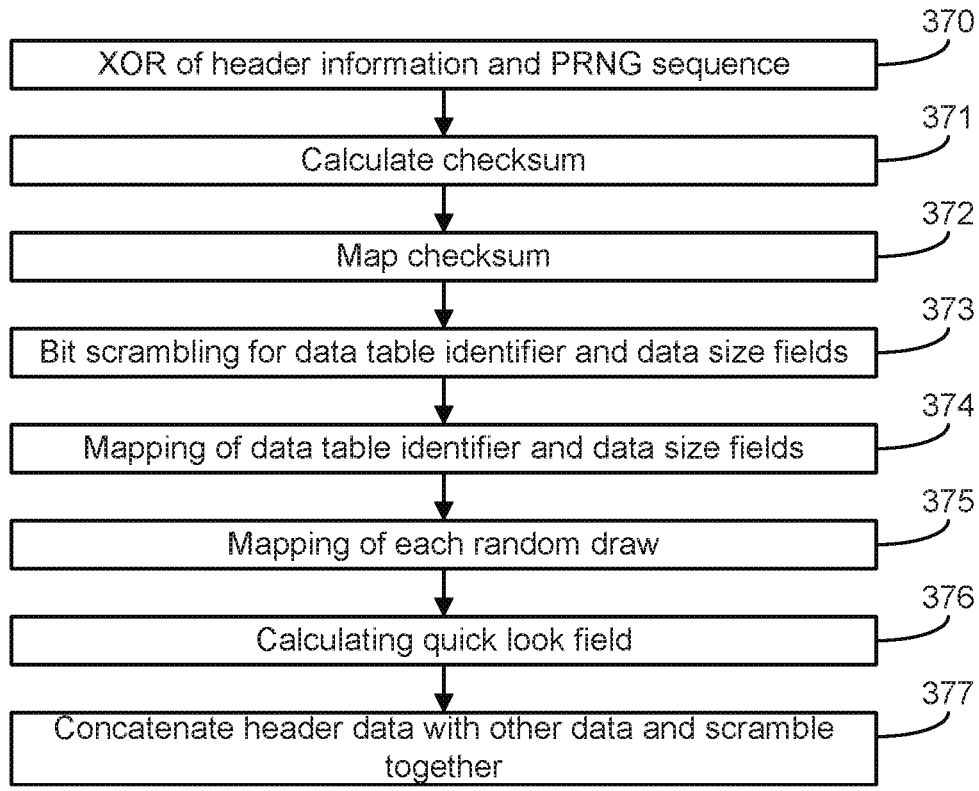
FIG. 11C illustrates a flow chart of a process of encoding header information according to another embodiment.
Figure 11D:
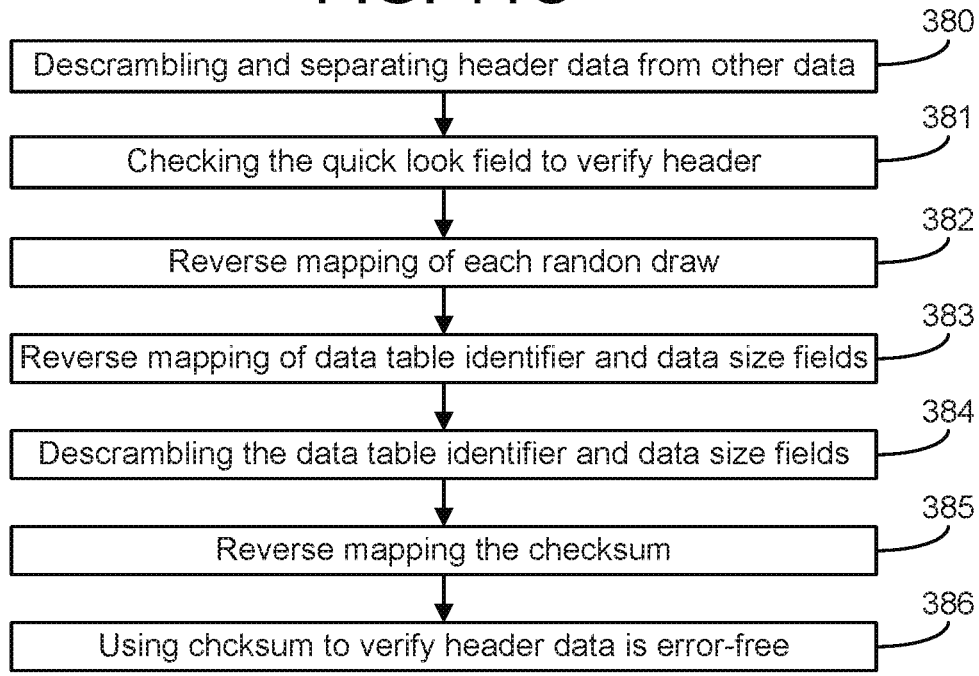
FIG. 11D illustrates a flow chart of a process for decoding header information according to another embodiment.

Referring generally to FIGS. 11C-D, the processes of encoding and decoding header information is shown in more technical detail. FIG. 11C illustrates one embodiment for encoding header information. The process includes an XOR of the header information with a PRNG sequence (370). The PRNG sequence is a sequence of pseudo-randomly generated data by the manager of the data conversion module. The process further includes calculating a checksum (371) and mapping the checksum (372). Blocks 371-372 may generally include calculating a checksum for all header data to be transmitted and obfuscating the checksum field for transmission. The process further includes a bit scrambling function for the data table identifier and data size fields (373), and a mapping of the fields (374). The process further includes mapping each random draw (375). For example, block 375 includes mapping the word1 and word2 fields as shown in FIG. 10. The process further includes calculating the quick look field (376) as described above. The process further includes concatenating the header data with the other obfuscated data and scrambling the two data sets together (377).

FIG. 11D illustrates one embodiment for decoding header information. Generally speaking, the decoding process may simply be the inversion of the encoding process. The process includes descrambling and separating the header data from the other obfuscated data (380). The process further includes checking the quick look field to verify if the header is an OCTS header (381) (or another header type that the receiver of the data is expecting to receive). A reverse mapping is applied to each random draw (382) and to the various data fields (383) upon verifying the header. The process further includes descrambling the data table identifier and data size fields (384). The process then includes reverse mapping the checksum (385), and using the checksum to verify that the header data is error-free (386).

Referring generally to FIGS. 12-25, one embodiment of the input data obfuscation process is described in greater detail. More particularly, the input data obfuscation module 108 and activity of the data conversion module 102 of the sender 100, and the input data deobfuscation module 160 and activity of the data conversion module 152 of the receiver 150 are described in greater detail. The input data is generally the data desired to be transmitted by the sender 100 to the receiver 150. The input data may be of any size or type configured to be encoded by the sender 100. The input data obfuscation modules generally obfuscate the input data to deny the ability for anyone other than the intended recipient to use or view the data. The input data obfuscation modules may either use a set of unique functions different from those used for obfuscation of the header data or for the data merging, or use the same set of unique functions as those used for header data obfuscation and/or data merging.

Figure 12A:
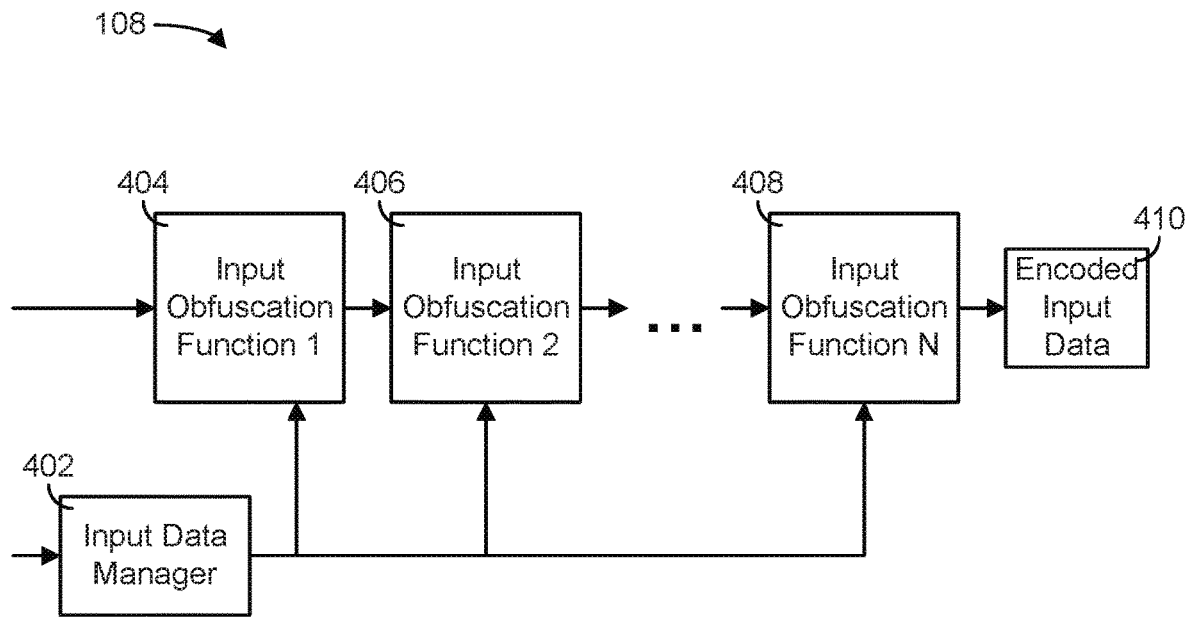
FIG. 12A illustrates a block diagram of one embodiment of obfuscating input data to be transmitted by a sender.

Referring now to FIG. 12A, a block diagram of the input data obfuscation module 108 of the sender 100 is shown. The input data obfuscation module 108 generally includes a set of functions, which may be chosen by an input data manager 402 to best match requirements for the data to be sent and the resources available for transmission of the data. The input data manager 402 is configured to determine which functions to use to obfuscate the data, and to initialize and update the data obfuscation process. The input data manager 402 may include a RNG (e.g., RNG 116 as described in FIG. 2) which may be used to randomly select the functions and one or more parameters for the functions. If an RNG is used, the generated selection needs to be passed to the receiver, whereas a PRNG could be used so that the sender and receiver can generate the same pseudo-random number using the same seed. In addition, a PRNG may be used to generate a series of bits to use in an XOR function or a bit substitution or bit transposition function.

The input data obfuscation module 108 may implement any number of functions. For example, as shown in FIG. 12A, a first obfuscation function 404, second obfuscation function 406, up to an nth obfuscation function 408 may be applied in series to the input data. The input data manager 402 may provide an input to each function to control one or more parameters of the function. Some examples of data obfuscation functions or strategies that can be used include substitution or mapping (e.g., substituting a first bit pattern in the input data with a second bit pattern), whitening (e.g., transforming the statistics of an encoded data stream to a uniformly distributed probability function), and transposition (e.g., the exchange of two or more elements of the input data). It should be understood that while the present disclosure provides various examples of such functions, in other embodiments any type of variations of these functions, or other obfuscation functions, and may be used with the systems and methods described herein.

Figure 12B:
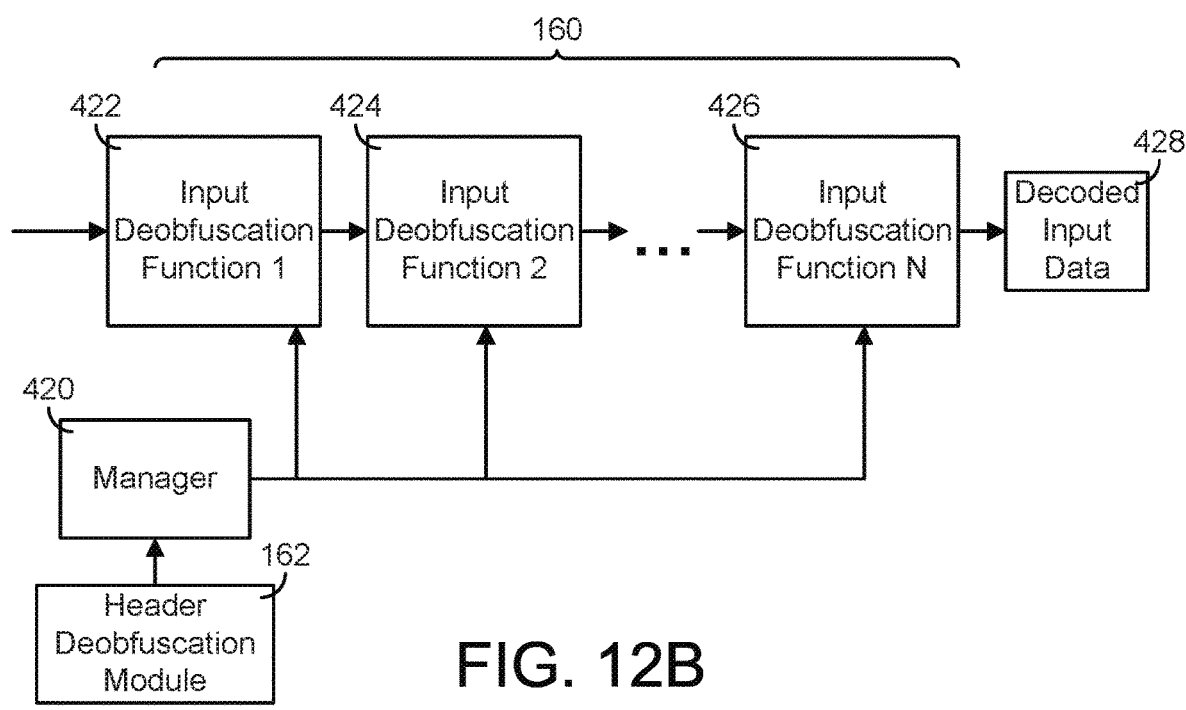
FIG. 12B illustrates a block diagram of one embodiment of deobfuscating input data for data received by a receiver.

Referring now to FIG. 12B, the activities of the receiver 150 and more particularly the input data deobfuscation module 160 is shown in greater detail. The input data deobfuscation module 160 may generally reverse the input data obfuscation performed by the input data obfuscation module 108 of the sender 100. The header deobfuscation module 162, as described above, may identify encoded header information and encoded input data from the received encoded data. A manager 420 may receive the encoded input data portion and determine the one or more functions, and parameters for the functions, used to originally encode the data. In other embodiments, the manager 420 may be a more passive module that simply makes a function call upon receiving the encoded input data portion. The input data deobfuscation module 160 may then decode the data using the input deobfuscation modules 422, 424, 426, etc., which are related to (e.g., are the inverse of) the functions used by the sender 100 to encode the data. The input data deobfuscation module 160 outputs the decoded input data 428 for use by the receiver 150.

Referring generally to FIGS. 13-20, various examples of mapping functions are shown in greater detail. The mapping functions may be applicable to the input data (or the header data) in order to obfuscate the data. It should be understood that the examples provided in the present disclosure are by way of example only, and that other mapping functions or substitution methods may be used to obfuscate the data, and that any combination of mapping functions or substitution methods may be used.

Referring to FIG. 13, a basic mapping function is illustrated. FIG. 13 illustrates a forward mapping table for encoding the input data and a reverse mapping table for decoding the input data. The forward mapping table may be used by the input data obfuscation module 108 (as an obfuscation function 402, 404, or 406), while the reverse mapping table may be used by the input data deobfuscation module 160. The forward maps and reverse maps of FIG. 13 may be presented as vector pairs as follows:
'forward map'={010 100 011 101 001 111 000 110}
'reverse map'={110 100 000 010 001 011 111 101}.

In the example of FIG. 13, the encoded value of an input value is found using the input value as the index in the forward mapping vector. For example, the element in the index 4 in the forward mapping is 1 (1 in base 10, 001 in base 2), meaning the element originally located in the index 4 in the original data is now in the index 1 in the encoded data. For the decoding via the reverse map, the index 1 is mapped to 4, meaning the element located in the index 1 in the encoded data is returned to the index 4. In other words, encode(4)=1 and decode(1)=4. The forward map and reverse map may be interchangeable, i.e., the forward map and reverse map may be flipped and used as the opposite map.

A forward map may be created using, for example, a shuffle function configured to reorder vector elements. In one embodiment, the shuffle function is driven by the RNG or PRNG as described above. The probability for each element in a n-element vector to be mapped to a specific index is 1/n, where each element is mapped to a different index. Referring to FIG. 14, an indexed sort that may be generated by the shuffle function is illustrated. After shuffling the elements in the input data (i.e., the contents column) as shown in the forward map, an increasing order sort is applied to the input data (i.e., the contents column), with the index column elements slaved to the content column. The reverse map is then generated from the indexed sort by exchanging elements in the two columns as shown. The basic mapping function may include a map verification process (i.e., verifying that decode(encode(x))=x for all elements). The embodiment shown in FIG. 13-14 illustrate an example derived in base 2, with n bits and $2^n$ elements. In other embodiments, the tables may be derived for index values and input data values in any base ch such that the number of possible elements is $ch^n$.

In various embodiments, the forward mapping and reverse mapping may be constructed offline and presented to the data conversion module 102 as a full table, or may be generated based on input from the manager 104. For example, the forward and reverse mappings may be generated offline but may require extra overhead for providing the full mappings to the data conversion module 102, while providing additional obfuscation complexity for the encoding.

The shuffle function may have sufficient depth to make the process of searching for and cracking the shuffle process difficult. For example, for a 8 bit map, the number of elements in the 8 bit map is $2^8$ or 256. The table space for an 8 bit map is therefore 256!, =1.3122E+254. This large table space is achievable given shuffles of shuffles. For example, the process of shuffling may be distributed across several data centers, with one data center reshuffling the shuffled tables of a second data center.

In various embodiments, the tables included in the mapping functions may include 4, 8, or 16 bit words. Such sizes may make efficient use of 16 bit words to be encoded. However, in other embodiments, the methods herein may be applied for any bit size. From an obfuscation perspective, it would be difficult for an adversary to determine table size by simply observing the encoded data transmission. In addition, based on the input from the manager 104, each transmission may be encoded using a different size bit word.

Referring now to FIG. 15, data-driven obfuscation strategies are described. Implementing encoding functions that are driven by either the input data, the RNG, or another source can increase the obfuscation complexity of the obfuscation functions. The data driving the encoding functions may be sampled from a single frame such that each frame can stand alone, or may be sampled from previous frames.

One way to have a data-driven mapping function is to offset the index to each table entry. For example, a single value offset may be selected based on the input data and applied to the values in the mapping functions. In FIG. 15, an offset value=3 is applied to index 4 in the forward and reverse mapping. The equations representing the offset applied to the mappings are below:

offset_value=3, x=4.

The offset_encode is performed against the modulo sum of the encode index+offset_value.

offset_encode(4)=encode((4+3)% 8)=encode(7)=6, where $x \% y$ denotes the value of x in modulo y.

The offset_decode is evaluated as offset_decode(6)= (decode(6)+8−offset)% vector_element_count.

In this case, the offset_decode is offset_decode(6)= (decode(6)+8−offset)% 8=(7+8−3)% 8=12% 8=4.

In some embodiments, instead of using a fixed offset for an entire frame, the offset may be a function of multiple variables for the frame. The offset for a given value x may be as follows:
encode(x)='Forward map'[(x+offset)%(sizeof('Forward map')], where
offset=(element index*random draw)%(sizeof('Forward map'), and
$x \% y$ denotes the value of x in modulo y.

This function provides a unique offset for each element of each full frame on an element-by-element and frame-by-frame basis. Once the offset is determined, the encode and decode functions may be similar to the ones shown in FIGS. 13-15. Note that many techniques may be used to generate the offset term. In some embodiments, a non-linear offset function may be used to create the offset term. As an example, a modulo function may be used, as shown in the example equation above. By using a non-linear offset function, a forward mapping may be created that does not have a unique reverse mapping, increasing obfuscation.

One example of having the offset being a function of multiple variables is shown in FIGS. 16A-E. As shown in FIG. 16A, to encode the message ("hello"), an ascii-encoded message is created and is expanded to its binary coding. The message is blocked off in three bit chunks for three bit data driven mapping. The three bit chunks are shown converted into base 10, an index count is established for each chunk, and an offset for each is computed. The offset is computed via the following equation: offset=(Random draw*index) %Table_size (where % represents the modulo function). A value (x+offset)%Table_size is computed, and the encode table (shown in FIG. 16B) is used to find the value encode [(x+offset)% Table_size].

For decoding by the receiver, the decode table (generated using the encode table and shown in FIG. 16B) can be used to find each decode[message element]. An index count is established for each three bit chunk at the receiver, and the offset (offset=(Random draw*index)% Table_size) is computed again. A value x=(decode[message element]+Table_size−offset)% Table_size is computed, and the value x is converted back to its three bit binary representation, which is then converted back to ascii. The table of FIG. 16C illustrates an example of decoding the data that was encoded in FIG. 16A using a data driven map function.

The tables of FIGS. 16D-E illustrate obfuscation features of the mapping functions described herein. Both tables illustrate a message with all zero bits for encoding. In the table of FIG. 16D, a random draw value of 29 is received for encoding; in the table of FIG. 16E, the random draw value is 19. As a result of a different random draw value, a different offset is calculated for the original message, resulting in a different encoded output despite the original message being the same.

In some implementations, asymmetric tables may be implemented with the forward mapping and reverse mapping functions. Asymmetric tables may be used for mapping functions for n input bits to m output bits, where n>m (e.g., a one-to-many mapping). The following is an example two bit input, three bit output mapping:
'forward map'={010 100 011 101 001 111 000 110}
'reverse map'={11 10 00 01 00 01 11 10}.

Referring to FIGS. 17A-C, an end-to-end illustration of encoding and decoding a message using asymmetric tables is shown. In FIG. 17A, the ascii message is shown expanded to its binary coding and split into two bit chunks (and converted into base 10). Each index is computed as (2*input+(x % 2)). The encode table is then used to find encode [index], resulting in the encoded data. The resulting encoded data is shown split into three-bit sequences, each such sequence corresponding to a two-bit sequence in the original data. FIG. 17B illustrates the generated encode table and decode table for the given values.

For decoding, shown in FIG. 17C, the decode table is used to find each decode[message element]. Each encoded value is decoded and then is converted back to its two bit binary representation, and then back to ascii. The decode table is generated to ensure that the decoding functions map to the encoding functions used to encode the data. The decode table may be generated by, for example, an outside server (e.g., a policy server as described below). Note that the external data used to drive the data-driven coding in this method is required for the encoding only, as compared to the data-driven map of FIGS. 16A-E, which required knowledge of the external driving data for both the encode and decode functions.

Referring to FIG. 18, two additional asymmetric tables are shown to illustrate examples of the encode and decode table generation. In the examples, after the contents column is shuffled, an increasing order sort is performed on the contents column, with the input and index columns slaved to the content columns. The reverse map is then generated from the indexed sort by renaming the columns. The contents column becomes the index column, and the input column becomes the contents column. In each example, the resulting table (the reverse map) is the decode table for the original encode table (the forward map).

Since the input is only two bits for the input, there are only four unique elements that can be mapped into the three bit, eight element output. This enables each input element to be mapped to two outputs in this embodiment. In case 1, this can be implemented by repeating each input element as it occurs (e.g., 00, 00, 01, 01, etc.). In case 2, this can be implemented by repeating the entire sequence of input elements (e.g., 00, 01, 10, 11, then back to 00). In various embodiments, any type of sequence of input bits may be used in a similar manner.

In mathematical terms, for case 1, the data driven transform from input to index in FIG. 18 is index=(input*2+(x % 2)), where x is the data driven input, and in general index=input*$2^{m-n}$+(x % $2^{m-n}$).

The asymmetric tables may have an overhead associated with them, since the number of input bits is always less than the number of encoded bits. Overhead is measured as Overhead=(output bits−input bits)/input bits, measured in percent. For example, for 8 input bits and 10 output bits, the overhead is 25%. The overhead percentage range may vary from 0% to 50% based on the number of input bits and output bits.

As described in FIGS. 17-18, the asymmetric table was used to obfuscate the input data based on its one-to-many (n-to-m) encoding and the difficulty of resolving the many-to-one (m-to-n) decode. An alternative is to purpose the m-n bits to error control coding instead. Two examples of error control codes that can be used are BCH codes and LDPC codes. While the present disclosure describes the use of BCH codes, it should be understood that any type of error coding scheme may be used.

Error control coding may be implemented using an OCTS (optimized code table signaling) table, with the table generation based on binary BCH codes. BCH codes are described as (n, k, t) codes, where n is the block length in bits, k is the number of information bits, and t is the number of bits in error that can be corrected. The n block length sets the size of the OCTS table, which is of length $2^n$ (i.e., if n=7, there are 128 entries in the OCTS table; if n=15 there are 32768 entries.

| n | k | t | $2^n$ | Code rate (k/n) | Correction rate (t/n) |
|---|---|---|---|---|---|
| 7 | 4 | 1 | 128 | 0.571 | 0.14286 |
| 15 | 11 | 1 | 32768 | 0.733 | 0.06667 |
| 15 | 7 | 2 | 32768 | 0.467 | 0.13333 |
| 15 | 5 | 3 | 32768 | 0.333 | 0.20000 |

Figures 20A, 20B:
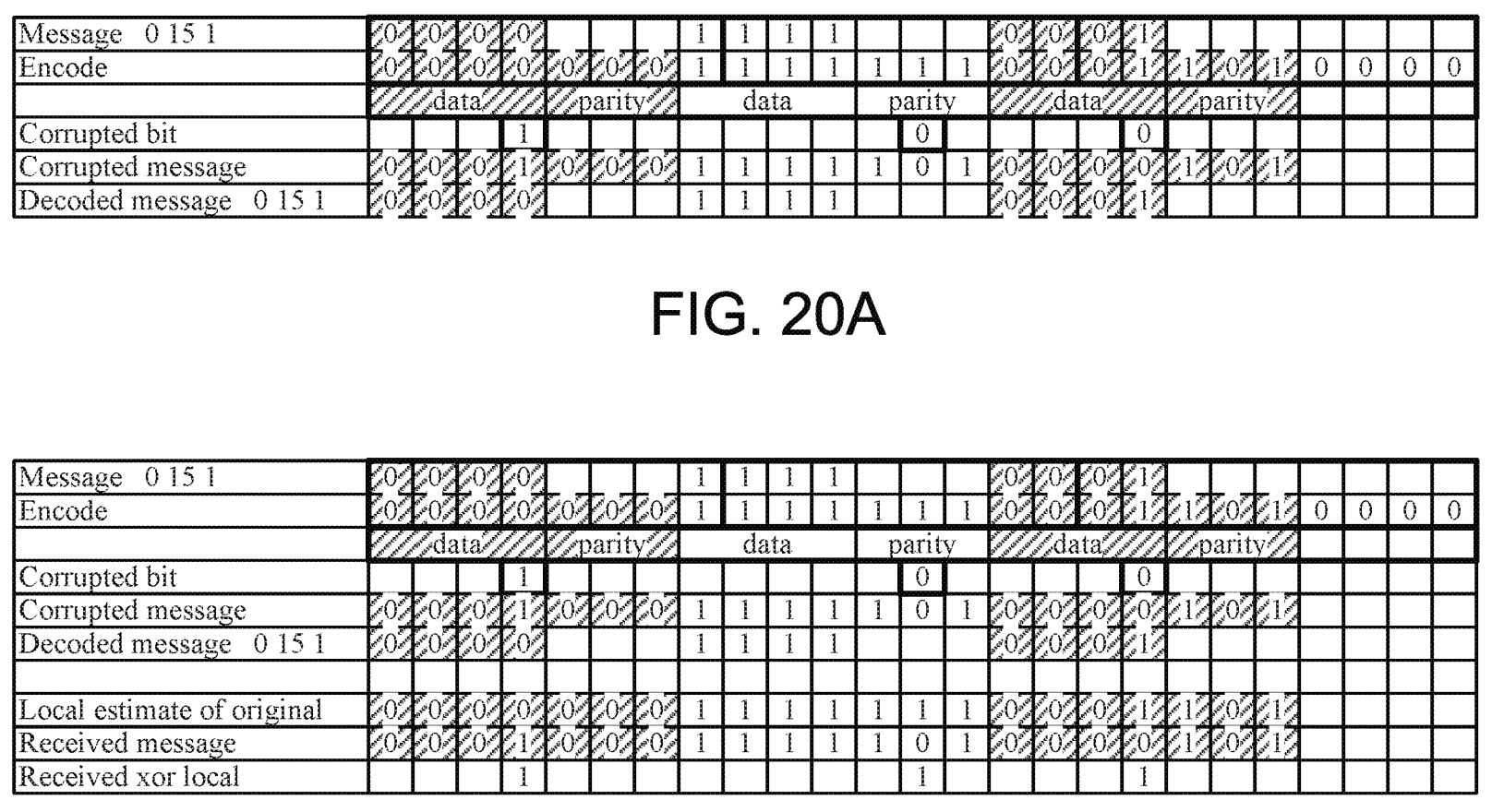

FIG. 19 illustrates a partial encode/decode table for the BCH encoding. Note that the earlier example of an asymmetric table encoded only two bits, but generated a full three bit output table. The BCH encode generates a full 7 bit output, but generates only a 16 element table rather than a full 128 element table. FIG. 20A illustrates the correction of a corrupted data stream using the asymmetric table of FIG. 19.

The LDPC code implementation may be similar; it is performed as a computation instead of as a table lookup. The error correcting capability can be used by the receiver to estimate the number of received bits in error. The process, as illustrated in FIG. 20B, is to create a local estimate of the original message by encoding the error corrected decoded message, and differencing this local estimate against the received bits. The estimate is accurate as long as the number of errors is within the limit of error correction. In the case of uncorrected errors, the estimate could be high but still useful if used to decide whether or not to change code rate to reduce the error count.

Referring again to FIG. 12A, another example function that may be implemented to obfuscate the data may be a whitening function. A whitening function may be used to transform the statistics of any encoded data stream to a uniformly distributed probability function, thus whitening the statistical measures. One technique for whitening is to create a sequence of pseudo-randomly, chosen bits equal in length to the stream to be obfuscated, and create a bit-wise XOR of the randomly chosen bits and the data to be whitened. Another technique for whitening the output can be accomplished using the one-to-many mapping by keeping track of the bits being used to represent each symbol for encoding. If encoding a symbol using one of the many mappings would result in the bit stream looking less uniform, then one of the alternative mappings may be chosen instead.

Figure 21B:
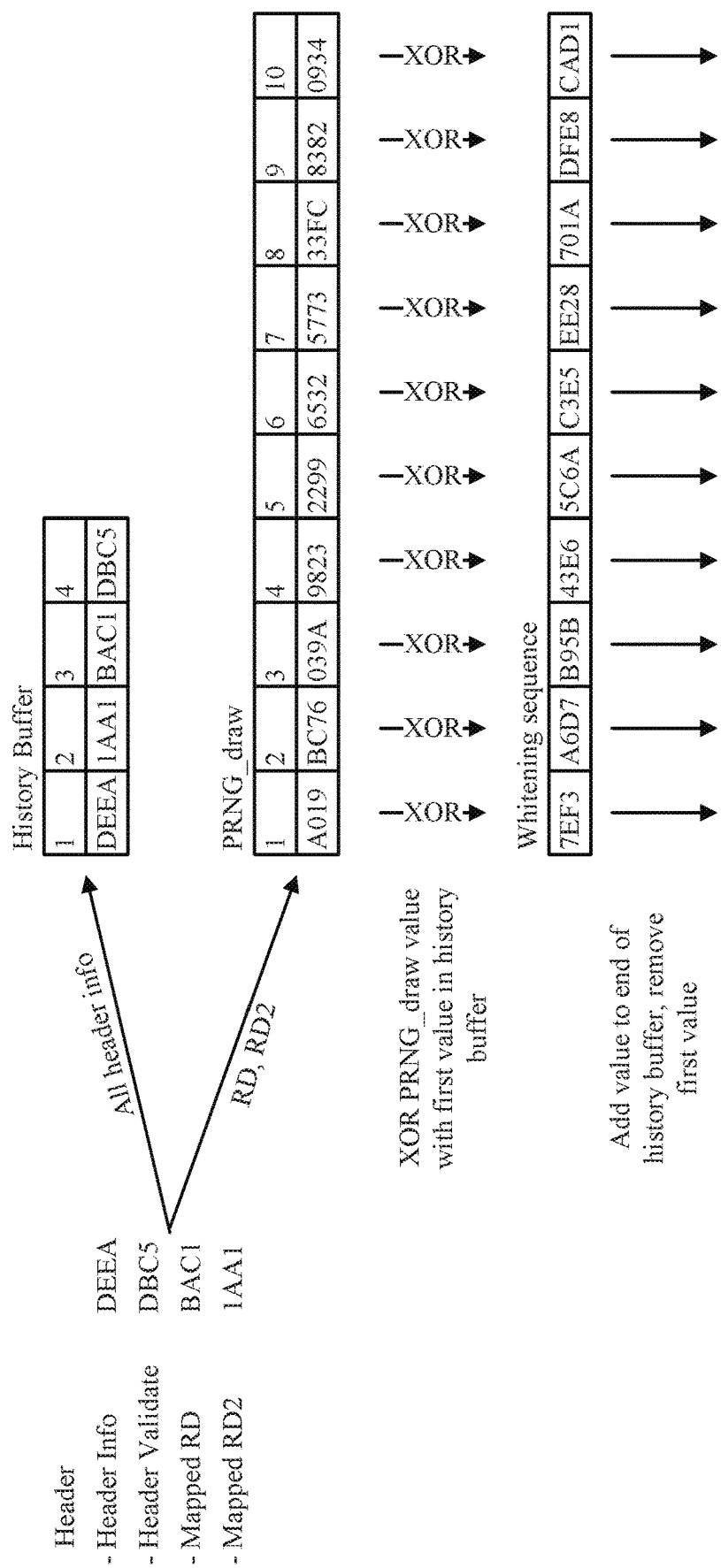
FIG. 21B illustrates the whitening function of FIG. 21A with additional detail.

Referring now to FIGS. 21A-B, an example implementation of a whitening function is shown. FIG. 21A shows how to generate the whitening obfuscation data and FIG. 22 shows how to apply the whitening obfuscation data to the data input to obfuscate the data input. In one embodiment, the initial load of the history buffer is derived from the header information. The initial load may consist of the entirety of the header information or a subset of the header information. The initial load may be loaded in the same sequence as the bits appear in the header or may be scrambled (i.e., an exact correlation between the initial load into the history buffer and the header information is not required). Furthermore, the initial load may be derived from the unobfuscated header information, which would increase the security by requiring deobfuscation of the header information before the whitening function could be applied. In the example shown in FIGS. 21A-B the initial load consists of 64-bits from the header information (DEEA DBC5 BAC1 1AA1). The buffer may further include other values derived from one or more header data properties (e.g., time of day).

A PRNG is initialized at the manager 104, and is duplicated at the decoder manager 154, such that the PRNG of each generates an identical sequence of values (referred to in FIGS. 21A-B as PRNG_draw). The receiver is able to determine the seed value used for the PRNG at the sender based on information provided in the header. As shown in FIG. 21B, a portion of the header data (e.g., the random draw ("RD") data) may be used as an input to the PRNG. In other words, bits from the header data may drive the random number generation process. In another embodiment multiple random draws may be used for a single PRNG to generate a longer sequence of bits. In yet another embodiment, multiple PRNGs may be used with the same seed for each PRNG. In yet another embodiment, multiple PRNGs may be used with different seeds each.

The whitening function starts by taking the first block in the history buffer (DEEA) and the first block of the PRNG_draw (A019) and applying the XOR function. In the present example the result is 7EF3. In other embodiments, blocks other than the first block in each buffer may be XOR-ed together; the present embodiment illustrates the use of the first block in each for simplicity. The resulting value 7EF3 is then XOR-ed with the data sequence.

The newly generated value (7EF3) is added to the end of the history buffer, while the other values move up and the first value DEEA is removed. One of skill in the art would recognize that the history buffer could be implemented as a circular buffer as well where the newly generated value replaces the value most recently used and the pointer indicating the next value to be used is simply updated to point to the next value in the buffer. Further, the value from the PRNG_draw used (A019) is removed. Then the process repeats, where the first values (now 1AA1 and BC76) are XOR-ed together. This process repeats until all values in the PRNG_draw have been used.

In various embodiments, the process may be executed for any size of data other than 16 bits at a time as shown above. The process may be executed for 32-bit chunks, 12-bit chunks, etc. At the end, if there is an odd number of bits remaining (less than 16 bits remaining when 16 bits at a time are being used), data may be processed on a bit-by-bit basis.

The decoder uses the same seed values (in the example of FIGS. 21A-B, the mapped RD obtained from the header) to generate an identical sequence of pseudo-random values. This sequence of pseudo-random values generated at the decoder is merged with the received data using another XOR function, revealing the original data stream.

Referring again to FIG. 12A, another example function that may be implemented to obfuscate the data may be a transposition function (also referred to as a pack function in the present disclosure). Such a function may be used in situations to disrupt a pattern of ascii-encoded text, where the first bit of each alphanumeric character is a 0. As an example, in FIGS. 22A-B, two examples of a second source for packing the eighth bit is shown. The first example is the last byte of the message to be encoded, and the second example is a byte brought in to serve as a frame count for communications between the sender and receiver. Other sources of packing data may be used, such as a PRNG.

Figures 22A, 22B:
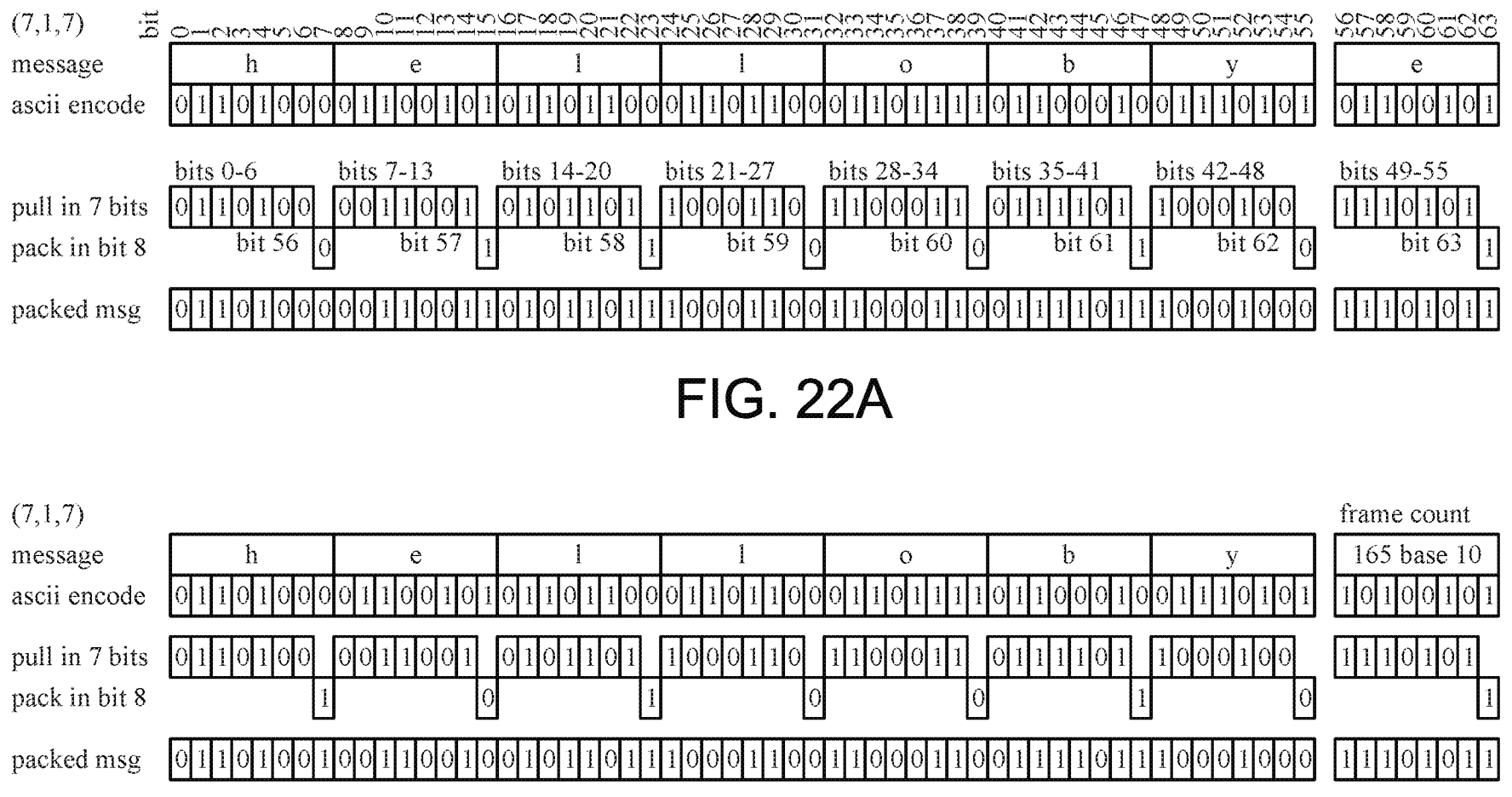

In the basic example of FIGS. 22A-B, the general process is to move bits 0-6 of the ascii encode into bits 0-6 of the packed message, and to move bit 56 of the ascii encode into bit location 7 of the packed message. In other words, the first 7 bits of the ascii encode are taken, then the first bit from the seventh byte is inserted. This process is repeated, pulling the next seven bits from the ascii encode (the primary source) and then the next bit from the seventh byte (the secondary source).

The nomenclature is shown of the form (a, b, c) where the basic unit of encoding is (a+b) bits in length, and a bits are brought in from the primary source and b bits are brought in from the secondary source. Note that in the embodiments shown in FIGS. 22-25, a+b is equal to 8 in all examples; in other embodiments other bit lengths may be used with the algorithms described herein. For example, the values for a and b may be chosen arbitrarily. The identifier c defines the starting bit location for the packed bit or bits (with 0 as the base index in this example). The c value should be in the range of (0, . . . , a+b−1). In FIGS. 22A-B, a=7, b=1, and c=7 As shown, the letter 'e' is shown in the $7^{th}$ position, indicating that the bits representing the letter 'e' will be used in the transposition function. The first bit of 'e' is moved to the $7^{th}$ position of the first letter in the message (since a=7), the second bit of 'e' is moved to the $7^{th}$ position of the second letter in the message, and so forth. Each bit not being transposed is simply moved down a spot to make room for the transposed bits.

Figures 23A, 23B:
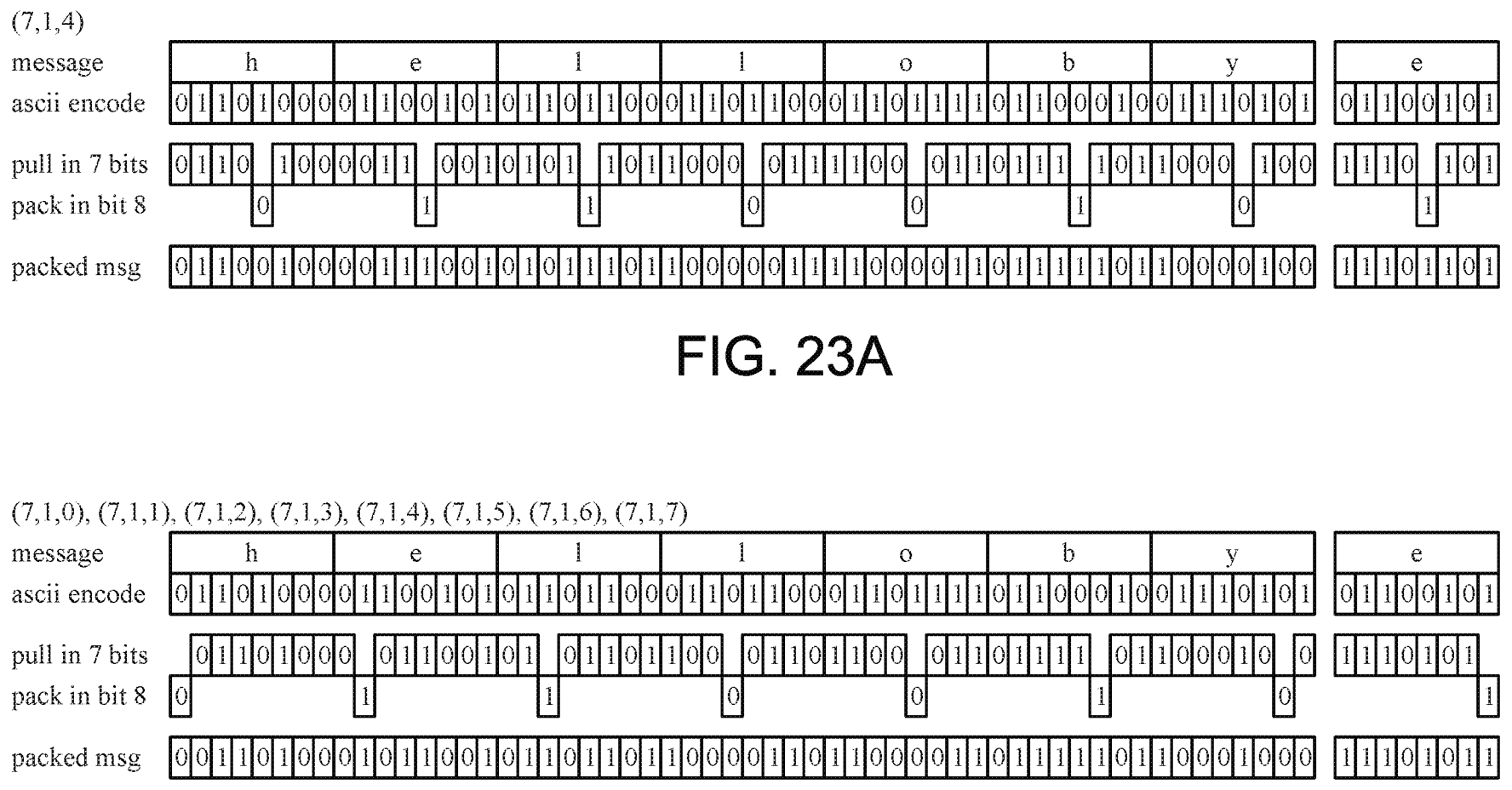

In FIGS. 23A-B, examples are shown where the eighth bit is packed in a location other than index 7. In the embodiment of FIG. 23A, the packed bit is placed in index 4 only (since c=4). In other words, the bits of the letter 'e' to be transposed are moved to the $4^{th}$ position in each byte. In FIG. 23B, the packed bit is stored in sequential index locations (c=0, then 1, then 2, and so forth). In other words, the one bit of the letter 'e' to be transposed to each byte are placed in different defined locations in the byte. This pattern is shown as sequential; in other embodiments the pattern may be randomized in any way.

Figures 24A, 24B:
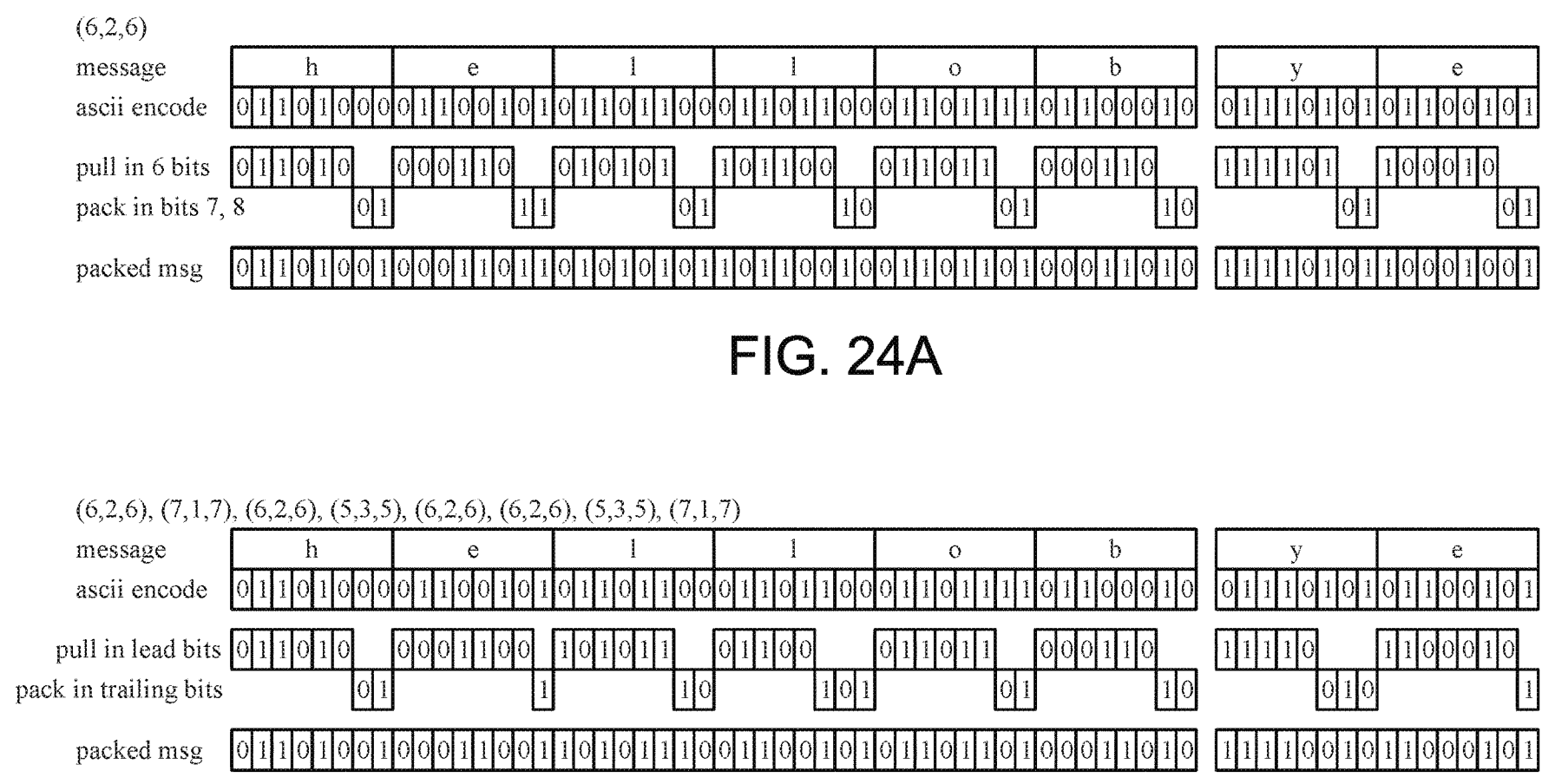
Figure 25:
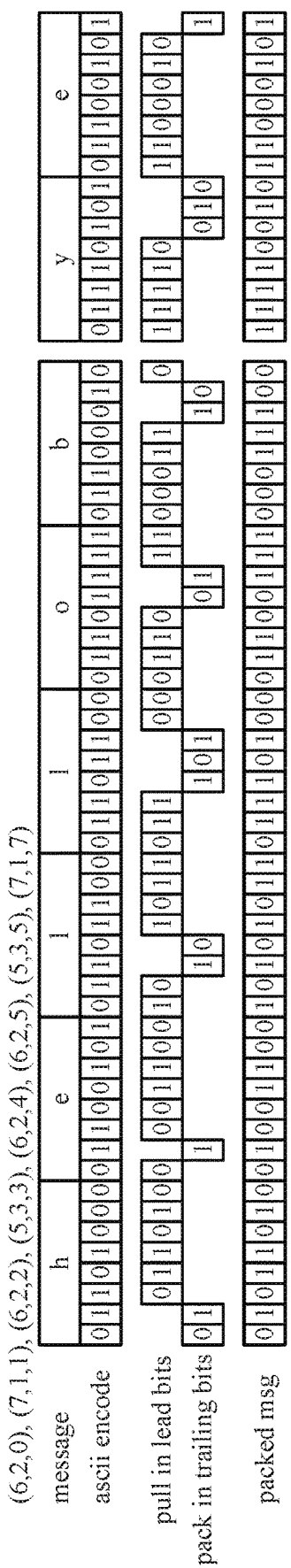
FIG. 25 illustrates a transposition function for obfuscating input data by inserting a bit into a bit sequence, according to another embodiment.

In FIGS. 24A-B, examples are shown where a different number of bits are pulled from the first or primary source. In the embodiment of FIG. 24A, 6 bits are brought in from the primary source, and therefore 2 bits are brought in from the secondary source. In other words, comparing to the other examples, bits from the 'y' segment are used as well as the bits in the 'e' segment. Two bits are shown transposed into each byte. In FIG. 24B, for each sequence of 8 bits, either 5, 6, or 7 bits are brought in from the primary source (i.e., the number of bits brought in is variable from one sequence to the next). For example, two bits are brought into the first byte, one bit into the second byte, two bits into the third byte, and so forth. Note that the total number of bits transposed across the entire data packet in this example should equal the number of bits in the last two bytes from which the bits are being retrieved. FIG. 25 illustrates an additional degree of freedom for specifying pack functionality (changing the value of c, which defines where the transposed bits are inserted within each byte). FIG. 25 illustrates the function as a streaming function, where the value of c changes over time.

The following table illustrates the use of the (a, b, c) format the use of the streaming format on a side-by-side basis. The left side of the table illustrates the (a, b, c) format where each row specifies the consecutive (a, b, c) values which identify the specific pack function. The pack streaming schedule area on the right side is also shown. It is interpreted as follows: in the first row, pull 0 bits from the primary source and store in the output buffer and pull 2 bits from the secondary source and concatenate the bits into the output buffer. This is continued for all rows until the pack streaming schedule is exhausted. The mapping function to convert from the (a, b, c) format to the pack streaming schedule is identified in the center columns.

|   | (a, b, c) format | | | Primary source calculator | Secondary source | Pack streaming schedule | |
|---|---|---|---|---|---|---|---|
|   |   |   |   |   |   | Primary source | Secondary source |
| 1 | 6 | 2 | 0 | c1 | b1 | 0 | 2 |
| 2 | 7 | 1 | 1 | a1 − c1 + c2 | b2 | 7 | 1 |
| 3 | 6 | 2 | 3 | a2 − c2 + c3 | b3 | 8 | 2 |
| 4 | 5 | 3 | 3 | a3 − c3 + c4 | b4 | 7 | 3 |
| 5 | 6 | 2 | 4 | a4 − c4 + c5 | b5 | 6 | 2 |
| 6 | 6 | 2 | 5 | a5 − c5 + c6 | b6 | 7 | 2 |
| 7 | 5 | 3 | 5 | a6 − c6 + c7 | b7 | 6 | 3 |
| 8 | 7 | 1 | 7 | a7 − c7 + c8 | b8 | 7 | 1 |
|   |   |   |   | a8 − c8 |   | 0 |   |

The table below illustrates a implementation of adding a data driven function for additional complexity. For this implementation, the full set of the (a, b, c) formatted packs may be modified as a function of a variable external to the pack function itself.

In this example, data driven pack changes are kept within a block, such that higher level management of resources is not impacted by the dynamic low-level data-driven changes. For example, in the table below, the groups of four (a, b, c) values is treated as a block, and the sum over the a's in a block is 24 and the sum over the b's in a block is 8, thus aligning well with byte-oriented management.

|   | a | b | c | Primary source calculator | Secondary source | Primary source | Secondary source |
|---|---|---|---|---|---|---|---|
| 1 | 6 | 2 | 0 | c1 | b1 | 0 | 2 |
| 2 | 7 | 1 | 1 | a1 − c1 + c2 | b2 | 7 | 1 |

-continued

| | a | b | c | Primary source calculator | Secondary source | Primary source | Secondary source |
|---|---|---|---|---|---|---|---|
| 3 | 6 | 2 | 3 | a2 − c2 + c3 | b3 | 8 | 2 |
| 4 | 5 | 3 | 3 | a3 − c3 + c4 | b4 | 7 | 3 |
| | 24 | 8 | | (sum over first block of four entries) | | | |
| 5 | 6 | 2 | 4 | a4 − c4 + c5 | b5 | 6 | 2 |
| 6 | 6 | 2 | 5 | a5 − c5 + c6 | b6 | 7 | 2 |
| 7 | 5 | 3 | 5 | a6 − c6 + c7 | b7 | 6 | 3 |
| 8 | 7 | 1 | 7 | a7 − c7 + c8 | b8 | 7 | 1 |
| | 24 | 8 | | (sum over 2nd block of four entries) | | | |
| | | | | a8 − c8 | | 0 | |

A candidate strategy for implementing a data driven pack is to set the following as the base table shown below, and to implement changes against the base. The derivation may be as follows:

Design for a block of four entries, denoted as the base table. This table is designed such that the (a, b) pairs of the data driven table are from the set ((7, 1), (6, 2), (5, 3)). This is accomplished by setting all base table (a, b) pairs as (6, 2), and modifying the pairs by (+1, −1), (0, 0), or (−1, +1).

Design for eight variations of the pack table, to be driven by a three bit binary word generated external to the data driven pack table.

Design such that the sum of a's across the block remain 24, and the sum of b's across the block remains 8.

Design such that each (a, b) pair sums to 8. In this specific case, this reduces to a change of 1 to either a or b must be accompanied by a change of −1 to b or a respectively.

Design such that the c values are in the range (0, a+b−1). The following table is created using these constraints.

| | Base Table | | | | Table element changes as a function of data | | | | | | | | | | |
|---|---|---|---|---|---|---|---|---|---|---|---|---|---|---|---|
| | a | b | c | Data | a1 | b1 | c1 | a2 | b2 | c2 | a3 | b3 | c3 | a4 | b4 | c4 |
| 1 | 6 | 2 | 0 | 0 0 0 | +1 | -1 | +0 | | | +3 | -1 | +1 | +1 | | | +2 |
| 2 | 6 | 2 | 0 | 0 0 1 | | | +1 | +1 | -1 | +5 | | | +7 | -1 | +1 | +6 |
| 3 | 6 | 2 | 0 | 0 1 0 | -1 | +1 | +2 | | | +7 | +1 | -1 | +5 | | | +0 |
| 4 | 6 | 2 | 0 | 0 1 1 | | | +3 | -1 | +1 | +1 | | | +3 | +1 | -1 | +1 |
| | 24 | 8 | | 1 0 0 | | | +4 | +1 | -1 | +2 | -1 | +1 | +0 | | | +5 |
| | | | | 1 0 1 | | | +5 | | | +4 | +1 | -1 | +6 | -1 | +1 | +3 |
| | | | | 1 1 0 | -1 | +1 | +6 | | | +6 | | | +4 | +1 | -1 | +4 |
| | | | | 1 1 1 | +1 | -1 | +7 | -1 | +1 | +0 | | | +2 | | | +7 |
| | | | | Data | a1 | b1 | c1 | a2 | b2 | c2 | a3 | b3 | c3 | a4 | b4 | c4 |
| | Example 1 | 1 | 1 | 0 | 5 | 3 | 6 | 6 | 2 | 6 | 6 | 2 | 4 | 7 | 2 | 4 |
| | Example 2 | 0 | 0 | 1 | 6 | 2 | 1 | 7 | 1 | 5 | 6 | 2 | 7 | 7 | 1 | 6 |

As a standalone strategy, the pack functions insert bits into the encoded stream but do not change the order of the bits. Therefore, the above strategies may be paired with a function that transposes the order of data, which would make the obfuscation scheme much stronger, especially if the size of the elements that are transposed is prime with respect to any sequence of elements in the pack function.

Referring again to FIG. 12A, an input obfuscation function 404 may be a prefix unique forward and reverse mapping function. The purpose of prefix unique forward and reverse maps is to establish the capability to provide families of hardware-unique data conversion module platforms. As described above, in for example FIG. 13, a forward map and reverse map pair are shown. The mappings may be extended to include prefix forward and reverse maps. For example, as shown in FIG. 26, a prefix forward map and prefix reverse map may similarly be generated.

The top four tables in FIG. 26 may be convolved to create a new pair of forward and reverse maps, where the process of convolving is to use forward mapping to map an index to its contents and to use the prefix map to use the contents as the index into the prefix forward map. The forward map is convolved into the prefix forward map, and working backward the prefix reverse map is convolved into the reverse map.

Figure 27A:
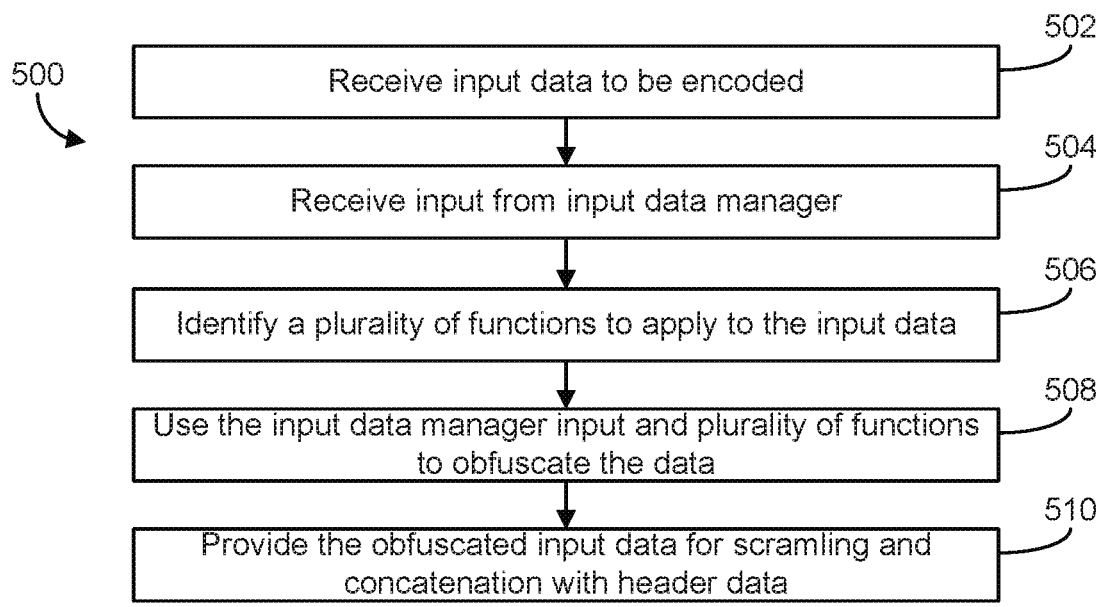
FIG. 27A illustrates a flow chart of a process for encoding input data.

Referring now to FIG. 27A, a flow chart of a process 500 for encoding input data is shown, according to an exemplary embodiment. The process 500 may be executed by, for example, the input data obfuscation module 108. The process 500 includes receiving the input data to be encoded (502) and an input from the input data manager (504). In one embodiment, the input from the input data manager includes one or more randomly selected values from an RNG. For example, the input from the manager may include a selection of one or more functions to use to obfuscate the data, and one or more randomly chosen values to be used by the functions. The values may be, for example, a string of bits to insert into the input data, to combine with the input data (e.g., via a XOR function), or otherwise.

The process 500 includes identifying a plurality of functions to apply to the input data (506) and using the input data manager input and functions to obfuscate the data (508). For example, block 508 may generally include obfuscating the input data via a first function and the input from the input data manager, then providing the obfuscated data to a second function for further obfuscation. This may continue for any number of functions. The process 500 further includes providing the obfuscated input data to another module for scrambling and concatenation with header data (510). As described above, input data and header data are obfuscated separately at two different modules and then combined and scrambled at a third module. In some embodiments, one or both of the header data and input data may include the information necessary for a decoder to decode the data at the receiver.

Figure 27B:
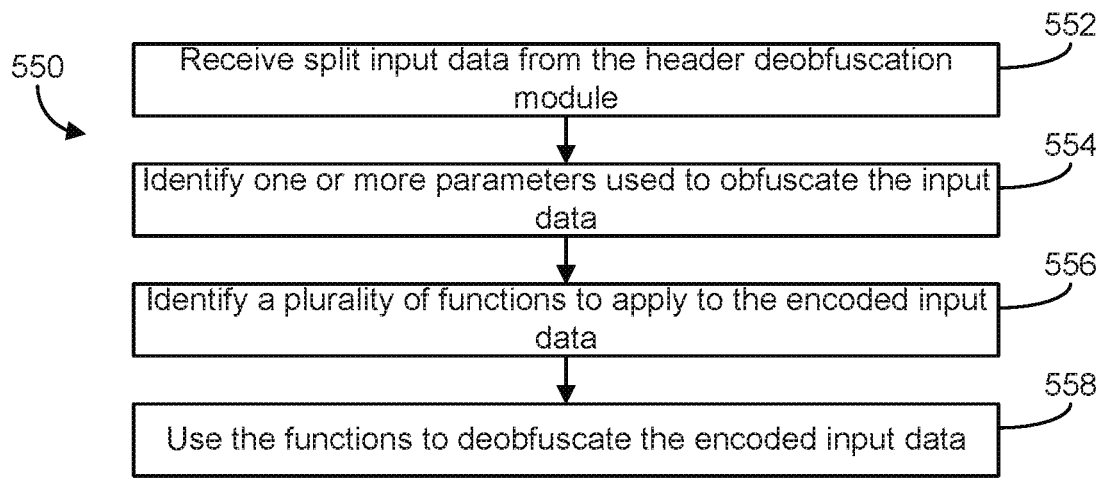
FIG. 27B illustrates a flow chart of a process for decoding input data.

Referring now to FIG. 27B, a flow chart of a process 550 for decoding input data is shown, according to an exemplary embodiment. The process 550 may be executed by, for example, the input data deobfuscation module 160. The process 550 includes receiving split input data from the header deobfuscation module (552). As described above, the header deobfuscation module may receive an encoded data packet from the sender and may be configured to split the encoded data into an encoded input data portion and an encoded header data portion. Block 552 may include receiving the encoded input data portion that was returned to a descrambling module and splitting module.

The process 550 further includes identifying one or more parameters used to obfuscate the input data (554), identifying a plurality of functions to apply to the encoded input data (556) and using the functions to deobfuscate the data (558). Blocks 554, 556, 558 may generally represent the inverse of the process of obfuscating the data. For example, blocks 554, 556, 558 generally include identifying how the sender encoded the data and reversing the process that the sender used.

In some embodiments, a padding function may be used during data obfuscation. A padding function may generally be used for a data set when the data set is not large enough for sufficient complexity (i.e., the data set is small enough such that the data is vulnerable no matter the number of obfuscation functions applied or the data set is an inconvenient length for certain functions). A padding function may fill the buffer with random values until a threshold is reached for the data. For example, if the data length of a data packet to be obfuscated is less than a minimum such as 200 bytes, the data is padded with pseudorandom values to fill the data packet to the minimum length. Padding may typically be done before an additional obfuscation function, to ensure that the pseudorandom values added are not directly exposed.

When a padding function is used, the receiver of the data transmission determines if the data was padded. For example, if the current frame size is greater than a data size value sent as part of the header information, the difference in bit size may represent the number of padded bits added to the data. For example, if a 1300 byte word is received by the receiver and the data size value is 1233, the receiver may determine that a 67 byte padding was added to the data. The last 67 bytes of the data transmission are then dismissed before the data deobfuscation. The padded data may be added to the end of the data in one embodiment; in other embodiments the padded bits may be added in any location as long as the receiver is able to distinguish which bits are the padded bits.

Figure 28A:
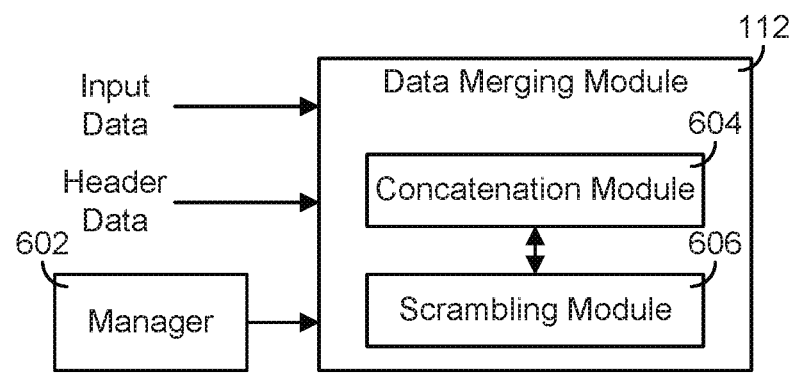
FIG. 28A illustrates a block diagram of one embodiment of concatenating and scrambling header data and input data at a sender.
Figure 28B:
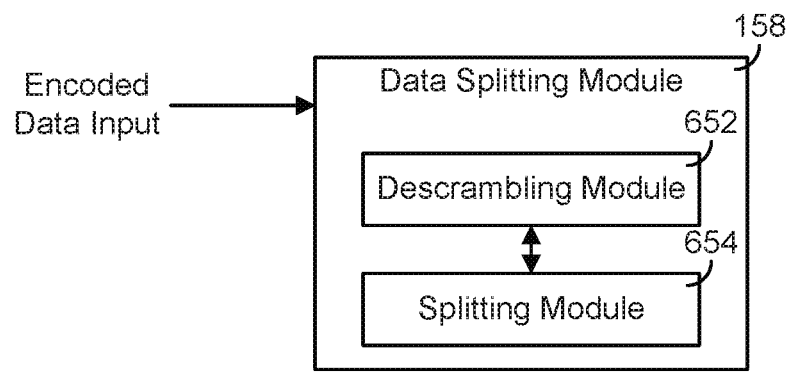
FIG. 28B illustrates a block diagram of one embodiment of descrambling obfuscated data received at a receiver.

Referring now to FIGS. 28A-B, a concatenation and scrambling process for obfuscating data to be transmitted by a sender 100 to a receiver 150 is described. As generally described above, header data and input data for a data packet to be transmitted may be obfuscated separately using various functions. Each of a header obfuscation module 110 and input data obfuscation module 108 may independently obfuscate data and provide the data for transmission. However, before the data is transmitted, a third obfuscation step may occur where the header data and input data are combined together, concatenated, and scrambled. FIG. 28A illustrates a data merging module 112 configured to receive the data and an input from a manager 602 (e.g., similar to header information manager 126). The input from the manager 602 may generally include parameters and other information related to the obfuscation of the header data, which may help a receiver determine one or more functions or parameters for deobfuscating the data.

The data merging module 112 may generally include a concatenation module 604 and a scrambling module 606. The concatenation module 604 may generally be configured to join the two data sets, and the scrambling module 606 may generally be configured to scramble bits from the two data sets together, such that bits from both data sets are intertwined. The scrambling module 606 may implement any number or type of scrambling functions as described below. It should be understood that any number of different functions may be used to obfuscate the combined bits from two data sets. While the data merging module 112 shows two modules 604, 606 for merging the data, it should be understood that any number of different functions may be used to merge the data sets together in various embodiments.

Referring to FIG. 28B, a data splitting module 158 is configured to receive an encoded data input from the sender 100. The data splitting module 158 is configured to descramble the received data and then split the descrambled data into a header data portion and an input data portion. The data splitting module 158 is shown to include a descrambling module 652 and splitting module 654. The descrambling module 652 may descramble the data based on one or more pre-determined parameters. For example, the parameters may be pre-determined parameters received from a policy server before the sender 100 began the data transmission process. After descrambling the data, the splitting module 654 is configured to split the data into a header data portion and input data portion.

Referring now generally to FIGS. 29-34, various functions for concatenating and scrambling the two data sets (the header data set and input data set as described above) are described in greater detail. After the header data and input data are obfuscated independently, a third module may add further obfuscation by combining the header data and input data and obfuscating the data as a single data packet to be transmitted. As described in the present disclosure, one such way of obfuscating the header data and input data together is to scramble the bits of both data sets together into a single data set. In some embodiments, the order of scrambling may be driven by one or both of a forward mapping function or by a table of randomly generated values (e.g., RNG values) used to perform successive swaps of data. A receiver can then use a vector-defined reverse mapping function or the table of randomly generated values to decode the data before splitting the data into input data and header data.

The data merging process generally adds another layer of obscurity to the encoded data stream to be transmitted. The scrambling portion of the process may be performed on any number or size of bits (e.g., scrambling data by the bit, by the byte, by two byte pieces, etc.). The complexity of the obfuscation is increased if the rate for bit transposition is prime with respect to the bit rate for the bit scrambling.

The concatenation function may involve two steps: concatenating the OCTS header data elements into a specific order, and concatenating the OCTS header data with the obfuscated input data. The OCTS header data is created in the header data obfuscation module as described above, and the concatenation of the header data with the input data is performed ahead of the scramble function. Prior to the scrambling, the OCTS header data either directly leads or follows the input data. If the header data leads the input data, processing of the header data can start as soon as it is received, thus reducing latency by not having to wait for the full frame of information to arrive before processing. In the case of not being able to process the frame until it has completely arrived, as in a TCP/IP protocol, the header data follows the input data and a memcopy function is used to copy the data during processing.

The scrambling function may be adjusted for complexity and frame element arrival times. For example, for a 1500 byte frame, the number of ways it can be scrambled byte-wise is 1500!, the number of ways it can be scrambled bit-wise is (8*1500)!, and the number of ways it can be scrambled two-byte-wise is (1500/2)!.

The scrambling and descrambling functions that can be used by the encoder and decoder may be similar to the forward mapping and reverse mapping functions described earlier. For example, the scrambling and descrambling functions may be represented as vector pairs. Referring to FIG. 29, an example scrambling function is shown for a data frame with 27 elements (6 header elements and 21 input data elements). For each element, a scrambling mapping and descrambling mapping (labeled as forward and reverse mapping in FIG. 29) is shown. The forward map is used to scramble the data and the reverse map is used to descramble the merged data at the receiver to return the data to its original order.

Similar to that described above, the forward and reverse scrambling mappings may be convolved. Unique prefix forward and reverse mapping vectors may be used to create a mapping specific to an identified user or device. Referring to FIG. 30, an example convolved forward and reverse scrambling mapping is illustrated. The forward mapping and prefix forward mapping are used to create the convolved forward mapping, and the reverse mapping and prefix reverse mapping are used to create the convolved reverse mapping.

Referring generally to FIGS. 29-30, the scrambling mappings may be generated in such a way as to guarantee that data elements relating to header data are kept in a certain position to ensure that the receiver can separate the header data from the input data. For example, a mapping may be created that keeps all header data packets within the first n packets. The value n may be application based and chosen by a manager of the sender and/or receiver. This may allow the receiver to more quickly or easily separate the header data from the input data.

Figure 31:
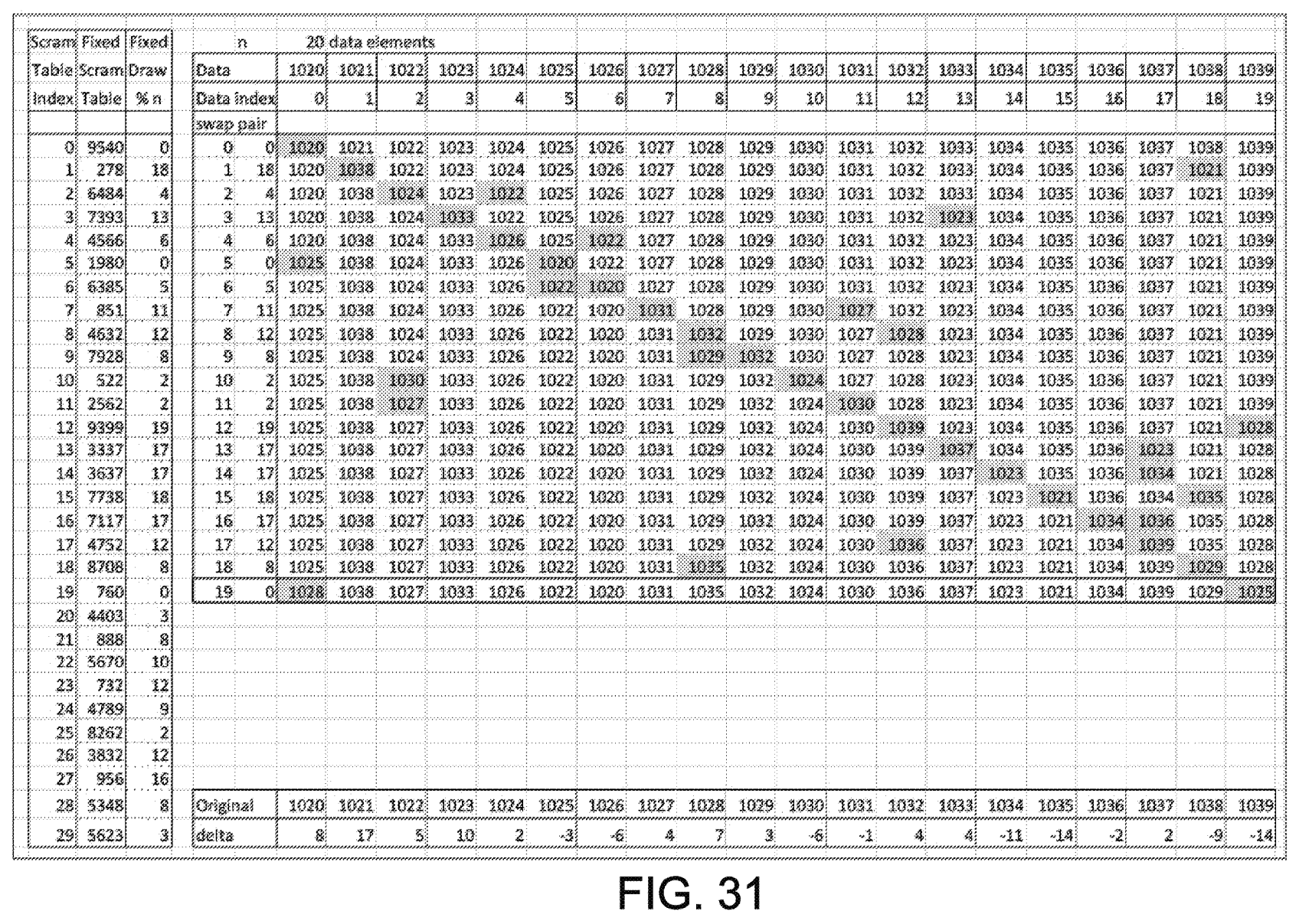

In some embodiments, a table of randomly generated values may be used to determine how to scramble the data. The scrambling function identifies the swaps of indexed values within the data stream, with the swap indices based on the random values in the tables. The table may be available to both the sender and receiver. A base example of a scramble table implementation is shown in FIG. 31. In the example of FIG. 31, the vector to be scrambled is a 20 element vector (listed at the top in FIG. 31 for illustrative purposes).

To perform a scrambling function using the table, a fixed draw vector is created by calculating the fixed scramble table modulo the data element count for each index. A swap pair is then created for each index by pairing the index with its fixed draw. Starting with the first index and iterating through all the indices, the swap identified by the swap pair is performed. In the example of FIG. 31, the first swap pair is a null pair, swapping the contents of data[0] with data[0]. The second swap pair swaps the contents of data[1] and data[18]. As shown in the figure, the $n^{th}$ swap pair swaps the contents of data[n−1] with the contents of data[fixed scramble table[n] % number of data elements]. Thus, for the $20^{th}$ swap the contents of data[19] would be swapped with the contents of data[760% 20]. Therefore the contents of data[19] would be swapped with the contents of data[0]. Note that the swaps are progressive such that data[0] before any swaps have taken place may contain a different value than data[0] at the nth iteration. Therefore, the nth swap results in swapping the value contained in data[n−1] after all swaps from 0 to n−1 have been completed. This implementation can be used for any data vector length up to the length of the fixed scramble table, and provides a unique scrambling for each data vector length since the swap pair is dependent on the length of the data vector. Thus given two data vectors, one containing 19 data elements and one containing 20 data elements where the first 19 data elements are identical would result in different swaps even given the same fixed scramble table. Based on the table shown in FIG. 31, the second swap for a 20 element data vector would result in swapping data[1] and data[18] (278% 20=18), but the second swap for a 19 element data vector would result in swapping data[1] and data[12] (278% 19=12).

Figure 32:
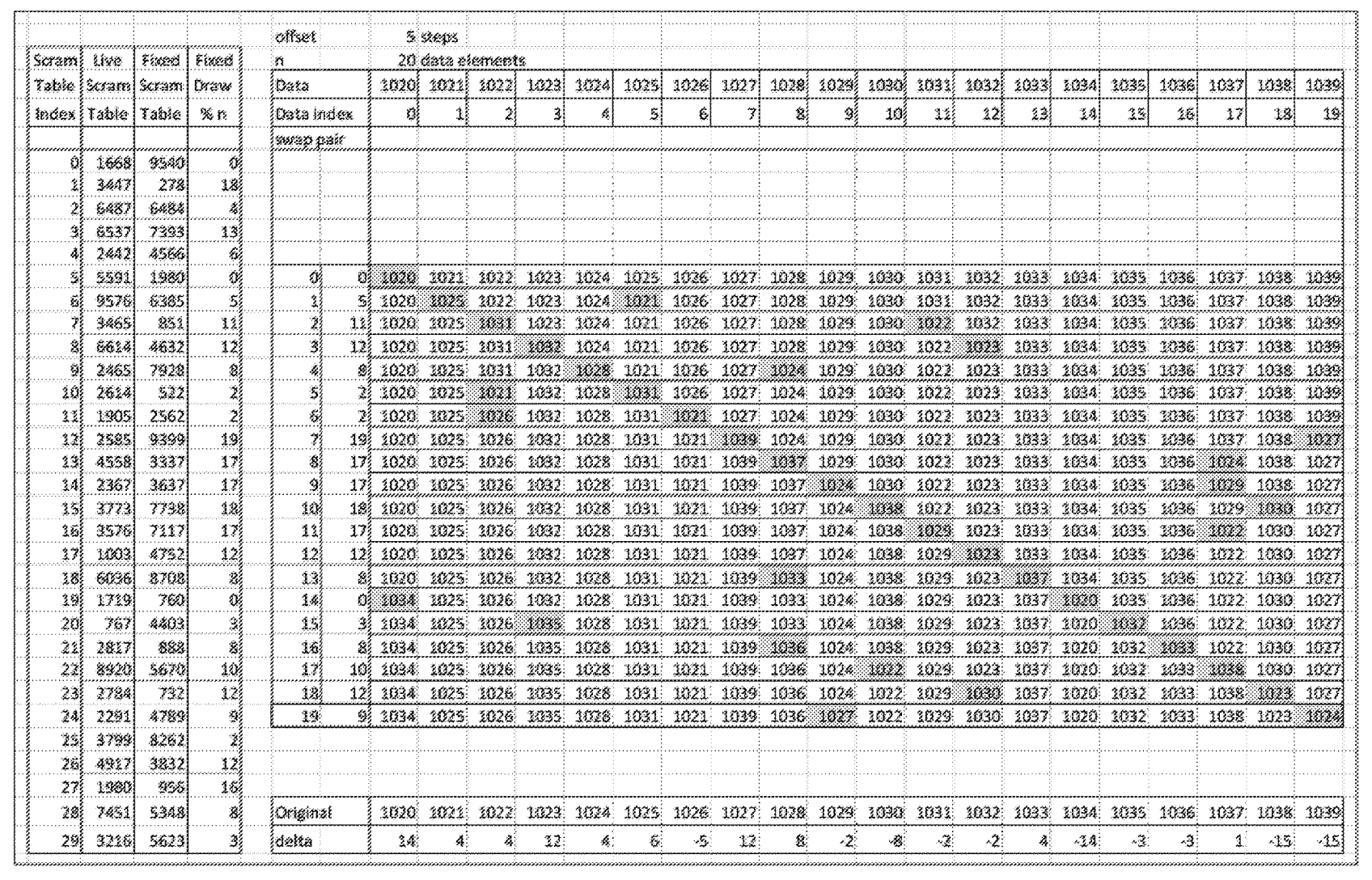

Referring to FIG. 32, a second example scrambling table is shown. In this embodiment, an offset term is used to identify the starting point in the fixed scramble table. For example, instead of performing the first swap at index 0, the swaps may begin at any of the indices. The offset may be a data driven offset, thus creating a unique scrambling of the data not only for each data vector length, but also for each chosen offset. For example, a pseudo-random value generated by a PRNG may be used as the offset. The pseudo-random value may be generated such that both the encoder and decoder can generate the same random value from the PRNG given the same input. Alternatively, if a random number is used as the offset by the encoder, it needs to be passed to the decoder to use.

Figure 33:
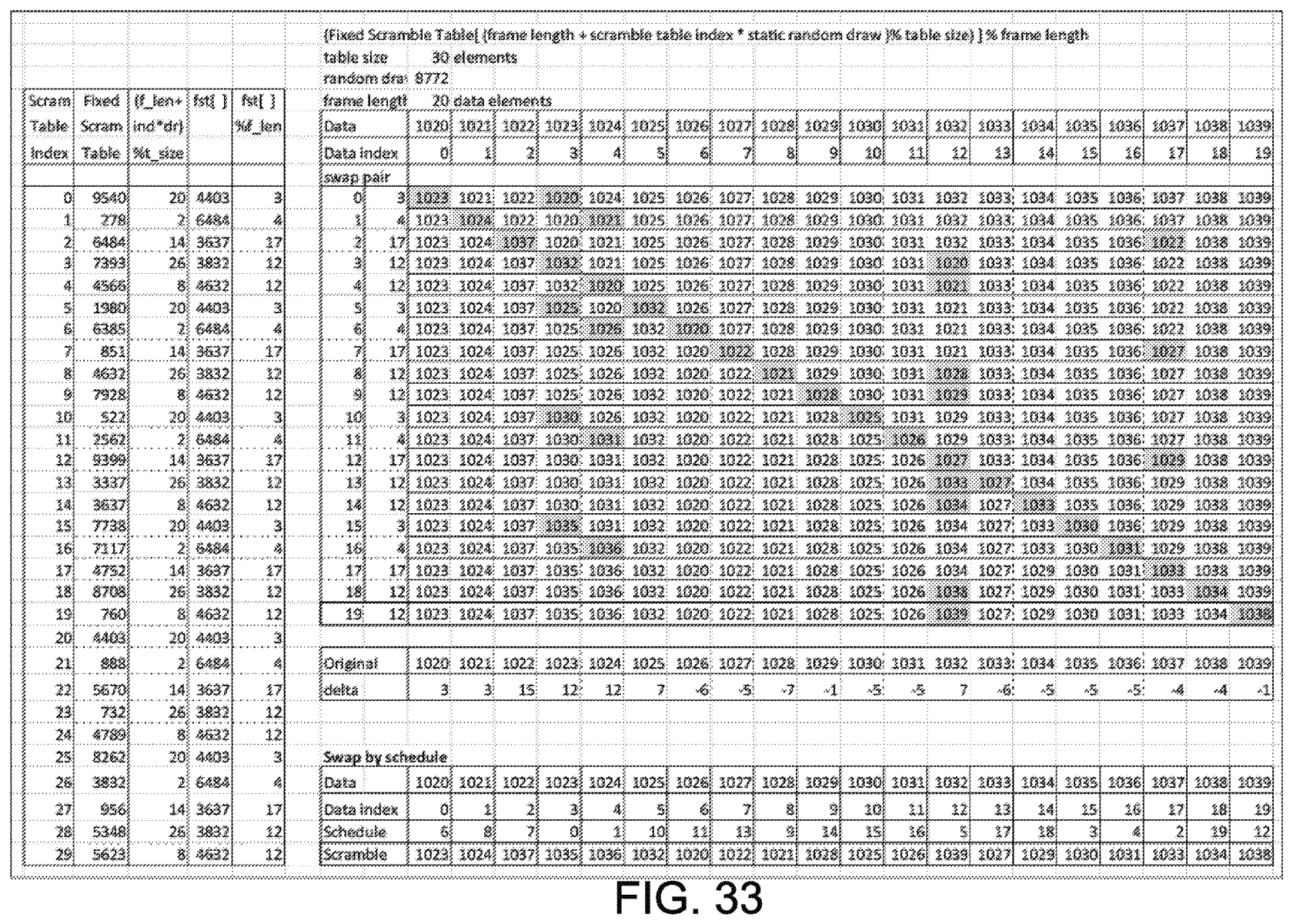

Referring to FIG. 33, a third example scrambling table is shown. In the example of FIG. 33, the number of terms included in the offset term evaluation is increased, thus increasing the table space spanned using a single fixed scramble table.

Figure 34:
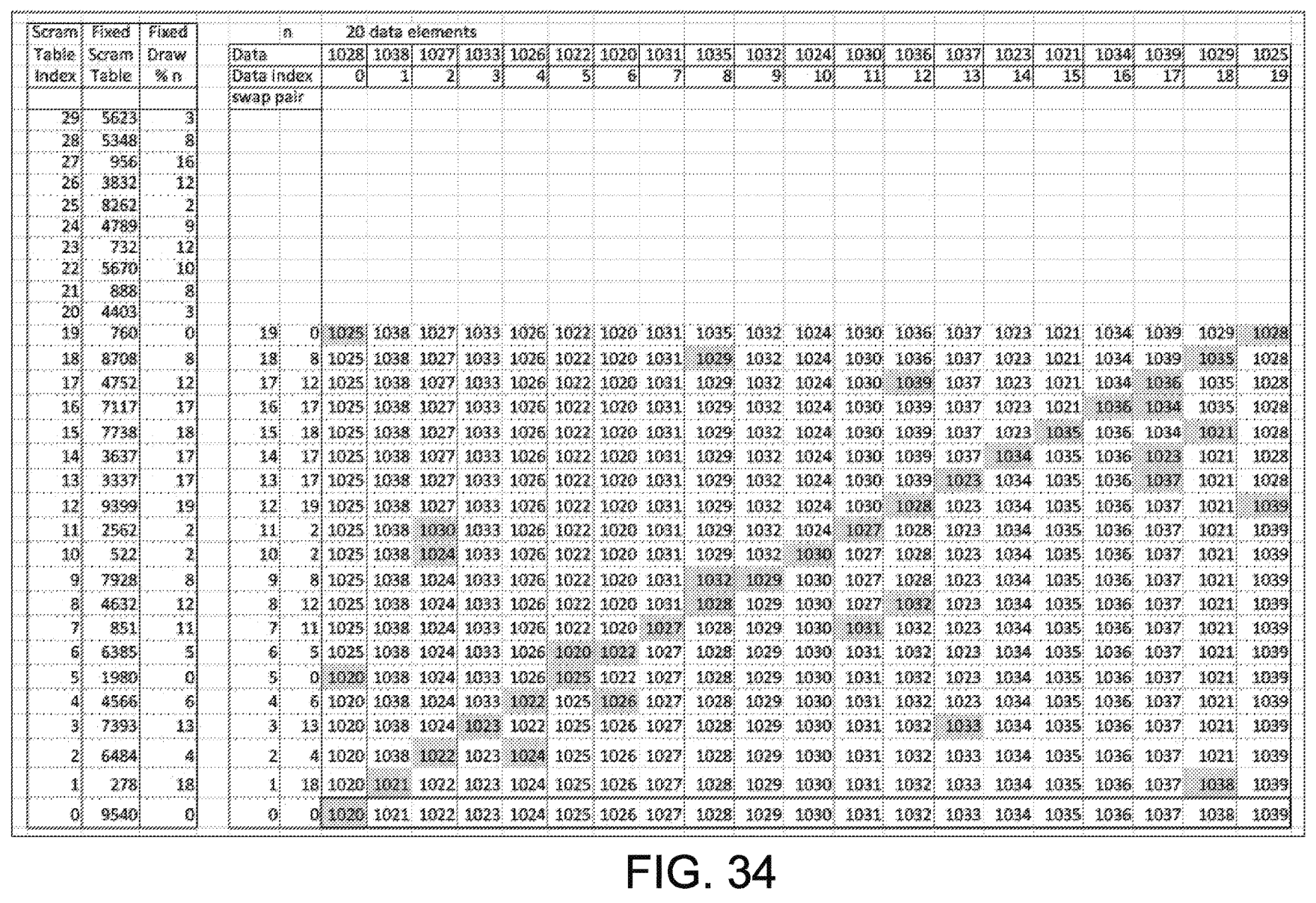

Referring to FIG. 34, an example descrambling table is shown. The descrambling table is based on the scrambling table shown in FIG. 31 (i.e., the table of FIG. 34 is used to descramble data scrambled by the table of FIG. 31). The process to descramble a received data set may generally include performing the same set of swaps during encoding the data, but in reverse order. As shown in FIG. 34, the order of the scramble table is reversed to cause the descrambling of the data.

Figure 35:
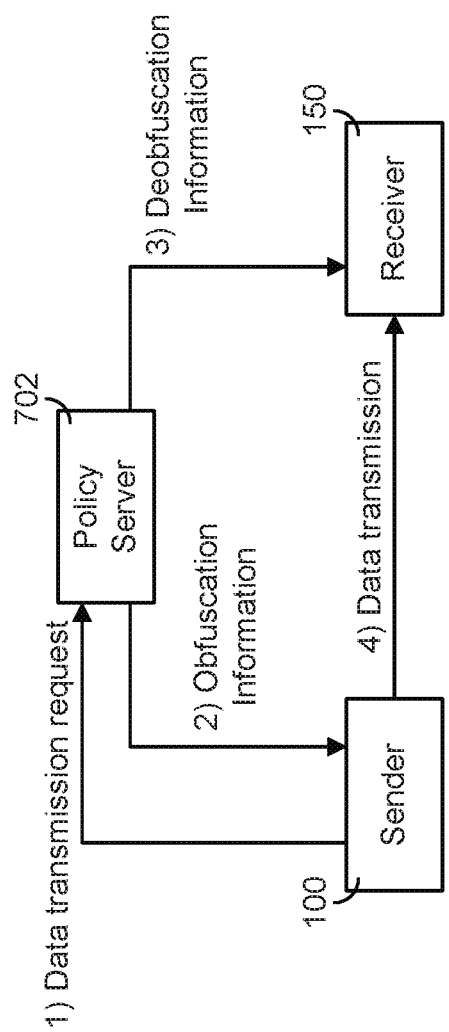
FIG. 35 illustrates communications between a sender and receiver, and a policy server configured to provide one or more keys or other parameters for data obfuscation and data deobfuscation.
Figure 36:
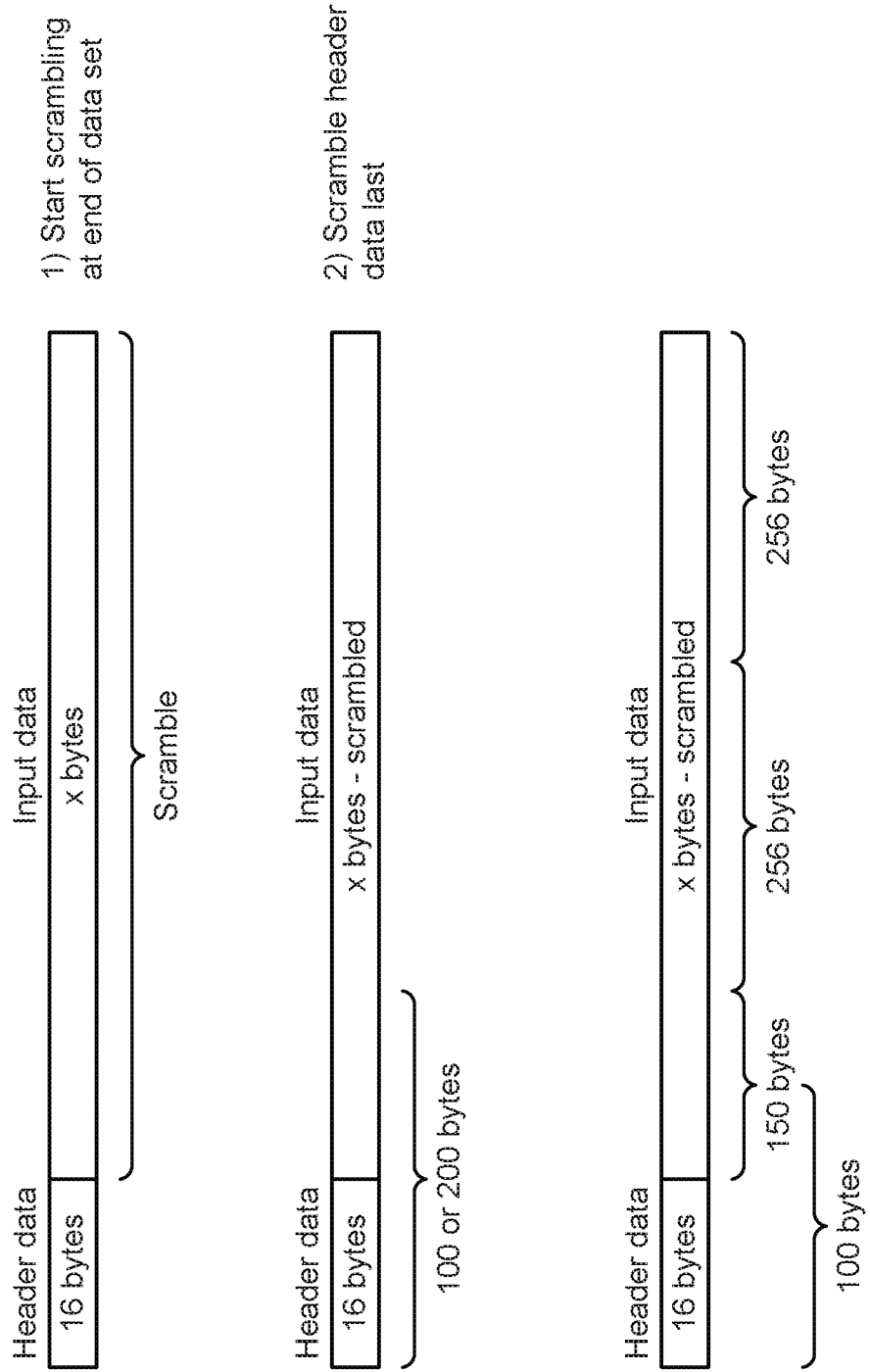
FIG. 36 illustrates a scrambling function that may be used to scramble header data with input data.
Figure 37:
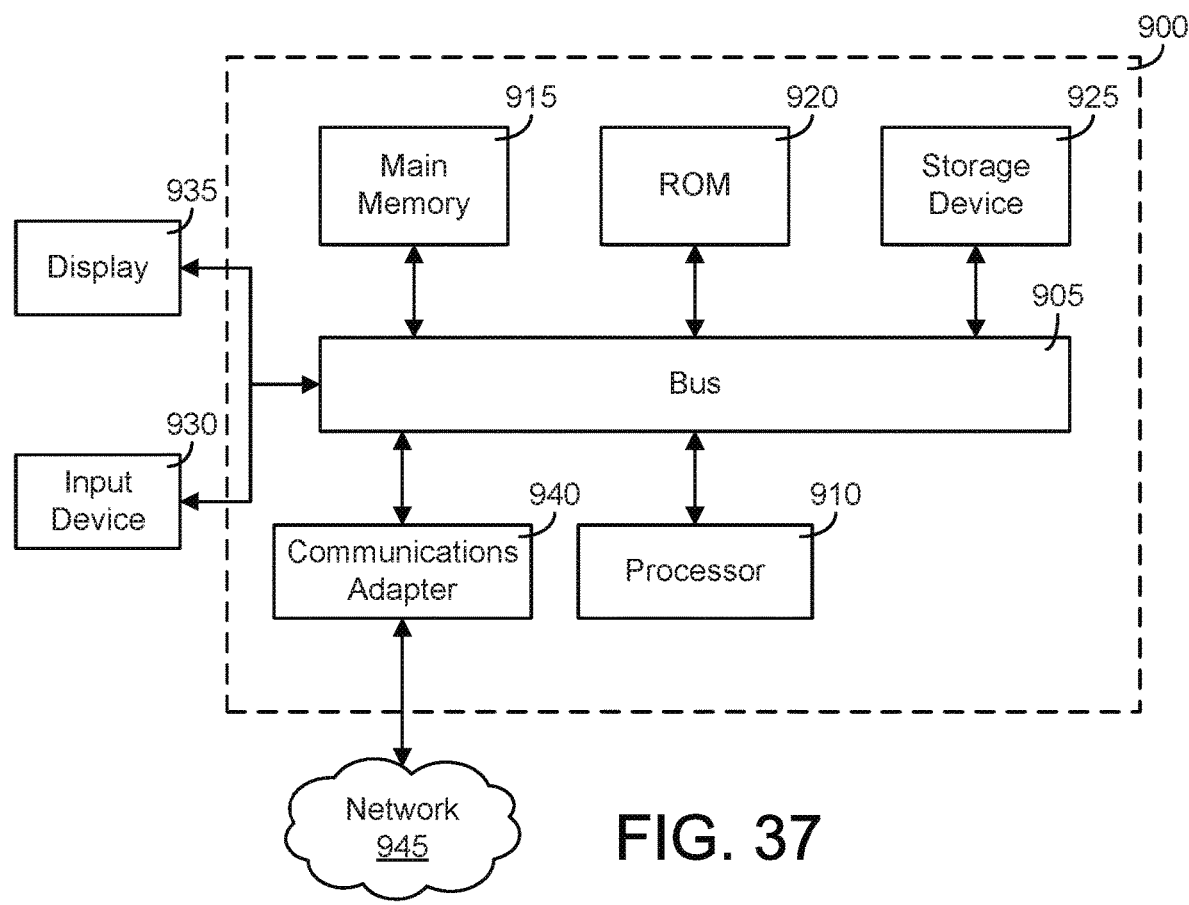
FIG. 37 is a block diagram of a computing system that may be used to implement the systems and methods described herein.

Referring generally to FIGS. 35-37, additional features that may be provided by the systems and methods herein are described in greater detail.

Referring now to FIG. 35, communications between the sender 100 and receiver 150, and a policy server 702 is shown. As described in the present disclosure, the sender 100 may obfuscate data according to a first set of functions, and the receiver 150 can only recover the original data if it deobfuscates the transmission according to a second set of functions related to the first set of functions. When data is transmitted to the receiver 150, the receiver must know which functions to use to deobfuscate the data to result in a successful transmission. Referring to FIG. 35, sender 100 and receiver 150 communications with a policy server 702 may provide the sender 100 and receiver 150 with information on which obfuscation functions and parameters to use.

In the embodiment of FIG. 35, a policy server 702 is shown in communications with both the sender 100 and receiver 150. The sender 100 may wish to establish a connection with a particular receiver (i.e., to transmit data to the receiver). In order to establish the connection, the sender 100 transmits a request to the policy server 702. The policy server 702 may determine whether sender 100 has permission to transmit data to receiver 150. If the policy server 702 determines that sender 100 may transmit data to receiver 150 it will approve the request and in response, provide data to both the sender 100 and receiver 150. For example, the policy server 702 may transmit a key, a table for use in a mapping function, multiple tables that may be used for mapping and which the sender 100 can choose between including which of the tables was chosen in the header of the data transmitted to receiver 150 or any other type of parameter or data input to the sender 100 and receiver 150. The data provided to the sender 100 and receiver 150 are related (i.e., the sender 100 may be provided a forward map and the receiver 150 may be provided the corresponding reverse map). The data provided by the policy server 702 may allow the sender 100 and receiver 150 to use the same functions and parameters when encoding and decoding data, allowing the sender to transmit encoded data that the receiver can decode without receiving specific encoding information from the sender.

The policy server 702 may limit the use of the obfuscation and deobfuscation information by the sender 100 and receiver 150. For example, the information may be assigned for only a single transmission, a single session, a maximum number of packets, or for a specific period of time. Both the sender 100 and receiver 150 are expected to enforce the limits assigned by the policy server. But at the very least the receiver 150 must enforce the limits to prevent it from processing data it is not authorized to receive. One advantage of enforcing the limitations set by policy server 702 is to further ensure that the deobfuscation information used by receiver 150 remains secure. Once the limitation set by policy server 702 has been reached, if the sender 100 wishes to send additional information to receiver 150, sender 100 may request new obfuscation and deobfuscation information (e.g., a new table) to be transmitted back to both the sender 100 and receiver 150.

Without a shared set of obfuscation and deobfuscation information, the sender 100 may be barred from communicating with receiver 150 because receiver 150 may disregard any data communication that is not in the proper format. Thus, before any communication before sender 100 and receiver 150 commences, the obfuscation and deobfuscation data must be shared with sender 100 and receiver 150 by policy server 702. In other words, during setup of the data obfuscation methods by the sender and deobfuscation methods by the receiver, no communication may actually take place between the sender and receiver. In essence, providing the obfuscation data and deobfuscation data by the policy server acts as a type of authentication for the communication between the sender and receiver. This enables the creation of groups of two or more senders and receivers who are authorized to communicate with each other, and different subgroups of two or more senders and receivers who can communicate with each other but not members of another subgroup. Each sender and receiver may communicate with the policy server 702 in order to obtain the information needed to encode and decode the data for proper transmission. The communication between the sender 100 and policy server 702, and the receiver 150 and policy server 702 may be secured via any common data encryption method (e.g., PGP). The communication between sender 100 and policy server 702, and receiver 150 and policy server 702 may also be secured via the OCTS techniques described herein.

While the policy server 702 is shown independent of the sender 100 and receiver 150, it should be understood that in other embodiments, the policy server 702 may be implemented locally at the sender 100 or receiver 150.

FIG. 36 illustrates a scrambling function that may be used to scramble header data with input data. As described above, after header data and input data are obfuscated separately, the two data sets should be concatenated and scrambled. FIG. 36 illustrates a concatenated data set with a header portion and an input data portion. The header data size is shown to be 16 bytes; of course in other embodiments, the header data size may be of any length.

Different applications may require different levels of obfuscation of the header data within the input data. For example, speed of decoding may be prioritized by ensuring that the scrambling is done in larger chunks (for example at the byte level) and that the header is scrambled relatively closer to the start of the transmission. As another example, the scrambling may be done in hardware (e.g., IC) or using parallel processors. If obfuscation is more important, then the scrambling can be done in smaller pieces (for example at the bit level) and the header data may be spread out over a larger portion of the data transmission.

As shown in FIG. 36, the concatenated data includes a first portion with header data (16 bytes) and a second portion with input data (x bytes). The data is concatenated by placing the header data first and the input data second. The sender may then initiate the scrambling function for the concatenated data. The scrambling process may start at the end of the data instead of the beginning, where the header data is. The scrambling process may continue to scramble bits from the back of the data set to the front of the data set. Alternatively, as shown in FIG. 29, another example scrambling function is illustrated showing swaps based on a table.

While it is advantageous to scramble the header data last, the header data should still be scrambled with the input data to increase obfuscation. For example, as shown in FIG. 37, the first 100 or 200 bytes of the concatenated data may be scrambled together, resulting in the 16-byte header data scrambled with the first 200 bytes of the input data. This is an alternative to scrambling the header data across the entire data set, which may be hundreds of more bytes.

In some embodiments, the concatenated data may be split into different chunks. For example, in the last example of FIG. 36, the concatenated data is split into a first chunk of 100 bytes including header data and input data, and three chunks of input data. This is compared to the scrambling of the first example where the scrambling function generally works through the data set sequentially. The data within each chunk may be scrambled by the scrambling function. The header data is scrambled with some of the input data to increase obfuscation of the data packet to be transmitted.

FIG. 37 illustrates a depiction of a computer system 900 that can be used, for example, to implement a data conversion module 102 or 152 and/or various other illustrative systems described in the present disclosure. Computing system 900 includes a bus 905 or other communication component for communicating information and a processor 910 coupled to bus 905 for processing information. Computing system 900 also includes main memory 915, such as a random access memory (RAM) or other dynamic storage device, coupled to bus 905 for storing information, and instructions to be executed by processor 910. Main memory 915 can also be used for storing position information, temporary variables, or other intermediate information during execution of instructions by processor 910. Computing system 900 may further include a read only memory (ROM) 920 or other static storage device coupled to bus 905 for storing static information and instructions for processor 910. A storage device 925, such as a solid state device, magnetic disk or optical disk, is coupled to bus 905 for persistently storing information and instructions.

Computing system 900 may be coupled via bus 905 to a display 935, such as a liquid crystal display, or active matrix display, for displaying information to a user. An input device 930, such as a keyboard including alphanumeric and other keys, may be coupled to bus 905 for communicating information, and command selections to processor 910. In another implementation, input device 930 has a touch screen display 935. Input device 930 can include a cursor control, such as a mouse, a trackball, or cursor direction keys, for communicating direction information and command selections to processor 910 and for controlling cursor movement on display 935.

In some implementations, computing system 900 may include a communications adapter 940, such as a networking adapter. Communications adapter 940 may be coupled to bus 905 and may be configured to enable communications with a computing or communications network 945 and/or other computing systems. In various illustrative implementations, any type of networking configuration may be achieved using communications adapter 940, such as wired (e.g., via Ethernet®), wireless (e.g., via Wi-Fi®, Bluetooth®, etc.), pre-configured, ad-hoc, LAN, WAN, etc.

According to various implementations, the processes that effectuate illustrative implementations that are described herein can be achieved by computing system 900 in response to processor 910 executing an arrangement of instructions contained in main memory 915. Such instructions can be read into main memory 915 from another computer-readable medium, such as storage device 925. Execution of the arrangement of instructions contained in main memory 915 causes computing system 900 to perform the illustrative processes described herein. One or more processors in a multi-processing arrangement may also be employed to execute the instructions contained in main memory 915. In alternative implementations, hard-wired circuitry may be used in place of or in combination with software instructions to implement illustrative implementations. Thus, implementations are not limited to any specific combination of hardware circuitry and software.

The systems and methods herein are advantageous over other encryption techniques, such as AES. For example, such techniques may rely on TCP/IP or other similar protocols where the protocol cares about ensuring all data packers are received and received in order at the receiver. The strength of the obfuscation may depend in part on the use of block chaining, which makes the order of transmission important. However, the systems and methods herein do not depend on frames being received in order, as each frame can stand alone with its own obfuscation strategy. This allows the obfuscation methods herein to be used for protocols such as UDP or other protocols for streaming data such as video or audio.

As generally described in the present disclosure, various tables may be used during the data obfuscation and deobfuscation process. However, it should be understood that various types of tables may be used as part of the obfuscation and deobfuscation process, and multiple tables of multiple types may be used in the same process. For example, a first type of table with a first structure may be used during a bit scrambling process, and a second type of table with a second structure may be used during a bit mapping process. The systems and methods herein may be adaptable to cause the usage of any number of different table types and structures across the various steps.

A table for use in the data obfuscation process may include any set of N elements including, but not limited to, anything physical or virtual that implements a grouping of these elements. A formal or informal protocol is not required. An element may be a single bit, any standard grouping of bits (such as a byte, word, double word, or quad word), any fixed- or floating-point binary representation, or any nonstandard grouping of bits. The elements may be represented in binary, ternary, quaternary, quinary, etc., basis representation.

A table may be represented or implemented in any format in hardware or software. For example, a table may be implemented in RAM or ROM. The memory base location may give access to the address, or row, and the offset may give access to the data, or column. As another example, the table may be implemented as a first-in first-out (FIFO) mechanism. All table elements are stored in the FIFO and are accessed by pushing or popping the appropriate number of elements. As another example, the table may be represented as a shift register. The element indices are encoded in the shift register, and may be divided among many shift registers in parallel. As another example, the table may be represented as an array or vector of values, or multiple vectors or arrays combined, with the first index holding the first element, the second index holding the second element, and so forth. As another example, the table may be implemented as a binary, text, or formatted document, such as an XML document. As other examples, the table may be implemented in a lattice structure, state machine, modulator/demodulator, digital signal processors (DSPs), etc.

As further examples, the table may be implemented in any type of software implementation. As one example, the table may be implemented as a lookup table as generally shown in the figures, where accessing the table at a certain index gives access to the element at that index. As another example, the table may be implemented as a binary search tree (or another data structure). The input string determines the path of the data from the start node of the tree, and the output of the table operation is given after the leaf node is reached. As other examples, the table may be implemented in software as a virtual memory map, bit stream, stack, array or vector, matrix, XML document, text document, binary file, etc.

Referring to the previous figures and description, systems and methods for data obfuscation are described for obfuscating data for transmission between devices. Referring now to the subsequent features, systems and methods for managing data communications between the multiple devices are described. More particularly, a key distribution process is described for providing a protocol to multiple devices that allows the multiple devices to have obfuscated communications. Such systems and methods may allow multiple devices to communicate using the obfuscation methods as described in FIGS. 1-36 above.

Microcontrollers may generally be enabled to exchange information locally or through the Internet, and to be accessible over the Internet. A plurality of microcontrollers may be used to form an IoT which is a network of various devices in an area (e.g., a number of devices within a building, an area within a building, a vehicle, etc.) embedded with a microcontroller and/or other electronics. The devices to which the microcontrollers are associated with may be, for example, sensors, nodes, or any other type of equipment. The IoT may enable the various devices to receive and transmit data. The IoT typically requires a local low power wireless connection that enables the various devices to share data in a low power configuration. The IoT may generally require a gateway or client to facilitate connection of the various devices.

Figure 38:
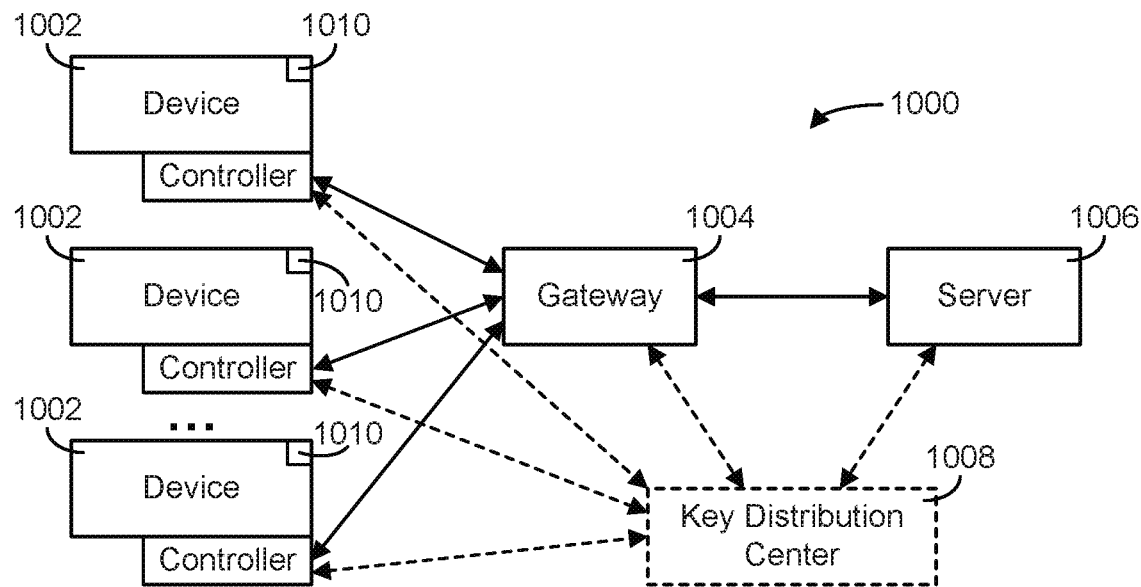
FIG. 38 illustrates a block diagram of a system for establishing a communications protocol between multiple devices in an environment.

Referring now to FIG. 38, a system for establishing a communications protocol between multiple devices in an environment 1000 is shown. Multiple devices 1002 are shown in environment 1000. Each device 1002 may be any type of device configured for wireless communication with other devices. Each device 1002 may generally include a power supply 1010. In one embodiment, the devices may be battery-powered and configured to operate in a low power configuration. In other embodiments, the devices may include one or more other power supplies. The systems and methods described herein are adapted for the low-power status of each device 1002, allowing the devices to set up secure transmissions with other low-power devices. Nonetheless, as one of skill in the art would recognize, the same systems and methods will also work with devices that are not low-power devices. Each device 1002 includes a microcontroller for facilitating the transmissions with other devices. The present disclosure interchangeably uses the terms device and controller to describe the devices 1002.

Environment 1000 further includes a gateway 1004 configured to manage data communications between the multiple devices 1002 and between those devices and the server 1006. Gateway 1004 may be a computing device such as, for example, a Raspberry Pi™ or other similar device that can receive and transmit data to a plurality of microcontrollers. Gateway 1004 may generally establish a transmission protocol for the various devices 1002. Gateway 1004 may communicate with devices 1002 via any RF or wired communication method (e.g., via Bluetooth Low Energy (BLE), Zigbee, IEEE 802.15.4, or any other communication protocol).

Environment 1000 further includes a server 1006 to which gateway 1004 may communicate. Server 1006 may be, for example, a policy server similar to policy server 702 as described above and configured to manage interactions between the gateway 1004 and the various devices 1002. Server 1006 may determine permissions for the various devices in environment 1000 (e.g., if the devices are approved to share data with one another), may transmit tables, keys, or other information for use by a gateway 1004 to set up obfuscated transmissions in environment 1000, and the like.

While FIG. 38 shows one particular embodiments, it should be understood that other configurations are possible. For example, one or more activities performed at server 1006 may instead be performed at gateway 1004. As another example, gateway 1004 may be any type of client device. Gateway 1004 may be a client device or a server device.

Figure 39:
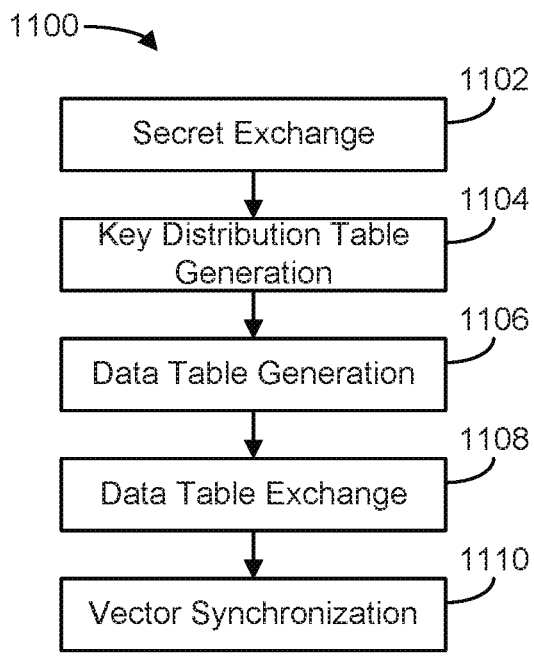
FIG. 39 illustrates a flow chart of a process for implementing a key distribution protocol between two devices.

Referring now to FIG. 39, a flow chart of a process 1100 for implementing a communications protocol between two devices is shown. In one embodiment, gateway 1004 implements the communication protocol between the two devices by securely exchanging keys between itself and the devices 1002.

Process 1100 generally includes a secret exchange 1102, key distribution table (KDT) generation 1104, data table (DT) generation 1106, data table exchange 1108, and vector synchronization 1110. Secret exchange 1102 may be an exchange of a "secret" between two controllers of devices that wish to communicate with one another. The "secret" may simply be a number shared between the controller and the gateway. The secret may represent a location in a PRNG that will be used to create a table distribution key, as described below. In other words, the secret could be a pre-calculated PRNG location. In one embodiment, the secret is 28 bytes: 12 bytes defining parameters (e.g., exponents of a polynomial used to generate a random number) for the pseudo-random number generation (for example TinyMT), and 16 bytes identifying the jump vector in the PRNG sequence. In other embodiments, the secret may be a different size and may define any type of parameter for generating reasonable protection. The "secret" is used by both parties (the controller and the gateway) to generate the TDK. Because both parties know the secret, both parties can calculate the PRNG value using the same PRNG algorithm.

The initial "secret" can be recorded in the controller at manufacturing time or it may be generated at provisioning time. The "secret" could be the serial number or a Universally Unique Identifier (UUID). Exchanging the initial "secret" can be done in multiple ways. One technique for exchanging the initial secret is manually, i.e. the "secret" is exchanged between the devices using an operator, such as a human. In this technique the initial "secret" is not transmitted electronically and so there is a reduced chance of the initial "secret" being electronically intercepted. In this technique, the controller may contain a user interface (UI) capable of displaying the "secret," and the exchange may consist of an operator reading the "secret" from the controller UI and entering the "secret" using the gateway UI. If no UI is available on the controller, the "secret" may be printed on a label attached to the device or the packaging for the device. In those cases the operator can read the "secret" from the label and enter it into the gateway UI.

If no UI exists at the gateway for an operator to enter the "secret" into the gateway device then the "secret" must be exchanged electronically. If the controller has sufficient computational resources, the "secret" can be shared securely using various algorithms. In one embodiment, the Diffie-Hellman algorithm is used to share the secret. As one of skill in the art would know, the Diffie-Hellman algorithm is a key exchange method that allows two parties that have no prior knowledge of each other to jointly establish a shared secret key over an insecure channel. However, the Diffie-Hellman algorithm is computationally expensive and therefore, in IoT devices with low power, should be used sparingly and therefore only for the exchange of the initial secret key.

In another embodiment, another algorithm that can be used to securely share the secret is asymmetric encryption. Asymmetric encryption uses public and private keys to encrypt and decrypt data. Each client device or controller has the public key of the gateway. Another algorithm that can be used is public key infrastructure, where the gateway sends a certificate to each controller and the controller uses a certificate authority to verify that the certificate belongs to the gateway. In such an embodiment, a new secret is exchanged in every session.

In another embodiment IoT devices without sufficient computational power to process intensive algorithms may exchange the "secret" using proximity provisioning (i.e. only when the device is close enough to the gateway). For proximity provisioning, the controller may transmit a very weak signal (e.g., −20 decibel milliwatts) and the gateway may use a received signal strength indicator (RSSI) of the signal to compute a distance between the gateway and device (this distance used to determine if a device is close enough to the gateway). As another example, the secret may only be exchanged by a gateway to a device whose serial number is known to the gateway. As yet another example, the secret may be exchanged using a trust and verify method where the secret is exchanged in the open and the gateway verifies that a device is operating correctly after the exchange.

After the secret is exchanged, the devices and gateway may save the secret in storage, and the saved secret may be used to re-establish a session with a device after the device is powered down, in one embodiment. In another embodiment, the secret may be provisioned for only a single use, such that once the device is paired with a gateway it cannot be paired with any other gateways. In various embodiments, the secret may be stored and re-used any number of times, or may be used a limited number of times, depending on one or more network preferences from the gateway, server, user, or as provisioned at the time of manufacture. The 16 bytes of the secret identifying the location in the PRNG is defined as the initial PRNG data vector.

Process 1100 includes key distribution table generation 1104. The key distribution table is generally used to send a data table to the devices for use in obfuscation and deobfuscation as described below. To generate the key distribution table, the portion of the secret used as a jump vector for the PRNG and the resulting pseudo random number sequence is used to generate the table. Any type of PRNG may be used (e.g., TinyMT). Key distribution table generation is done at both the gateway and the controller. Since each entity has the same secret, they will generate the same key distribution table via the PRNG.

Figure 40:
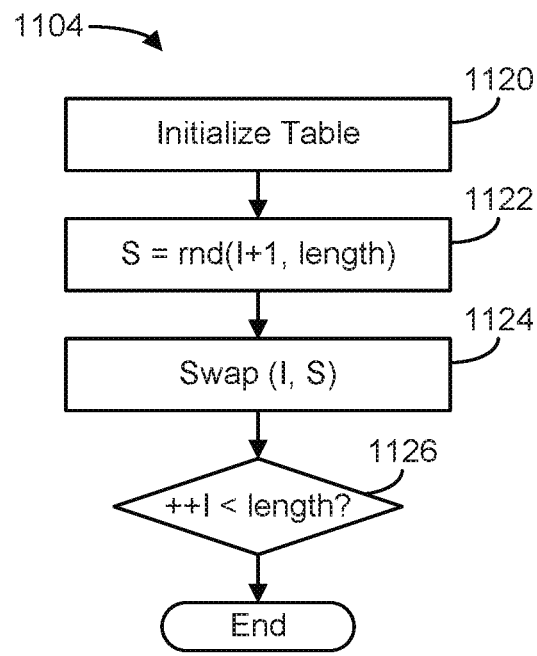
FIG. 40 illustrates a key distribution table generation process, the key distribution table used to distribute data tables to multiple devices.

Referring to FIG. 40, key distribution table generation 1104 is shown in greater detail. Key distribution table generation 1104 includes initializing the table (block 1120), which may include setting the table length and a value for each entry in the table. For example, block 1120 may include setting the value of the $I^{th}$ entry in the table to I.

Starting with the first index of the table (index=0), a swap function (block 1124) is used to swap values in the table. For example, for a given index value, the next pseudorandom number (S) between the current index and the table length is found. S is then used as an index for the value to be swapped with the value at index I (KDT[I]). After the swap, the index is incremented (block 1122) and the swap function is applied again (block 1124), as long as the index is less than the length of the table (checked at block 1126). Because KDT generation is done using the same PRNG and secret, each device will generate the same table.

Referring again to FIG. 39 and process 1100, the process includes data table generation 1106. The initial data table ($DT_0$) is generated only at the gateway. The algorithm for generating the data table may be similar to the algorithm for generating the key distribution table (shown in FIG. 40), but using a true random number instead of a pseudo random number to determine which indexes to swap. The true random number can be based on the entropy of the system. For example, as one of skill in the art would be aware, in IOX (MAC OS) a true random number between 0 and 255 could be generated using the code: File=*rnd_file=fopen("/dev/random", "r"); rand=fgetc(rnd_file). By means of another example, as one of skill in the art would know, in Linux a random value can be obtained from the kernel entropy pool. Because data table $DT_0$ is generated only at the gateway a true random number can be used. The gateway may store $DT_0$ in RAM for use if the controller and gateway get out of sync, as described in more detail below. The gateway maintains a separate data table for each controller.

Process 1100 further includes a data table exchange 1108. The data table exchange process generally includes encoding the data table with a shuffling algorithm using the KDT (described below) and transmitting the encoded table to the controllers. Once the controller receives the $DT_0$ it too may maintain a copy of $DT_0$ in RAM in case the controller and gateway get out of sync, as described in more detail below. Process 1100 further includes vector synchronization 1110. Any device may exchange with its partner, the secret or part of the secret (i.e. just the 16 bytes identifying the jump vector in the PRNG sequence, or the complete 28 bytes including both the polynomial exponent values and the jump vector). If more than one PRNG sequence is used by the algorithm, more than one vector and polynomial may be exchanged between devices.

At any time, the gateway may generate and send a new secret to the controller. In this way a future reinitialization of the controller with the gateway will result in an exchange of a different initial secret and therefore a different KDT. The old secret will be overwritten with the new secret in both the gateway and the controller. This process increases the security of the overall system by preventing repetitive synchronizations of the controller and the gateway which would allow an attacker to determine additional information about the communication between the devices. In another embodiment the gateway may include a threshold value of number of times a particular "secret" can be used. In yet another embodiment, the gateway may increase the amount of time between each subsequent use of the same "secret" value such that it becomes prohibitively difficult to attempt multiple synchronizations in a row.

Referring again to FIG. 38, environment 1000 may optionally include a key distribution center 1008 capable of communicating with any of devices 1002, gateway 1004, and server 1006. In an alternative embodiment, key distribution center 1008 may provide the key provisioning features as described in FIGS. 39-40. In such a case, key distribution center 1008 may have identifying information for each device 1002 or controller.

When a controller, gateway, or server first turns on, they may establish a session with key distribution center 1008, the session creating a data table for the controller, gateway, or server. Therefore, there is a key distribution table for each session (labeled as $T_C$, $T_G$, and $T_S$ below, for the controller, gateway and server, respectively). In some embodiments, devices 1002 may not be able to directly communicate with key distribution center 1008. In those cases, communication from devices 1002 may be relayed by gateway 1004 to key distribution center 1008.

If a controller of a device 1002 wants to talk with gateway 1004, it may request a data table from key distribution center 1008. In some embodiments, such as when device 1002 cannot directly communicate with key distribution center 1008, even if gateway 1004 and device 1002 have not yet been provisioned to communicate with each other, gateway 1004 may permit the request from device 1002 to be relayed to key distribution center 1008. In one embodiment key distribution center 1008 sends two copies of the new data table ($DT_{CG}$) to the gateway, one table for the gateway and one for the controller. The $DT_{CG}$ for the gateway is encoded using $T_G$ and the $DT_{CG}$ for the controller is encoded using $T_C$. The gateway then relays the $DT_{CG}$ encoded with the controller's TDK ($T_C$) to the controller. Each of the gateway and controller has its respective key distribution table and can therefore decode its own copy of $DT_{CG}$. In other embodiments, key distribution center 1008 may send the $DT_{CG}$ directly to the controller, again encoded with $T_C$.

Similarly, when the gateway wants to talk with a controller (or receives a message from a controller that the controller wants to talk with the gateway), the gateway sends a request to key distribution table 1008 to establish a session. Once a session key ($T_C$) is sent to the controller, the gateway can send a request to key distribution table 1008 for a data table for use in the gateway-controller communication. The gateway then receives the two copies of a new data table and relays an encoded data table to the controller as described above.

Figure 41:
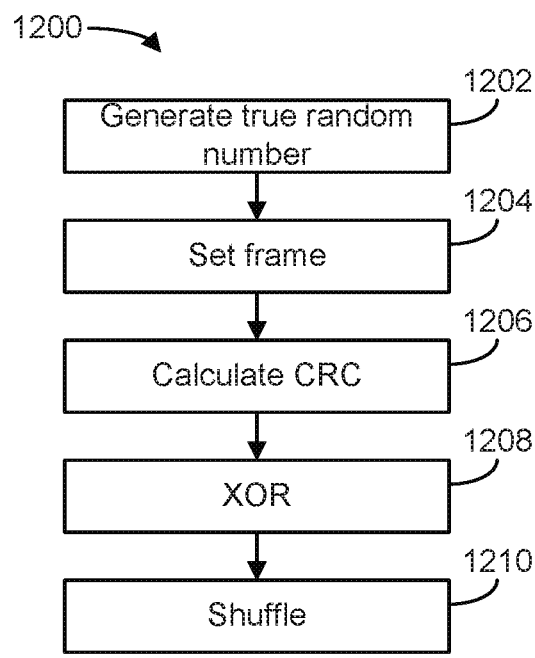
FIG. 41 illustrates a stand-alone algorithm for obfuscating data in a frame for implementing a communications protocol between multiple controllers and a gateway.

As described above, once a data table is generated (either by the gateway or a key distribution center) and before the data table is transmitted, a shuffling algorithm may be applied to the data table to obfuscate the data in the table. Referring now to FIG. 41, one method of encoding data in the data table is described. The process 1200 shown in FIG. 41 may be a stand-alone encode algorithm that can be used for the first payload transmission to a controller and then later if the sender and receiver need to synchronize. The stand-alone encode algorithm is state independent (does not need to know the previous position in the pseudo random sequence). The stand-alone encode algorithm is initiated by the gateway when needing to initialize or reinitialize the PRNG data vector (e.g., the secret). In the present disclosure, "secret" and "PRNG data vector" may be used interchangeably.

Figure 42:
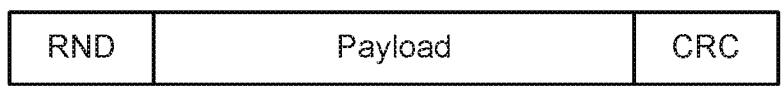
FIG. 42 illustrates an example frame to be transmitted.

Process 1200 includes generating a true random number (block 1202) and setting the frame (block 1204) to be transmitted. Referring also to FIG. 42, an example frame is shown with a RND value (determined in block 1202) set at the front of the frame and a CRC value (determined in block 1206) set at the end of the frame. Process 1200 further includes calculating the cyclic redundancy code (CRC) (block 1206). The CRC is preferably calculated on the payload and the random number together.

Process 1200 further includes XORing the frame with an array of random numbers (block 1208). The secret is set as the RND value, and the PRNG is seeded with the secret to create an array of random numbers equal in length to the payload and CRC. This generated array is used to XOR the frame. The XORing obfuscates the original payload and the CRC, preventing a plaintext attack to try and decode the data table.

Process 1200 further includes a shuffling algorithm (block 1210). The data table is used to shuffle the bits in the frame. The shuffling uses an array of bit masks, a destination buffer, a bit index, a byte offset, and a bit offset. If the data table is the payload, then the TDK is used to shuffle the bits in the frame.

Figure 43:
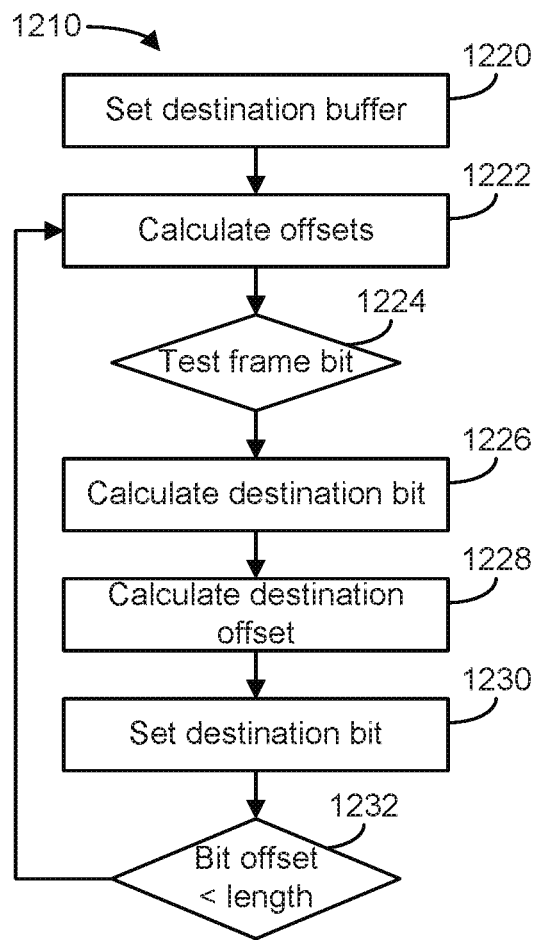
FIG. 43 illustrates a detailed shuffling process of the shuffling algorithm of FIG. 41.

Referring now to FIG. 43, the shuffling algorithm is shown in greater detail. The algorithm includes initializing the destination buffer (e.g., initializing the destination buffer to all zeroes) (block 1220). For each bit index in the frame, the following may be performed.

Offsets are calculated (block 1222). For example, a byte offset=bit index/8 is calculated, and a bit offset=bit index % 8 is calculated. The frame bit is tested (block 1222) to determine whether the bit in the frame byte is set by checking if bit mask[bit offset] AND frame[byte offset] are both true. If both values are true, a destination bit is calculated (block 1226) using the data table (i.e., destination bit index=DT[bit index]. A destination offset is calculated (block 1228). For example, the destination byte offset=destination bit index/8 and the destination bit offset=destination bit index % 8. A destination bit is set (block 1230). For example, the destination bit (DB) is set equal to DB[destination byte offset]. As another example, DB=mask[destination bit offset]. Blocks 1222-1230 are repeated for each bit index in the frame (block 1232). The PRNG data vector created as part of step 1208 is saved in memory of the gateway for later use in the encode/decode sequential transmissions.

Figure 44:
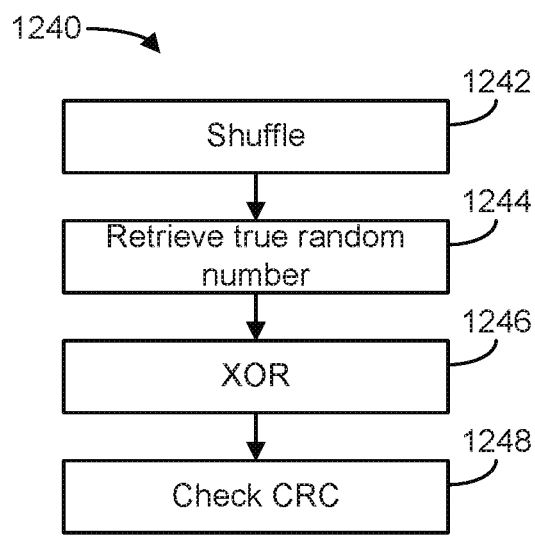
FIG. 44 illustrates a stand-alone shuffling algorithm for deobfuscating data in a data table for implementing a communications protocol between multiple controllers and a gateway.

Referring now to FIG. 44, a decode stand-alone algorithm is shown (process 1240) that can be implemented by a controller receiving the encoded data table from the gateway. Process 1240 includes a shuffle function (block 1242) which un-shuffles the frame bits in the encoded frame. Process 1240 further includes retrieving the true random number (block 1244) located at the beginning of the frame, to use as the PRNG data vector or secret. The PRNG is seeded with the secret and the numbers from the PRNG are used to XOR the frame (e.g., the payload and CRC) (block 1246). This reveals the original payload (e.g., the original data table). The CRC is removed (block 1248) and the controller calculates a CRC for the payload and the random number and compares it against the removed CRC to ensure synchronization between the controller and gateway. If the CRC check fails, the receiver concludes it has lost synchronization.

If synchronization is lost between the controller and gateway, the controller may use the original data table ($DT_0$) to send an encoded synchronize command to the gateway. The gateway will first attempt to decode the command using the current data table. If that attempt to decode the message fails, the gateway can then attempt to decode the message using the original data table ($DT_0$). If the gateway succeeds at decoding the message using $DT_0$ then it may conclude that the controller lost synchronization (e.g., was using an old data table). If the controller no longer has the current data table or $DT_0$ (for example it lost power), the controller can use the secret to generate a TDK as described above and send a request to the gateway encoded with the TDK to resynchronize. The gateway will first attempt to decode the message using the current data table which will fail the CRC check. The gateway will then attempt to decode the message using $DT_0$, which will also fail the CRC check. Finally, the gateway will attempt to decode the message using the stored secret value to generate the TDK. A successful decode with the TDK indicates to the gateway that the controller lost power (or otherwise lost the original data table). The gateway can then generate a new $DT_0$ and send it to the controller encoded with the TDK and encoded as a stand-alone message as described above in FIG. 41.

As another example of lost synchronization between a controller and gateway, the gateway may recognize that it is out of sync with the controller (for example the controller sent a message but was out of range and so the message was never received by the gateway but the controller already switched to the next table). The gateway can send a new PRNG data vector (generated from PRNG using a true RNG as a seed) to the controller encoded with the TDK using the encode stand-alone algorithm. The controller will attempt to decode the message with the current data table (which will fail the CRC check). The controller will then try to decode the message using the $DT_0$ stored in RAM (which will fail the CRC check as well). The controller can then generate the TDK using the secret it has stored and can attempt to decode the message using the TDK (which will succeed). The gateway also generates the TDK from the secret and uses the TDK to generate the data table.

As another example of lost synchronization between a controller and gateway, the controller may lose power and no longer have the TDK. The controller therefore is unable to decode the new secret sent by the gateway. The controller may then use the stored secret to generate the TDK and send a request to the gateway for resynchronization, the request encoded using the TDK. The gateway tries to decode the message using the current data table (fails), $DT_0$ (fails), and then the TDK (succeeds). The gateway sends a new RNG to the controller (used with the PRNG to find a new secret or PRNG data vector) using the encode stand-alone algorithm. The gateway then generates the data table using the TDK and sends it to the controller.

In some embodiments, if the gateway fails to communicate with a controller for a threshold amount of time, it may discard all tables and reinitialize with the controller upon a subsequent communication. In some embodiments, each time a new data table is sent, a new secret may be sent as well, as discussed above.

Figure 45:
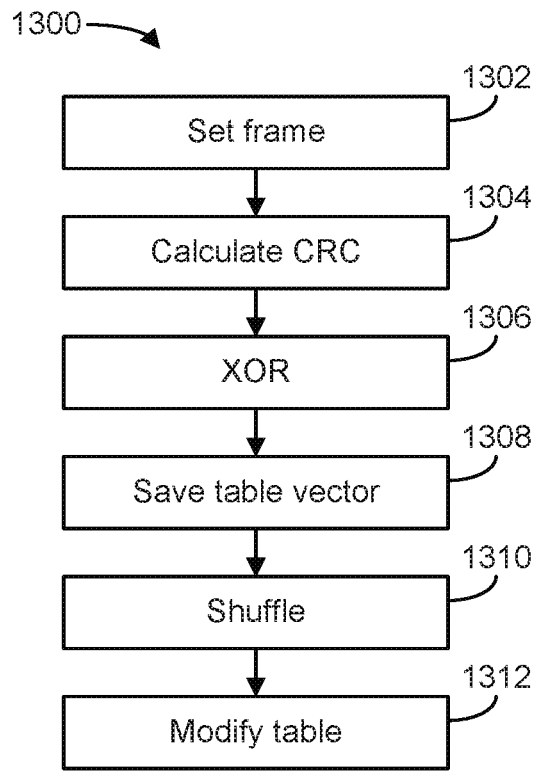
FIG. 45 illustrates a sequential algorithm for obfuscating data in a frame for implementing a communications protocol between multiple controllers and a gateway.

Referring generally to FIGS. 41-44, encode and decode stand-alone algorithms are described for encoding and decoding data. In another embodiment, an encode and decode sequential algorithm may be used to encode and decode the data to be transmitted. Referring now to FIG. 45, an example encode sequential algorithm method is shown. In the sequential algorithm, both the controller and the gateway keep the state of the PRNG and the tables. With every packet, the position of the PRNG changes based on the PRNG data vector (which is initially the secret and subsequently where the PRNG left off in the previous packet). The tables are changed based on the payload and the PRNG sequence (i.e., data-driven changes to the table). This can be referred to as "table block chaining."

The size of the portion of the table that is changed during the sequential algorithm is configurable and referred to as the "change size." In one embodiment, the change size may be a prime number and/or the size of the data table should not be evenly divisible by the change size. A table modification buffer (TMB) equal in size to the change size may be used to temporarily store the change vector during the sequential algorithm.

Referring to process 1300 of FIG. 45, the frame is set with the payload (block 1302) and the CRC is calculated for the payload (block 1304). The CRC is added to the end of the frame (e.g., like as shown in FIG. 42). As described above in the stand-alone algorithm, the values from the PRNG (using the secret) are used to XOR with the frame (block 1306).

Figure 46:
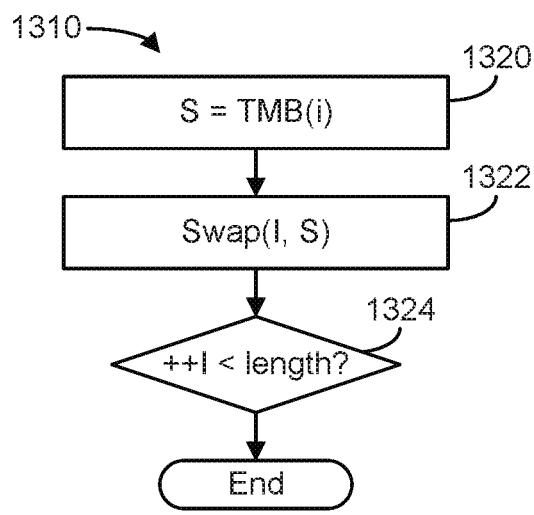
FIG. 46 illustrates a detailed table modification process of the sequential algorithm of FIG. 45.

The first change size XORed values are copied to the table modification buffer (block 1308). The data table is used to shuffle the frame bits (block 1310), and the data table is modified for use with the next transmission (block 1312). Referring now to FIG. 46, the table modification block 1312 is described in greater detail. The data table may be modified after each frame obfuscation. The table modification process may generally include finding the index of the next value to be replaced, and replacing the value with the value for that index in the table modification buffer.

Starting with the index i=0, locate the swap index S by retrieving the value stored in TMB[i] (block 1320). Then in the data table swap the values stored at index i and index S (block 1322). This process is repeated for each entry in the table modification buffer (block 1324).

The next time the data table is modified, the modification may start with the next entry after the last entry that was modified in the previous iteration. When the index reaches the size of the data table, it wraps around and continues at the beginning of the data table. The PRNG data vector is increased by the length of the frame just processed, to use the next time. For example, if the change size is determined to be 7 and the size of the data table is 12, $DT_1$ is generated based on $DT_0$ by having the values $DT_0[0]$ through $DT_0[6]$ swapped with values $DT_0[S[0]]$ through $DT_0[S[6]]$ where S is the table modification buffer. The next time through $DT_2$ would then be generated based on $DT_1$ by having the values $DT_1[7]$ through $DT_1[12]$ swapped with values $DT_1[S[0]]$ through $DT_1[S[6]]$ where S contains the new values stored in the table modification buffer.

In another embodiment the portions of the data table to be modified may be determined in an alternative way, such as changing overlapping portions of the table with each subsequent change. In yet another embodiment, the data table may only change after a threshold number of frames have been sent/received. In yet another embodiment, only every other bit of the data table may change. In yet another embodiment, certain portions of the table may be skipped over and unaltered. The data table modification may also start from a prime offset instead of from the 0 index. One of skill in the art would recognize that any number of alternative modifications or combinations may also be implemented to modify the data table. Similarly, one of skill in the art would recognize any number of alternative techniques for modifying the PRNG data vector.

Alone, each of an XOR function and a shuffle function are relatively weak methods for data obfuscation; however when combined the strength of the obfuscation is increased more than the sum of its parts. The table update is a function of the PRNG and the payload. The table is modified based on payload data that has been modified via XOR. Doing the table update between the XOR and the shuffle functions protects the table modification from hacking attempts as a hacker cannot determine the data through repeat attacks.

In one embodiment, after the shuffle step (block 1310), an additional XOR may be done using a different PRNG sequence. Multiple PRNG data vectors may be exchanged and used in order to use different PRNG sequences. In other embodiments, there may not be an additional XOR applied, or additional transformations in addition to the XOR and shuffle functions shown in FIG. 45 may be applied.

In one embodiment, as described in the above processes, the PRNG value is XORed with the shuffle table, then the XORed value is XORed with the data, and then the resulting XORed data is shuffled. XORing the PRNG value with the shuffle table hides the PRNG and defends the PRNG against plaintext attacks. Referring to FIG. 45, block 1306 would include XORing the PRNG value with the shuffle table and the XOR of this first XOR result with the frame. This is performed for each frame. In another embodiment, this may be done for the first frame, but for subsequent frames, instead of using a PRNG value to XOR with the table, the XORed data (before the shuffling but after all the other obfuscation) from the previous frame is XORed with the shuffle table, instead of the PRNG value. This embodiment increases processing efficiency. Referring to FIG. 45, block 1306 would include XORing the XORed data from the previous frame with the new frame, instead of the PRNG value. In each such embodiment, the decode process includes the mirror steps to decode the data.

The controller receives the encoded transmission from the gateway and can use a decode sequential algorithm to decode the data. The controller may use the data table to un-shuffle the frame bits, and the unshuffled table can be used in the table modification buffer. The data table is then modified for use with the next transmission, by using the table in the table modification buffer and using the same modification steps as described in FIG. 46. Then, the numbers from the PRNG are used to XOR the frame, revealing the payload and CRC. Finally, the controller can calculate the CRC for the payload and compare it against the CRC from the frame, to verify that the controller is in sync with the gateway. If the CRCs are the same, the message is accepted by the controller and the PRNG data vector is increased by the length of the frame to use for the next transmission.

Referring generally to FIGS. 38-46, a protocol and algorithms are described for facilitating a communications protocol between multiple devices and a gateway in which the communication is not guaranteed to be complete. Referring now to the subsequent paragraphs, an algorithm for facilitating higher-bandwidth communications between the gateway and a remote server are described. Where higher-bandwidth communication is possible the information may generally be configured to run over TCP-IP. By using the TCP-IP protocol, the transmission of the payload is guaranteed to be complete due to the retransmission techniques built into the TCP-IP protocol. In those cases the algorithm may accept, for a given data packet (e.g., a data table), frame sizes that are divisible by its table size (e.g., a size of a data table as described above). For example, for a table size of 160, the algorithm may accept a 1600 byte frame. As another example, for a table size of 256, the algorithm may accept a 1024 byte frame.

Each frame is made of multiple blocks, the blocks have the same size as the data table size. The algorithms encodes each block. Compared to the algorithm of FIGS. 38-46, the algorithm for coding these blocks may work the same way but do not need to use the CRC to check the blocks.

An encoding algorithm when using the TCP-IP protocol includes, for a given frame, using numbers from a PRNG to XOR the frame, thus hiding the original payload and preventing a plaintext attack to try and decode the data table. The XORed values are copied to the TMB, for use in a data table update. The data table is then used to shuffle the frame bits, and the data table is then modified using the TMB (as described above). After the shuffle, an additional XOR may be done using a different PRNG sequence. In other embodiments, there may be no additional XOR step, or additional transformations may be added in around the basic XOR and shuffle steps.

In the accompanying decoding algorithm, a PRNG is seeded with the PRNG data vector (e.g., the secret) that was used to XOR the incoming encoded buffer. The data table is then used to un-shuffle the bits in the frame. The data table is then modified using the un-shuffled buffer as the TMB. The numbers from the PRNG are then used to XOR the frame, revealing the original payload.

In some embodiments, a communications protocol may be created between multiple devices, wherein the multiple devices include one or more fixed stations and one or more mobile devices. For example, the systems and methods described herein may be adapted to manage communications between multiple mobile devices of users and multiple fixed stations on, for example, a building, a travel route, or the like. The example of a fixed station for various transportation management is used below, in other embodiments the fixed station may be any type of fixed station for managing an area, allocating resources, and the like.

The fixed stations may generally have a limited amount of the spectrum to send and receive information. To provide high-speed communications, the fixed stations may need to limit the number of users simultaneously communicating with the fixed stations. Thus, to allow the overall network of fixed stations to accept more users, the multiple fixed stations may be placed relatively near to one another, and a mobile device may switch between fixed stations while maintaining a session without interruption in service. Authentication between the mobile devices and fixed stations should occur as the mobile devices move and receive packages from multiple fixed stations and the fixed stations receives packages from multiple mobile devices. The systems and methods described herein use a key known to both parties (i.e. the fixed stations and mobile devices) to authenticate and obfuscate packages as described below. More particularly, a predictive algorithm is described to dynamically provide keys to the mobile devices that are used to authenticate and decode packages between the fixed stations and the mobile devices.

Figure 47:
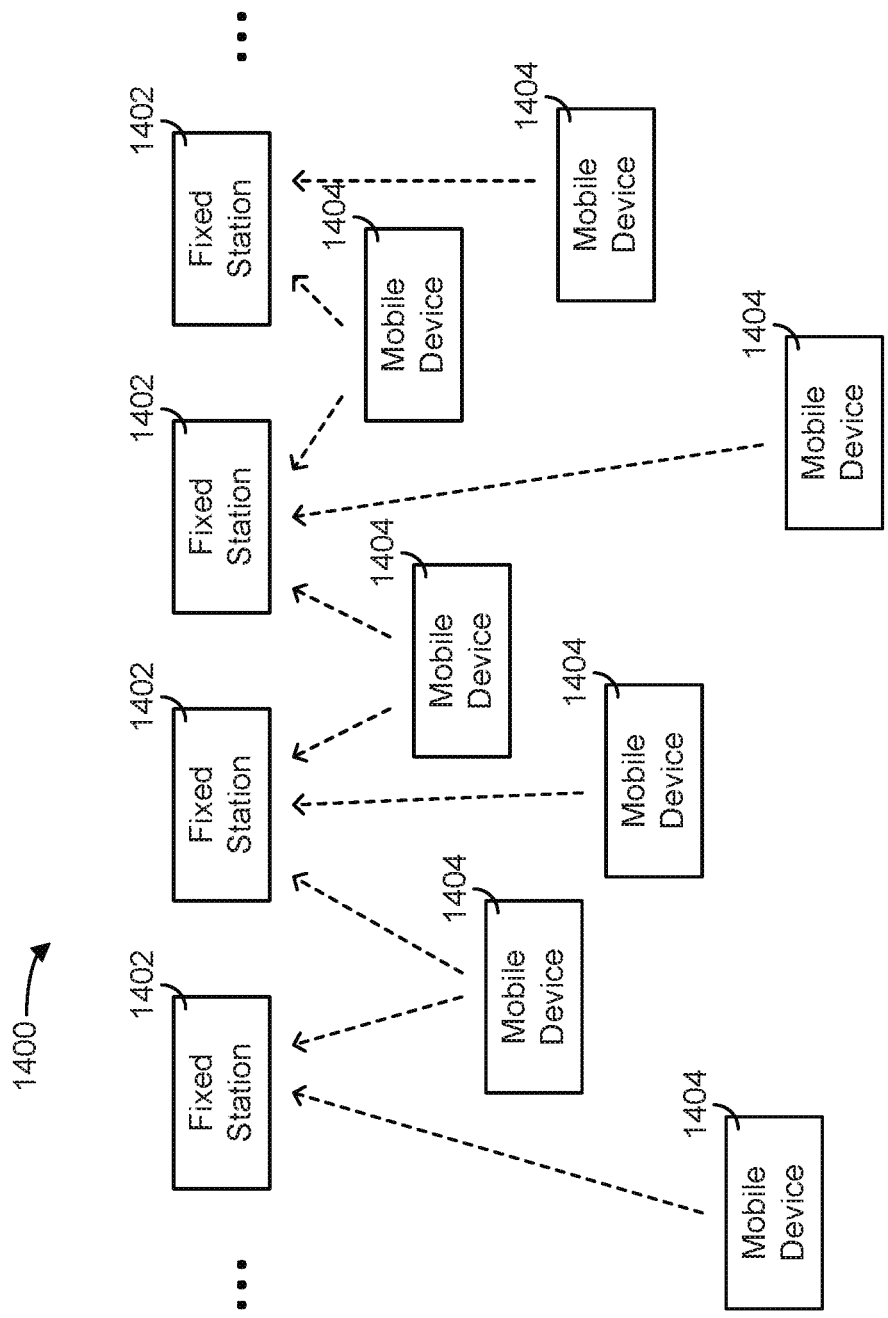
FIG. 47 illustrates a plurality of fixed stations and mobile devices in an environment for which data obfuscation may be implemented for communications between the fixed stations and mobile devices.

Referring to FIG. 47, an environment 1400 including multiple fixed stations 1402 and multiple mobile devices 1404 is shown. As described above, multiple fixed stations 1402 may be placed relatively near to one another, and may be arranged in any pattern or order for strategic reasons (e.g., to provide more wireless network coverage in an area). Mobile devices 1404 may be, for example, mobile phones, devices attached to moving objects or vehicles, etc., that traverse around environment 1400 in and out of the ranges of different fixed stations 1402. As illustrated, mobile devices 1404 may be in any position relative to fixed stations 1402 as they move, and may be in the range of multiple fixed stations. Using the systems and methods described herein, a mobile device 1404 may be able to connect to a first fixed station and establish a session with secured transmissions, then connect to a second fixed station and maintain the same session with the same secured transmissions.

In one embodiment, a mobile device or other mobile platform may have multiple users. For example, using the travel route example mentioned above, the mobile platform may be a smart automobile that can receive traffic information from multiple fixed stations while some passengers are talking on the phone or watching movies. In another example the mobile platform may be a train that can receive track condition information while individual users browse the Internet. Fixed stations may be located within a line of sight or path of the transportation method. The fixed station may be, for example, a networked fixed station connected to the network via a high-speed communication channel. As another example, the fixed station may be a fixed information station providing information to the mobile devices (e.g., information about the state of a train track, such as if the track is closed or if there is heavy traffic, alerting the train to stop or slow down). In smart city information systems, such stations may be used to dynamically balance the traffic, allowing the vehicles to minimize travel time. The fixed station, if not networked, may be updated by a passing vehicle as in the case of a remote fixed station in a railroad track.

A package sent in such a communications protocol may be of any size, and the whole package or just part of the package may be obfuscated via the systems and methods described herein. Packages may be authenticated using, for example, a CRC value. As another example, packages may be authenticated by identifying time stamp information in the package and comparing the time stamp on the package with the current time on the destination device to ensure the package is recent.

The package may be entirely or partially encoded depending on the expected number of connections to a fixed station and the amount of time available to negotiate a session between the station and a mobile platform. Some packages may include a session ID number or another method of identification that is processed by the fixed station in a timely manner. By not encoding these values, entire packages may be more quickly processed and handled by fixed stations. Clear identification values also allow fixed stations to decode packages with the correct data tables without having to guess the identity of the user.

Figure 48:
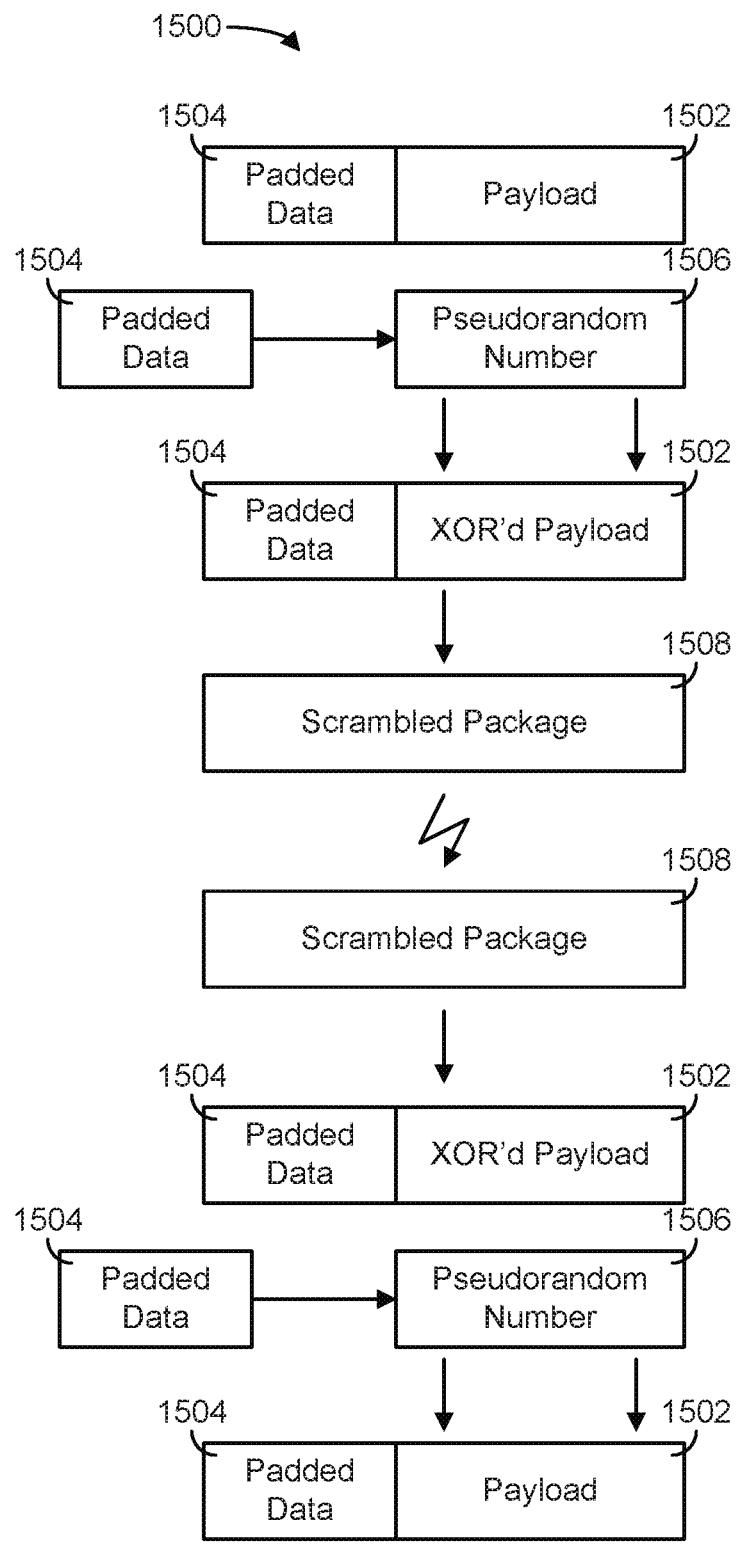
FIG. 48 is an example package that may be transmitted between a fixed station and a mobile device, the package obfuscated using the systems and methods described herein.

Referring now to FIG. 48, an example method 1500 is shown for transmitting a package to and from a fixed station. Method 1500 begins with a package consisting of the payload 1502 and padded value 1504. Padded data 1504 may be preexisting padded data to facilitate encoding, decoding, and authentication of payload 1502. Padded data 1504 may be a hash, timestamp, CRC, or other value. By using padded data 1504 to encode and decode data instead of generating values, there is no addition to the total size of package 1500.

In formatting the package for transmission, the padded data 1504 is first extracted from the package and is then used as a seed for a PRNG, which produces a pseudorandom number 1406.

Next, an XOR is performed on payload 1502 using the pseudorandom number 1506. This hides the original payload and defends the data against plaintext attacks. This may also include XORing the PRNG with the shuffle/scramble table and/or substituting the prior frame's XORed data for the PRNG, as described above. The extracted padded data 1504 is then reattached to the XOR'd payload 1502, and the entire package is scrambled (1508).

The scrambled package 1508 is transmitted and received at the destination. At the destination, package 1508 is unscrambled and padded data 1504 is extracted from its known location. Padded data 1504 is then used to seed the PRNG, producing the same pseudorandom number as the sender. Payload 1502 is XOR'd with the pseudorandom number, producing the original payload.

There are several methods for verifying the authenticity of the payload depending on the nature of the extracted data. As one example, an expected CRC value is calculated and compared to the extracted CRC. As another example, the expected hash of the payload is computed and compared to the extracted hash. As another example, the timestamp is compared to the destination's current time.

In one embodiment, the scrambling algorithm can be modified to preserve a clear identification value by adjusting the scope of the XOR and scramble as it relates to the size of the payload. Similarly, an identification value can be treated as padded data and used to XOR the rest of the package. However, the scrambling would exclude the padded data, keeping it as clear text.

Figure 49:
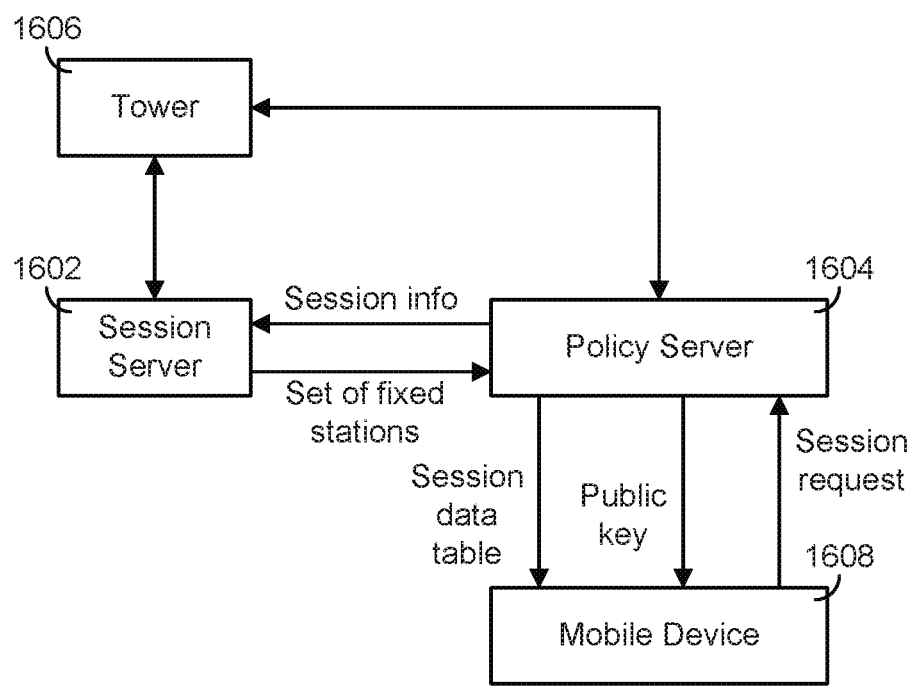
FIG. 49 is a block diagram illustrating key provisioning between a fixed station and a mobile device.

Keys are used to decode the packages. One method of providing keys in the fixed station and mobile device environment is described in FIG. 49. A session server 1602 is used to dynamically provision keys to the mobile devices as they move in a route. Session server 1602 maintains communications with a cell tower 1506 (e.g., a fixed station). When tower 1606 is powered up (e.g., brought online), a session is established with session server 1602.

A policy server 1604 may authorize mobile devices (e.g., users) with the communication server. When a mobile device 1608 powers on, the device does not have any table-based keys. In order to acquire the necessary keys, mobile device 1608 may authenticate to the network and receive authorization to use the network. Mobile device 1608 may use public key infrastructure (PKI) to establish a session with policy server 1604. Sessions can be established over the cellular network or by communicating with a networked tower. Networked towers may forward bootstrap requests to policy server 1604.

When the connection is established with policy server 1604, it sends its signed certificate to mobile device 1608. The device uses PKI to verify the authenticity of the certificate, and if it is authentic, generates a secret encoded with the public key of the policy server 1604 and sends it. Policy server 1604 uses its private key to open the secret. Both sides of the conversation use the secret to generate a sequence of pseudorandom numbers and use those numbers to create a KDT. After the KDT is created the policy server 1604 creates a session data table and sends it to device 1608 using the KDT. The user credentials are exchanged with the policy server 1604 using the data table. If the user (e.g., mobile device 1608) is authorized to use the service, policy server 1604 hands the session to the session server 1602.

When the session is handed over from policy server 1604, session server 1602 locates the fixed stations that are near the user. Session server 1602 may identify a set of fixed stations to be sent to the device.

The user may be outside an identified route or within an identified route. When a user is not in an identified route the set of fixed stations identified includes the closest fixed stations of all the routes. If a user is in an identified route the direction and speed of the user can be calculated using GPS, and the set of fixed stations to provide to the user includes some number P of previous stations and some number N of next stations, where usually P is less than N.

The number N of next stations includes the next networked and non-networked stations. All the non-networked stations between the location of the user and the next networked station will be included in the set of fixed stations. In addition to the non-networked stations the next networked stations to be included are determined heuristically. For example: if a route has a branch coming up, the station's DNS along the branch will be included along with the DNS along the route.

Session server 1602 sends the device's data table to the networked fixed stations in the set of fixed stations. In some cases all the stations in all the routes may be sent to the device 1608 to allow authentication of all fixed stations. This can be used for example in an automobile warning system where all automobiles will have a way to authenticate the fixed stations even if they don't use the back-bone for network communication, or by a locomotive that needs to authenticate all fixed stations along all the tracks it can travel.

At this point, device 1608 can use its data table to authenticate with towers 1606. Using the data table session server 1602 will send the nearby tower tables to the device. The tower tables are used to authenticate the tower broadcast messages.

Messages between the fixed station and the user are encrypted with the data table.

The key-tables of the next stations are sent to user devices 1608. The system needs to prevent a disgruntled user from getting the key table of a fixed station and using that key table to provide information as if it was a real fixed station.

The keys in the set of fixed stations are encrypted with the user's session key data table, and they are never saved to long-term storage (such as a hard-disk) by the system.

In the case where all the fixed station keys reside in a user's device, they will be encrypted with the user's data table, and the data table itself will be encrypted with a password. The password is used to move the data table to memory and the keys are decoded as they move to memory. That way, if the box is stolen from a mobile platform or mobile user (such as a vehicle or train), the keys cannot be recovered.

When the key is used for authentication, a portion of the message is encrypted with the user or fixed station key tables. The receiving end of the conversation decodes the obfuscated portion of the package and verifies the authenticity. This can be done by encoding the CRC of the payload by encoding some known piece of data such as the time code. After the package is decoded, the CRC or the known piece of data is used to authenticate the package.

Fixed stations may be configured to only forward authenticated packages. When full obfuscation is desired the payload can be obfuscated using a separate user-to-user session key as described previously herein.

Packages may contain a time stamp and be encoded with the station key. Denial of service attacks can be avoided by having the fixed-stations reject non-authenticated incoming messages.

Referring now generally to FIGS. 50-56, a network access control system is described. The network access control system may generally allow for the provisioning and managing of multiple nodes in a network, without the need for managing certificates, for example maintaining a list of certificates, managing expired certificates, managing a list of certificate revocations, managing an authority revocation list, or the like. Referring generally to the disclosure, various systems and methods are described for providing obfuscation techniques for communications between nodes; the following description describes systems and methods for setting up the authorized communications between the nodes to allow obfuscated data to be transmitted between the nodes.

Figure 50:
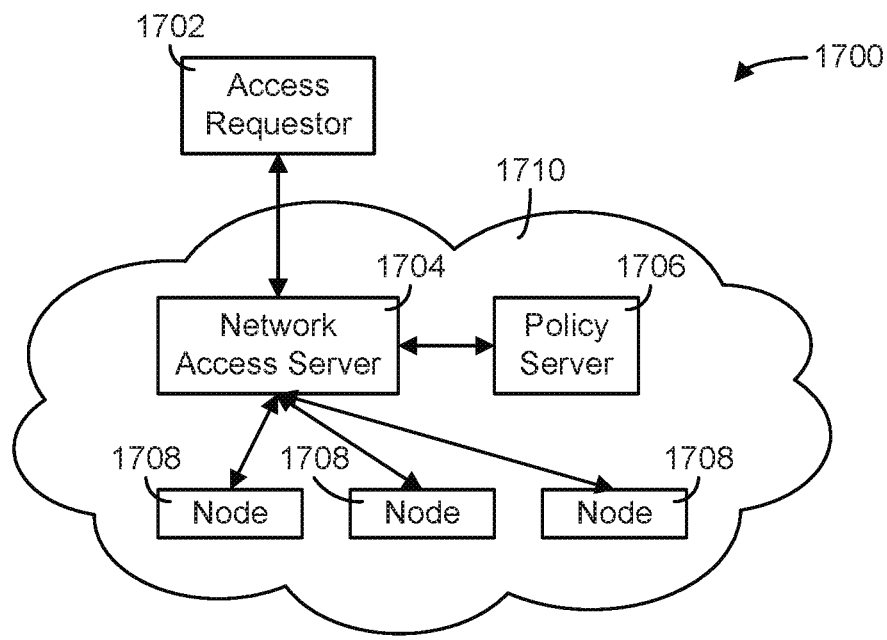
FIG. 50 is a block diagram of a network access control system.

Referring to FIG. 50, a high level block diagram of a network access control system 1700 is shown. The network access control system 1700 generally includes an access requestor 1702, a network access server 1704, and a policy server 1706. The access requestor 1702 may be any device configured to connect to the network (e.g., a mobile device attempting to connect to the various nodes in the network 1710, one of the nodes in the network, etc.). The device may be any type of device as generally described in the present disclosure. The network access server 1704 receives the request from access requestor 1702 (e.g., a user device) and provides a connection to the multiple nodes 1708 in network 1710. Nodes 1708 may be real or a virtual machine, according to different embodiments. The policy server 1706 may generally authenticate the communications between the various nodes 1708 and may be similar to policy servers 702 and 1604 as described above.

In the network access control system, access requestor 1702 communicates over a secure link with network access server 1704, which then communicates over a secure link with policy server 1706 once access requestor 1702 is authenticated. Policy server 1706 then determines the access rights for access requestor 1702 to the nodes 1708 in network 1710. In prior art, each link between the nodes and servers may be secured by a protocol such as a transport layer security (TLS) protocol and certificates are used to secure the connection between devices. Nodes 1708 may be any type of machine or device (e.g., real machines, virtual machines, platform components, software components, etc.) as generally described in the present disclosure.

Figure 51:
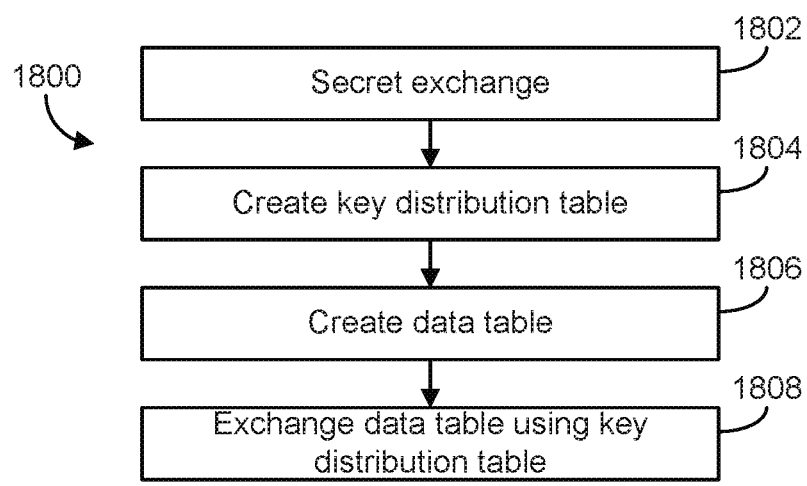
FIG. 51 is a flow chart of a process for establishing a session between two nodes in a network.

Referring now generally to the present disclosure, a network access control system is described. In the embodiments of FIGS. 51-56, nodes are provisioned for communications without the need for managing certificates. Referring to FIG. 51, a process 1800 of establishing a session in a network 1710 is shown. Process 1800 includes two nodes securely exchanging a secret (block 1802), after which both nodes use the secret to seed a PRNG. The output of the PRNG is used to create a key distribution table (1804). One of the nodes creates a data table (block 1806) which is then exchanged with the other node using the key distribution table (block 1808). The data table is subsequently modified in every packet exchange between the nodes, based on the PRNG and the data. Process 1800 is a process for establishing a session as generally described in the present disclosure above, the following figures describe a process for provisioning the nodes that will be establishing the sessions in the network.

Figure 52A:
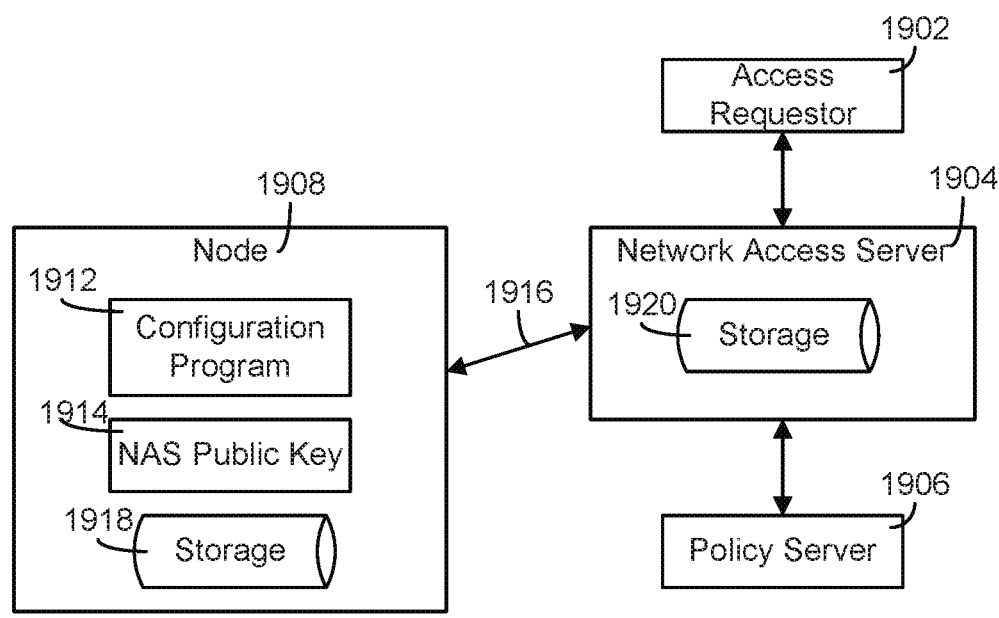
FIG. 52A is a block diagram illustrating a process of provisioning a node for communications in a network through a network access server.
Figure 52B:
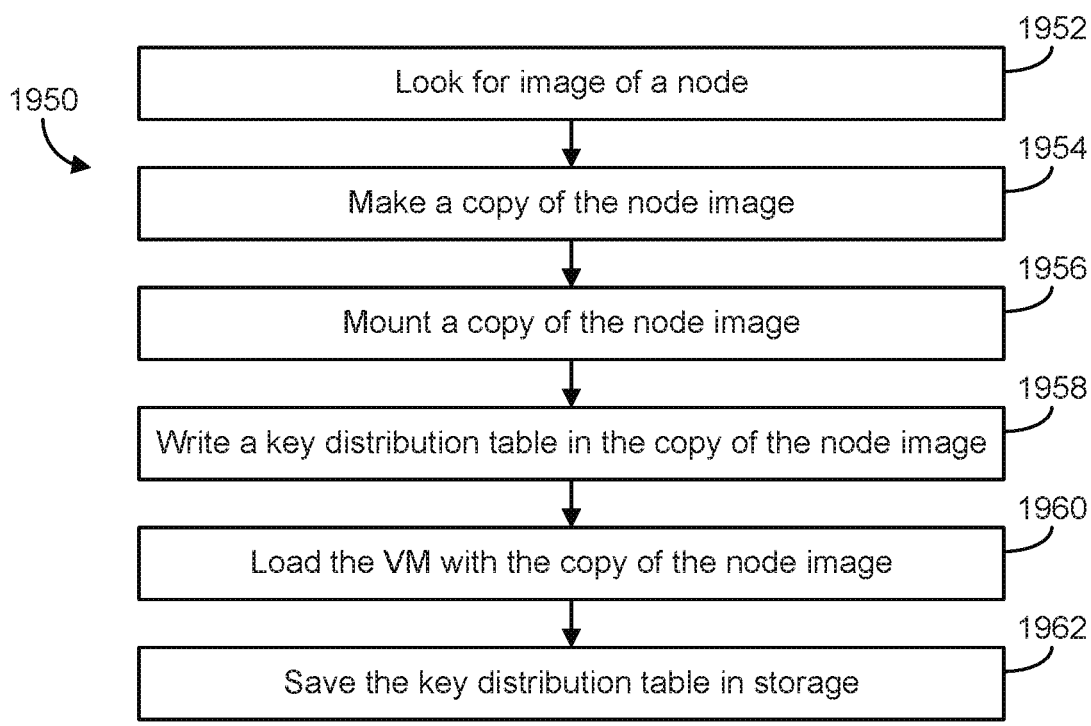
FIG. 52B is a flow chart of a process for provisioning a node for communications in a network through a network access server.

Referring now to FIGS. 52A-B, the provisioning of nodes in a network is shown in greater detail. More particularly, FIG. 52A illustrates the configuration of a node 1908 in the network to allow the node to be used in the network by a network access server 1904. To facilitate the configuration of the nodes in a network, an operator may access a node 1908 and initiate a configuration program 1912. Configuration program 1912 is generally configured to authenticate with network access server 1904 using a network access server public key 1914. Network access server public key 1914 is then used to exchange a secret with network access server 1904, and a session (1916) is established between node 1908 and network access server 1904. While the embodiment of FIG. 52A shows a network access server public key, in other embodiments other authentication methods (e.g., a 509 certificate) may be used to authenticate the network access server at the node. In yet other embodiments of the invention, a secure session can be established using a key exchange algorithm such as Diffie-Hellman, or as disclosed in "Post-quantum key exchange—a new hope" by Erdem Alkim (https://eprint.iacr.org/2015/1092.pdf), or Frodo key-exchange, and the server can be authenticated after the secure session is established and before the user password is exchanged.

Once the session with network access server 1904 is established, configuration program 1912 sends operator credentials (e.g., the credentials of the user) to network access server 1904. Network access server 1904 may authenticate the user with policy server 1906 and verifies that the user is authorized to configure node 1908.

The configuration by configuration program 1912 includes creating a key distribution table for node 1908 and storing the key distribution table in secure storage 1918 of the node. The key distribution table is provided to network access server 1904, which stores the key distribution table (and other node information) in a server secure database 1920. In another embodiment, instead of saving a key distribution table, a private/public key may be created for node 1908, and the node's private key is stored at the node while the public key is sent to network access server 1904 for storage.

Referring now to FIG. 52B, a process 1950 for provisioning a node is shown in greater detail. More particularly, process 1950 shows the process of provisioning a node from the network access server upon receiving a request from an access requestor. The network access server is configured to start the node in a virtual machine (VM) in process 1950.

In process 1950, the node is already configured for provisioning, as described in FIG. 52A. Process 1950 includes looking for an image of a node (block 1952). Block 1952 may generally include the network access server looking for an image of a node with the appropriate operating software or other software. Block 1952 may further generally include searching for an image of a node with any desired setting or characteristic.

Process 1950 further includes making a copy of the node image (block 1954) and mounting the copy of the node image (block 1956). The network access server, because it already has secure access to the node, writes the key distribution table in the copy of the node image (block 1958). The network access server loads the VM with the copy of the node image (block 1960) and the key distribution table is saved in storage of the network access server (block 1962).

Figure 53:
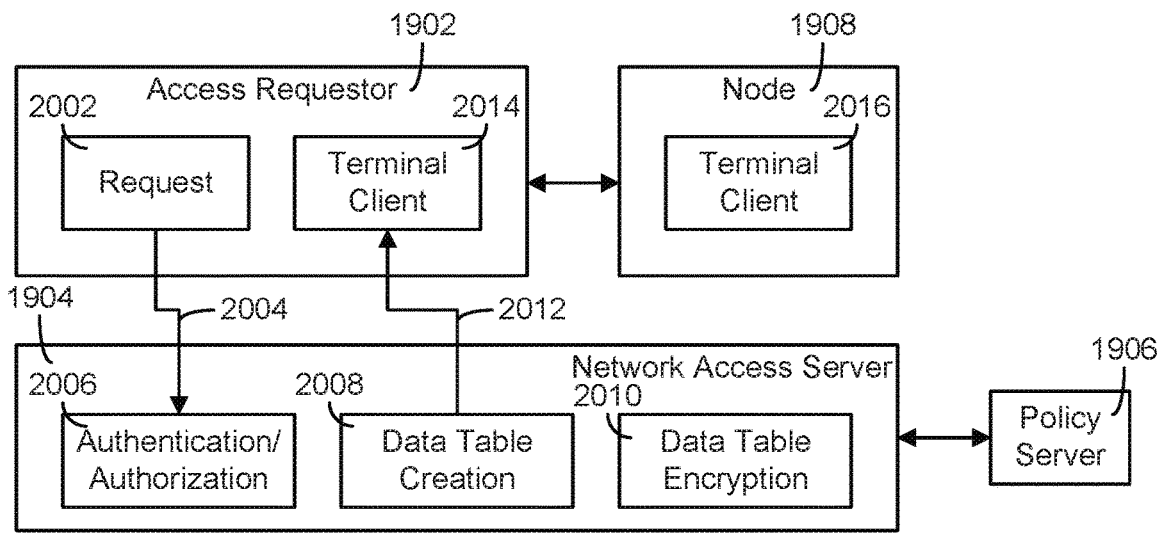
FIG. 53 is a block diagram illustrating a process of establishing an Infrastructure as a Service (IaaS) session between nodes in a network.
Figure 54:
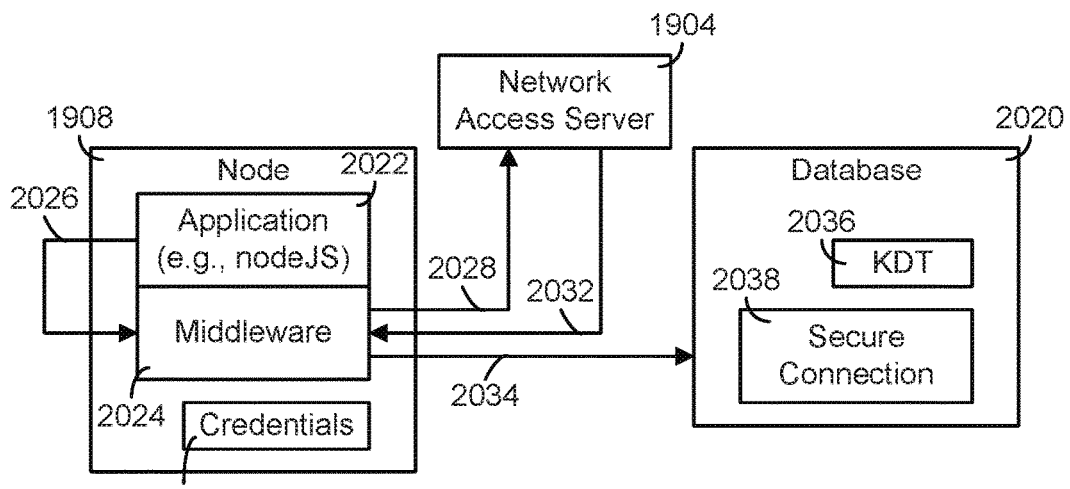
FIG. 54 is a block diagram illustrating a process of establishing a Platform as a Service (PaaS) session between nodes in a network.
Figure 55:
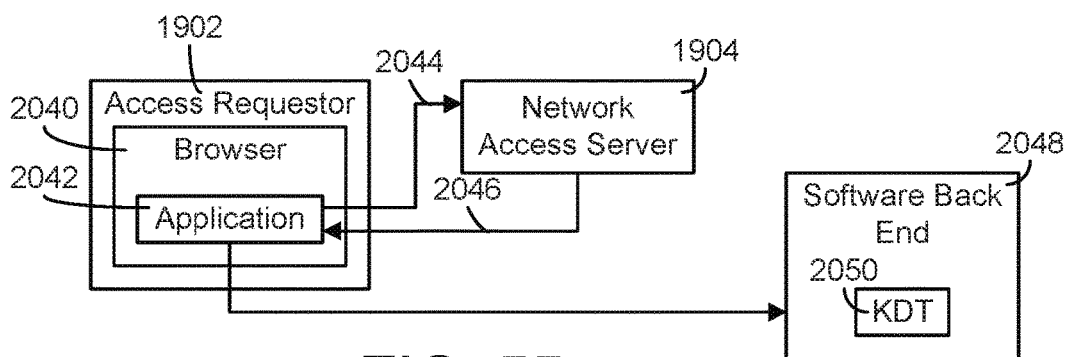
FIG. 55 is a block diagram illustrating a process of establishing an Software as a Service (SaaS) session between nodes in a network.

The provisioning system as described in the present disclosure may be implemented through any type of operating environment. For example, provisioning may be done through an Infrastructure as a Service (IaaS), Platform as a Service (PaaS), or Software as a Service (SaaS) model. In the IaaS model, provisioning may be accomplished through a virtual platform, establishing a connection between a virtual machine and a node. In the PaaS model, provisioning may be accomplished through physical or virtual services such as databases, webpages, etc. (e.g., establishing a connection between a database and a node). In the SaaS model, provisioning may be accomplished through software applications (e.g., establishing a connection between a browser and a node). Referring generally to FIGS. 53-55, provisioning in each type of operating environment (IaaS, PaaS, SaaS) is described in greater detail.

FIG. 53 is a block diagram illustrating a process of establishing a IaaS session between nodes in the network. Access requestor 1902 may establish a secure session with network access server 1904 as described above in order to request (shown as block 2002) the use of a node 1908. Policy server 1906 receives the request (shown as link 2004) and authenticates and authorizes access requestor 1902 to use node 1908 (shown as block 2006). Node 1908 may be a real or a virtual machine.

Network access server 1904 then creates a data table (shown as block 2008) to be used for communication between the terminal client 2014 of access requestor 1902 and the terminal client 2016 of node 1908. The data table is encrypted by network access server 1904 (shown as block 2010) with the node's key distribution table. The data table and the encrypted key are sent (shown as link 2012) to terminal client 2014 of access requestor 1902. Terminal client 2014 opens a connection with terminal client 2016 of node 1908 and forwards the encrypted key. This encrypted key is decoded by the node using the node's key distribution table and used to start the session between access requestor 1902 and node 1908.

FIG. 54 is a block diagram illustrating a process of establishing a PaaS session between nodes in the network. The example of FIG. 54 illustrates establishing a secure connection with a database 2020 as the platform. The platform components are provisioned using, for example, process 1950 of FIG. 52B, through middleware in the platform. In the example of FIG. 54, an interaction between a nodeJS application and a database is shown; it should be appreciated that the systems and methods herein are applicable to other applications and platforms.

When application 2022 needs to establish a secure connection with database 2020, middleware 2024 may intercept the call (shown as link 2026). Middleware 2024 opens a secure connection (shown as link 2028) with a network access server 1904 and passes credentials 2030 (e.g., user credentials, application credentials) to the server. Network access server 1904 verifies the authentication and authorization of the application, and provides a new data table for the application (nodeJS 2022) and a copy of the data table encrypted with the key distribution table for database 2020.

Middleware 2024 keeps the key (data table) received (shown as link 2032) and opens a connection to database 2020 (shown as link 2034) for sending the encrypted key (encrypted data table). The database 2020 stores key distribution table (shown as block 2036) and uses it to decode the data table when provided by application 2022. A secure connection is then established between the application and database (shown as block 2038).

FIG. 55 is a block diagram illustrating a process of establishing a SaaS session between nodes in the network. The embodiment of FIG. 55 shows a browser as the software application used by access requestor 1902 for establishing a connection with a node; in other embodiments any type of software application may be used. When access requestor 1902 uses the application through a browser 2040, an application 2042 is downloaded to the browser. Application 2042 can then run in a secure session (shown as link 2044) with network access server 1904. The secure session may be established via TLS or any other protocol. Application 2042 may be, for example, an AngularJS application.

When access requestor 1902 is authenticated and authorized by network access server 1904 (and policy server 1906), the server provides a new data table and the data table encrypted with the software component key distribution table to browser 2040 (shown as link 2046). Application 2042 opens a connection with the software back end 2048 and provides the encrypted data table to the software back end. Software back end 2048 uses its stored key distribution table (shown as block 2050) to decrypt a data table in order to establish a connection between the application 2042 in browser 2040 and the server component of the application.

Figure 56:
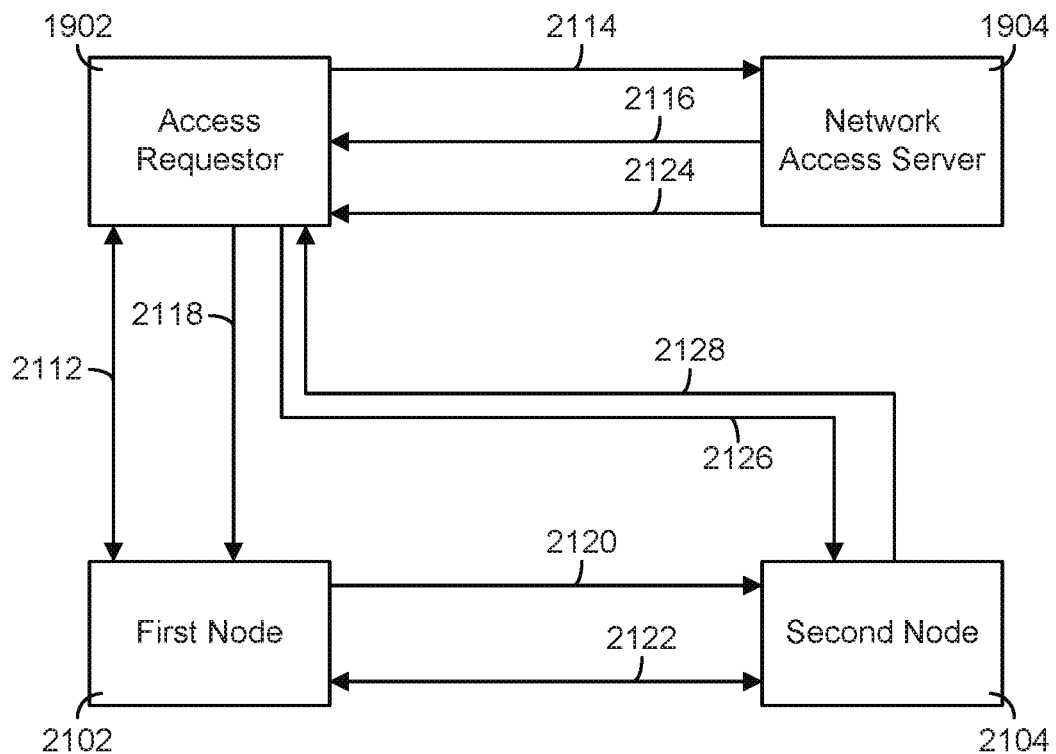
FIG. 56 is a block diagram illustrating how a session is distributed between multiple nodes in a network.

Referring now to FIG. 56, a block diagram illustrating how a session is distributed or migrated between multiple nodes is shown. In the embodiment of FIG. 56 access requestor 1902 is in a session with a first node 2102 (shown as link 2112). When access requestor 1902 requests additional resources (shown as link 2114) to network access server 1904, the server may determine that the session should be moved to a second node 2104 to accommodate the request. Network access server 1904 sends a new session key to access requestor 1902 (shown as link 2116). The new session key includes a data table encrypted with the key distribution table of first node 2102, and a copy of the data table encrypted with the key distribution table of second node 2104.

Access requestor 1902 forwards the data table to first node 2102 (shown as link 2118). First node 2102 decodes the data table using its key distribution table, and recognizes the request to open a session with second node 2104. First node 2102 opens a connection with second node 2104 and passes the data table encrypted with the key distribution table of the second node to the node (shown as link 2120).

The encrypted data table received via link 2120 is decoded at second node 2104, and is used to establish a secure connection with first node 2102 (shown as link 2122). When all the data is moved between the two nodes, network access server 1904 creates a data table and sends the data table plus a copy encrypted with the key distribution table of second node 2104 to access requestor 1902 (shown as link 2124).

Access requestor 1902 then opens a connection with second node 2104 (shown as link 2126) and passes the encrypted data table. Second node 2104 decrypts the data table and uses it to establish a session between the node and access requestor 1902 (shown as link 2128). If the process is a migration process, first node 2102 may then be released from access requestor 1902 as the migration to second node 2104 is complete.

Figure 57:
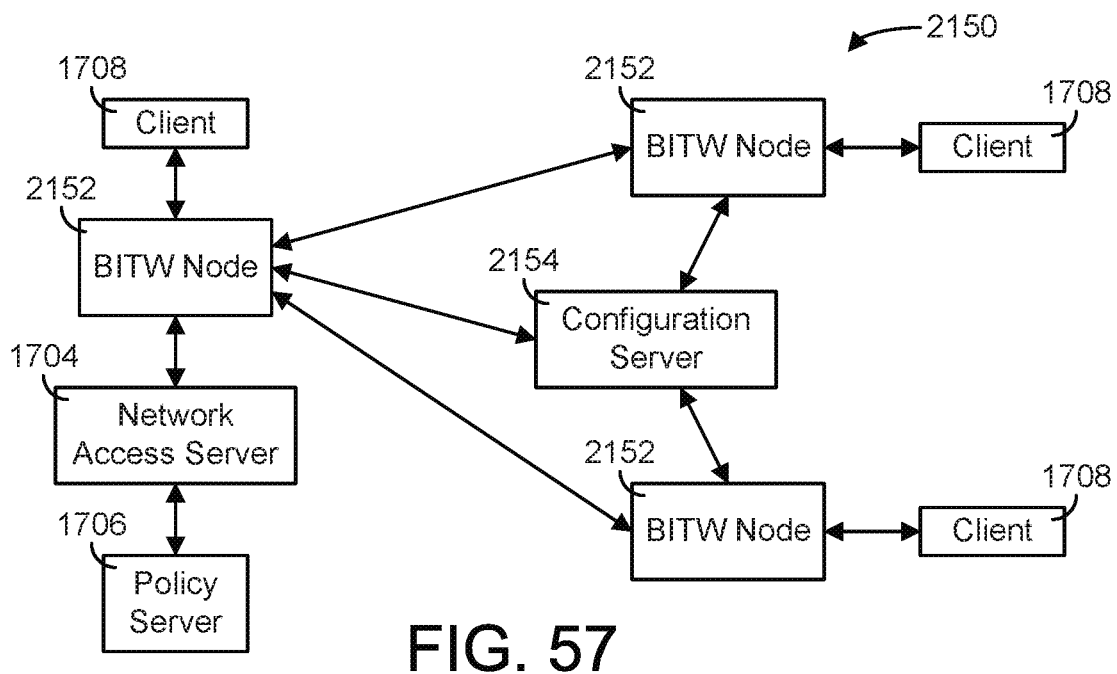
FIG. 57 is a block diagram of a network access control system including a plurality of bump-in-the-wire (BITW) nodes inserted into the network access control system to enhance the communications in the system.

Referring now to FIG. 57, a high level block diagram of a network access control system 2150 is shown. In addition to a network access control system 1704, policy server 1706, and clients (nodes) 1708, a plurality of bump-in-the-wire (BITW) nodes 2152 are shown in the system. BITW nodes are nodes that may be inserted into an existing system to improve the communications (i.e., higher reliability and security of the communications) within the system without changing the nodes at the endpoints of each communication. In other words, BITW nodes relay messages in between the nodes that are to receive messages and the various other components of system 2150. BITW nodes may be provisioned and set up for communications in system 2150 as described below, similarly to the other nodes as described in the present disclosure.

Network access server 1704 may provision BITW nodes 2152 with keys, after receiving authorization from policy server 1706 for the authorization, which is similar to the process of provisioning the regular nodes. BITW nodes 2152 may include two interfaces: a network bound interface, for facilitating communications with other nodes in the network, and a client bound interface for a particular node identified, as described below. Each BITW node 2152 is shown associated with a client 1708 in FIG. 57; it should be understood that any configuration of BITW nodes 2152 and nodes 1708 may be possible, including multiple nodes 1708 associated with each BITW node 2152.

A BITW node 2152 may listen for packages and when a package is received determine a client destination IP from the package. BITW node 2152 may then use the client destination IP to determine the intended recipient of the package. If BITW node 2152 does not know the intended recipient, an access request protocol (ARP) packet may be transmitted to nearby clients (nodes), and BITW node 2152 may then receive a response from a client indicating the client's IP address. If BITW node 2152 does not receive an IP address that matches the client destination IP address from the package, then BITW node 2152 knows that the client destination IP is not in the network. If the IP address is received in response to the ARP, BITW node 2152 may save the associated MAC address for future communications.

As a BITW node 2152 discovers new IP addresses in the network, it may inform a configuration server 2154. Configuration server 2154 may then inform all BITW nodes 2152 in the network, allowing all such nodes to know the IP address of the various clients in the network.

A BITW node 2152 may be configured to detect when another BITW node has been inserted into the network, the BITW node inserted into a path to a destination IP or client 1708. The BITW node 2152 detecting the addition of a new BITW node in the network may initiate a session with the new BITW node. The original BITW node may have a token for authorizing the session, or may request and receive the token from network access server 1704.

Obfuscation and deobfuscation of messages sent to and from a client 1708 may occur at a BITW node in the communication path of the package. For example, packages sent to an end client 1708 may be obfuscated by a corresponding BITW node 2152 sending the message to the client, and packages may be deobfuscated at the destination BITW node.

The provisioning system and method described herein allows for a single policy server to control all authentication and access across all servers in the network. The policy server may be replicated in order to prevent a system-wide failure if the policy server has an issue. A process of establishing a session is tied to a processor(s) at a node through the tables associated with the process and those associated with the processor(s). If the session needs to be expanded to more processors, the tables are used for the expansion. If synchronization between nodes is lost, it can be reinitiated in real time in the same manner as the original setup.

Referring generally to the disclosure, various systems and methods are described for providing obfuscation techniques for communications between nodes. One example environment in which the systems and methods described herein may be in a vehicle. A modern vehicle may include many (e.g., seventy or more) electronic control units (ECUs). Examples of such ECUs may include an engine control unit, a transmission system, an airbag system, an antilock braking system, a cruise control system, an electric power steering system, audio systems, power windows, doors, a mirror adjustment system, a battery or recharging system for a hybrid or electric vehicle, etc. Referring generally to the disclosure, the systems and methods herein may be used to establish secured wireless communications with or among the ECUs in the subsystems. Referring more specifically to FIGS. 58-62 below, the systems and methods of the present disclosure are described with respect to implementation in a vehicle.

It should be understood that the systems and methods herein may also be applied for any environment which includes multiple ECUs and nodes. The embodiments described in FIGS. 58-62 are provided as an example implementation of the systems and methods in a vehicle, but are adaptable to be applied in any other type of networked environment. Such example networks may include a network of connected printers and other computers in a building area, multiple sensors for a monitoring or alarm system, multiple mobile or stationary devices in an area, and the like.

Modern cars may generally have hundreds of sensors with limited capability, each sensor connected to an ECU and capable of communicating with an engine controller (e.g., the main controller of the vehicle, also simply referred to as the controller below). Some ECUs may only be connected to one sensor, and in some embodiments the ECU and sensor are on the same device. In other embodiments, the ECU and sensor may be on different devices, or multiple sensors may connect to a single ECU. Information to be transmitted between the ECUs and engine controller should be authenticated and encrypted. As generally described in the present disclosure, a session between an ECU and the engine controller may be established by first sharing a "key" between the two. The key for a given ECU may generally be a combination of a unique initial data table (whose size is tailored to the data field of each ECU), and unique polynomial indices for the PRNG. Provisioning of the key to each ECU should only happen in a secure environment, such as in a factory setting (or other setting where the vehicle or sensor is being manufactured).

Upon power-up of the vehicle, the engine controller and the ECUs do not need to start with the "secret" to create a key distribution table to create the data table (as described with respect to process 1100 of FIG. 39) because the data table has already been pre-provisioned for each ECU and a copy of each data table for each ECU is kept at the engine controller. Instead, the engine controller sends the same random 32-bit word seed to each ECU (each engine controller is pre-provisioned with a random 32-bit word). The ECU scrambles this seed using the ECU's unique data table and uses the result as a vector with the PRNG polynomial to seed the PRNG. In this way, each ECU's session with the engine controller begins with a unique data table and a unique PRNG sequence. Each ECU keeps the data table in permanent memory and the pre-provisioned polynomial indices in volatile memory. From this point, the secure communication of payloads between an ECU and the engine controller can proceed as generally described in process 1200 of FIG. 41.

In an alternative embodiment, each ECU can be pre-provisioned with its own data table and the secret (the 28 bytes comprising the PRNG polynomial exponents and the PRNG vector, as described in process 1100). The engine controller keeps copies of the data table and secret for each ECU in permanent memory. This embodiment would permit the calculation of the PRNG to occur at the engine controller, which is a far more powerful processor than the ECUs.

Referring generally to FIGS. 58-62, a method to provision each ECU in the vehicle with a key is described. ECUs may be replaced in the vehicle over time. For example, an ECU associated with a tire may be changed when a tire of the vehicle is changed. When an ECU is replaced in the vehicle, the new ECU may be pre-provisioned with a key different from the key in the ECU being replaced and a session may be established between the new ECU and the engine controller. However, new ECUs may not be trusted by the engine controller until an operator (car owner, dealer, etc.) authorizes the new ECU during its installation.

Figure 58:
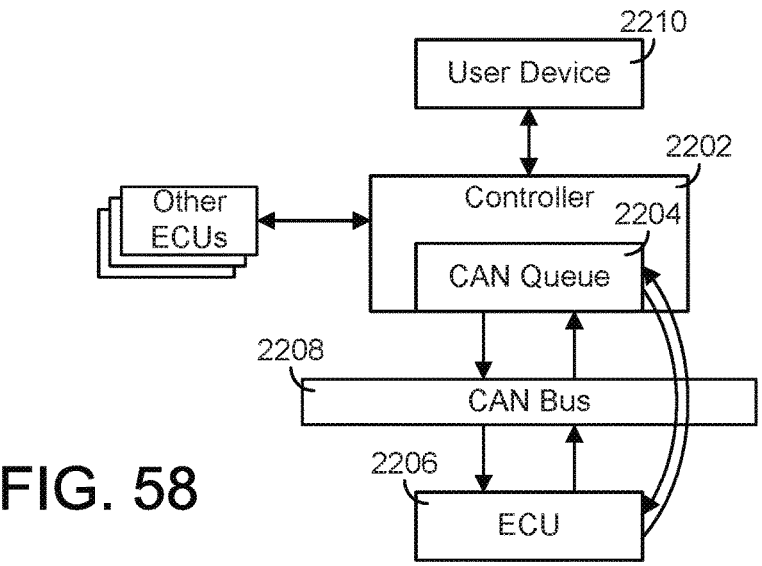
FIG. 58 is a block diagram illustrating a process of communications between an engine controller and an ECU of a vehicle subsystem.

Referring now to FIG. 58, a block diagram illustrating a process of communications between an engine controller and an ECU of a vehicle subsystem is shown. The engine controller 2202 includes a controller area network (CAN) queue 2204 from which messages to and from an ECU 2206 are transmitted. As such, all messages to be transmitted from controller 2202 are queued in CAN queue 2204 and introduced to a CAN bus 2208.

The system of FIG. 58 may support both a simulation mode and an emulation mode. In emulation mode, messages from the controller are provided via CAN queue 2204 to CAN bus 2208, and are then provided from CAN bus 2208 to ECU 2206. To support emulation mode, queue 2204 and CAN bus 2208 are used to send and receive messages from the various ECUs being emulated. Messages are queued and serially introduced to CAN bus 2208 for transmission. CAN queue 2204 is synchronized in its enqueue and dequeue methods. In simulation mode, messages from the controller (CAN queue 2204) are provided directly to ECU 2206, and the ECU answer to the message is provided directly to CAN queue 2204.

Engine controller 2202 is configured to provision the ECUs in the vehicle. To begin provisioning, a user device 2210 may connect with controller 2202 to allow pairing. User device 2210 may be a mobile phone, equipment in a dealer shop, or any other type of device belonging to an authorized user (e.g., dealer) that can provide updates for the vehicle subsystems. User device 2210 and controller 2202 may connect via a OBD-II port or by any other available method. User device 2210 and controller 2202 may be paired in advance of the provisioning method. User device 2210 generally provides the one or more messages including the software update (or other information) intended for one or more ECUs of the vehicle. The communication process between user device 2210 and controller 2202 is described in greater detail in FIGS. 63-65.

When the various ECUs of the vehicle are powered up, each individual ECU 2206 may send a provision request to controller 2202 (via CAN bus 2208). Such a situation may cause a large number of collisions at CAN bus 2208 as the ECUs may submit provisioning requests at the same time. This can cause error messages to be sent frequently, or eventually a "Bus Off" state or other error state of CAN bus 2208 or controller 2202. In a vehicular setting, the generation of such error messages may typically indicate a serious issue with the vehicle; therefore it is desirable to avoid collisions so that more serious error messages can be recognized instead. The provisioning method described herein helps avoid collisions between the various requests generated by the ECUs.

It should be understood that the encryption process described in FIGS. 58-62 may be implementable for any type of IoT application other than a CAN bus. The CAN bus is provided as an example standard for allowing multiple devices to communicate with one another, but devices may be interconnected via any other type of method or protocol.

Figure 59A:
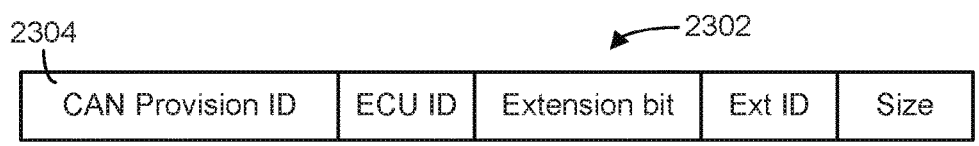
FIG. 59A illustrates a provision message that can be provided by an engine controller to an ECU of a vehicle subsystem.

Referring also to FIGS. 59A-D, the provisioning process is shown in greater detail. Each individual ECU 2206 begins by transmitting normally if it has not been provisioned. As part of its normal transmission ECU 2206 may include its ID. When controller 2202 receives the transmission from each ECU 2206, it can check to see if each ECU 2206 can be provisioned. To do so, controller 2202 transmits a CAN provision message 2302 as shown in FIG. 59A. Message 2302 includes a CAN provision ID 2304, which is a predefined message ID that is recognizable by ECU 2206 as a provisioning check. The payload of message 2302 is shown to include the ID of ECU 2206, an extension bit, and optionally the eighteen bits of the extension address followed by the four bit ECU payload.

Figure 59B:
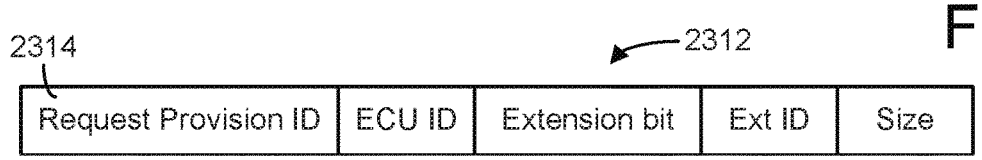
FIG. 59B illustrates a provision message of an ECU that can be generated after receiving the provision message of FIG. 59A.

When ECU 2206 receives message 2302, if ECU 2206 can be provisioned and the ECU ID in message 2302 matches its own ID, ECU 2206 can then request provisioning. Referring to FIG. 59B, an ECU provision message 2312 is shown. Message 2312 includes a request provision ID 2314, which is a predefined message ID that is recognizable by controller 2202 as a provision request. Message 2312 may further generally include a payload similar to the payload described with respect to message 2302.

When controller 2202 receives message 2312 from ECU 2206, it should verify that the controller and ECU are in a secure environment. If controller 2202 cannot verify a secure environment, controller 2202 may request that a user (via user device 2210) confirm that it is acceptable to provision ECU 2206 and may continue with the provisioning process upon receiving confirmation. In one embodiment, controller 2202 may wait for a user input indicating that the environment is secure, and may save the request so that it can be processed once controller 2202 is able to confirm that the environment is secure.

Figure 59C:
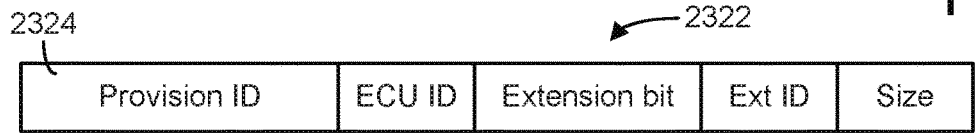
FIG. 59C illustrates a message of the engine controller that can be generated after receiving the provision message of FIG. 59B.
Figure 59D:
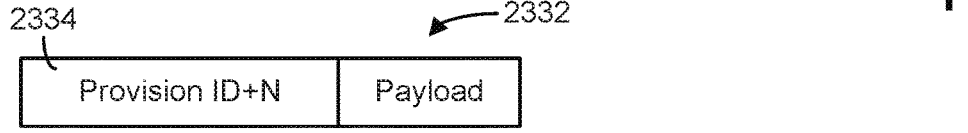
FIG. 59D illustrates a message of the engine controller generated after the provisioning process of FIGS. 59A-C.

Once the environment is secure, controller 2202 may respond with a message 2322 as shown in FIG. 59C. Message 2322 includes a provision ID 2324, which is a predefined message ID. Message 2322 may further generally include a payload similar to those described with respect to messages 2302, 2312. After message 2322 is sent, further messages such as message 2332 as shown in FIG. 59D may be transmitted by controller 2202. Message 2332 includes a portion of the key to be sent to ECU 2206 (indicated in FIG. 59D as "provision ID+N", indicating that the Nth block of the key is being sent in the message). The key sent by controller 2202 over multiple messages 2332 includes the table and the PRNG vector to be used in the obfuscation process as generally described in the present disclosure.

In one embodiment, controller 2202 may group keys based on the size of the messages received from the various ECUs. For example, all ECUs that broadcast a frame with the same size may be provided the same key by controller 2202 for encoding messages.

After ECU 2206 is provisioned and ready for transmissions with controller 2202, when an ECU 2206 is initialized (e.g., when the vehicle starts), controller 2202 broadcasts a random 32-bit message to all ECUs in the vehicle. Each ECU 2206 then scrambles the 32-bit message using the data table portion of the secret in the ECU, and the resulting value is used as the initial vector for the PRNG, as described above.

Figure 60:
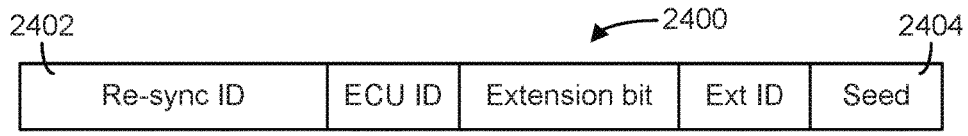
FIG. 60 illustrates a resynchronization message that can be generated by the engine controller for resynchronization with the ECU.

Referring now to FIG. 60, the obfuscation activities (encoding and decoding) of the ECU and controller are described in greater detail. In general, depending on the level of security required in the environment, the algorithm used for encryption and decryption may be a low level or high level encryption/decryption algorithm, as described below.

In the low level encryption method, the data to be transmitted from ECU 2206 to controller 2202 is XORed with the PRNG and then scrambled, as generally described in the present disclosure. The table is then chained based on the value of the PRNG used to XOR the data. The table chaining is described in greater detail in FIG. 61. For decoding at the engine controller, the encrypted message is unscrambled and the data is XORed with the PRNG. The table is then chained with the value of the PRNG used to XOR the data. If the chaining fails, a next PRNG value can then be used. The next PRNG value is XORed with the data and used in the table chaining. This process may continue until a PRNG is found that causes a successful chaining of the table.

If the overall process fails (i.e., no PRNG values cause a successful chaining of the table), a resynchronization message may be sent by controller 2202 to ECU 2206. The resynchronization message may have a format as shown in FIG. 60. Resynchronization message 2400 includes a resynchronization ID 2402, which is a predefined message ID. Resynchronization message 2400 further includes a seed 2404, which is a random number that is used to scramble the table and used to seed the PRNG in a subsequent encryption/decryption process. The seed may be of any size (e.g., from 32 to 64 bits). Resynchronization message 2400 may further include the ECU ID, and other fields as generally required for transmission.

In the high level encryption method, for a first time that ECU 2206 will transmit data to controller 2202, ECU 2206 may XOR the data with the PRNG, scramble the data, and chain the data as described above. However, for subsequent iterations (i.e., for further transmissions), the data to be transmitted is XORed with the previous XORed data (the pre-scrambled XORed data) instead of with a value from the PRNG. XORing the data with the previous XORed data increases the obfuscation level of the data. Controller 2202 may then proceed with decoding of the message as described above.

Figure 61:
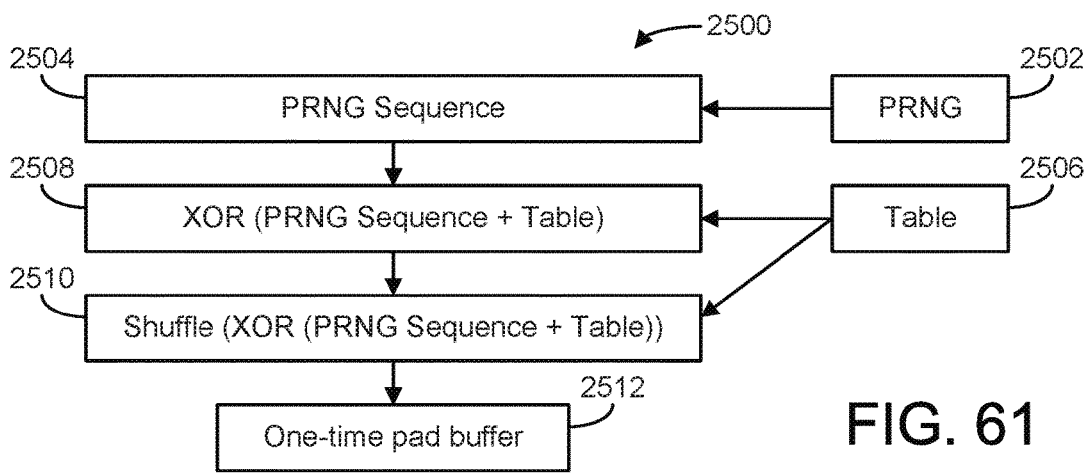
FIG. 61 illustrates a table chaining method for preparing a message for transmission.

As described above in FIG. 60, ECU 2206 obfuscates the data to be sent to controller 2202. ECU 2206 may generally be configured to transmit very small amount of data, as ECU 2206 is typically transmitting data from a single sensor in the vehicle. In some embodiments, ECU 2206 may be able to encrypt and transmit the data serially as the data is being received from the sensors, instead of waiting to fill an entire packet with data and then transmit the packet. In other words, ECU 2206 encodes the data to be transmitted one bit at a time, or one segment at a time, instead of all at once. Referring generally to FIG. 61, a table-based serial encryption process of ECU 2206 is described in greater detail that encodes the data one byte (or one segment) at a time.

For the serial encryption process, a one-time pad buffer is prepared by ECU 2206. The buffer may be of any size. In some embodiments, the buffer may be between 160 and 256 bytes. When ECU 2206 receives a first incoming byte from the sensor, the byte is XORed with the first byte of the buffer. The next byte received is XORed with the second byte of the buffer, and so forth. When the last byte of the one-time pad buffer is used, the table stored by ECU 2206 is modified and a new one-time pad buffer is prepared for further data. In various embodiments, the serial process of FIG. 61 may be adapted to allow for XORing any size packet at a time from 1 bit to any number of bytes and the choice may be made based on resource constraints and efficiency considerations.

One example of modifying the table after the last byte of the buffer is used is now described. The first seventeen bytes of the decoded data in the table is XORed with the first seventeen bytes of the PRNG sequence generated by ECU 2206. The next seventeen entries pointed to by the table chain pointer are then exchanged with the values in the XORed data. In other words, the XORed data in the first seventeen bytes of the table is exchanged with data in the table whose location is identified by the next seventeen bytes of the table. In various embodiments, modifying the table may include the XORing of any number of bytes of the table and exchanging any number of bytes within the table.

Referring to FIG. 61, a flow chart of a process 2500 for preparing the one-time pad buffer of FIG. 60 is shown. Process 2500 includes filling the buffer with the PRNG sequence 2504 generated by PRNG 2502. The PRNG sequence 2504 is XORed with the data in the table 2506 (block 2508). The resulting XORed data is shuffled with the table values (block 2510), and the resulting values are used in the one-time pad buffer 2512. In various embodiments, the PRNG sequence may be encoded with any type of cipher or algorithm (e.g., AES 256, AES 128, etc.).

For decryption, a one-time buffer can be prepared using the same table, the same PRNG values (e.g., the same PRNG polynomial), and the same location in the PRNG, resulting in the same values in the one-time buffer that were used in the encryption. An incoming byte is XORed with the next unused byte of the buffer, and when the last byte of the buffer is used, the table is modified and used to create a new buffer as described above.

Figure 62A:
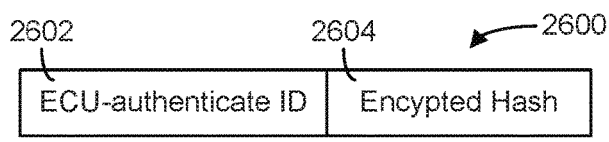
FIG. 62A illustrates a message that an engine controller can create and send for authentication of an ECU.
Figure 62B:
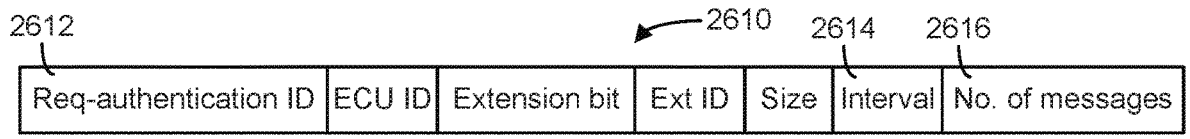
FIG. 62B illustrates a message that an engine controller can create and send for authentication of an ECU.

Referring generally to FIGS. 62A-B, authentication of the message sent by the ECU to the controller is described in greater detail. In one embodiment, authentication of a message by controller 2202 may be accomplished using in-line authentication using the CRC code of the message. This code can typically have its own field to be inserted into the payload of the message. However, if the payload of the message does not include the CRC, or when the payload is too small to provide enough entropy (i.e., i.e., the message has low entropy because of its size, so that the CRC cannot be added to the payload reliably), then message authentication may be accomplished by encoding the payload from previous messages received by the controller from the ECU, as described below.

Messages can be authenticated by encoding the payload from a previous number of messages. For example, for a previous number of messages N from an ECU 2206, a circular buffer of payload size N may be used by controller 2202 to keep the last N payloads sent by ECU 2206 and acknowledged. To authenticate the new message, a 64 bit hash is computed from the circular queue, and the hash is encrypted and sent in a message 2600 as shown in FIG. 62A. Message 2600 includes an ID 2602 which is a predefined ID used to authenticate ECU 2206, and the encrypted hash 2604. Controller 2202 verifies the hash number to verify the authentication.

Controller 2202 can drive how often authentication of a message from ECU 2206 is required. For example, controller 2202 can send a message 2610 as shown in FIG. 62B. Message 2610 includes a re-authentication ID 2612 which is a predefined message ID used to ask ECU 2206 for authentication. Message 2610 further includes an interval field 2614 which specifies the rate at which ECU 2206 should authenticate itself. For example, if the interval was one hundred, then ECU 2206 should authenticate every one hundred messages. If the interval is zero, ECU 2206 should authenticate immediately. Message 2610 further includes a field 2616 that determines the size of the circular queue used for authentication (e.g., for determining how many previous messages to use in the authentication process).

Figure 64:
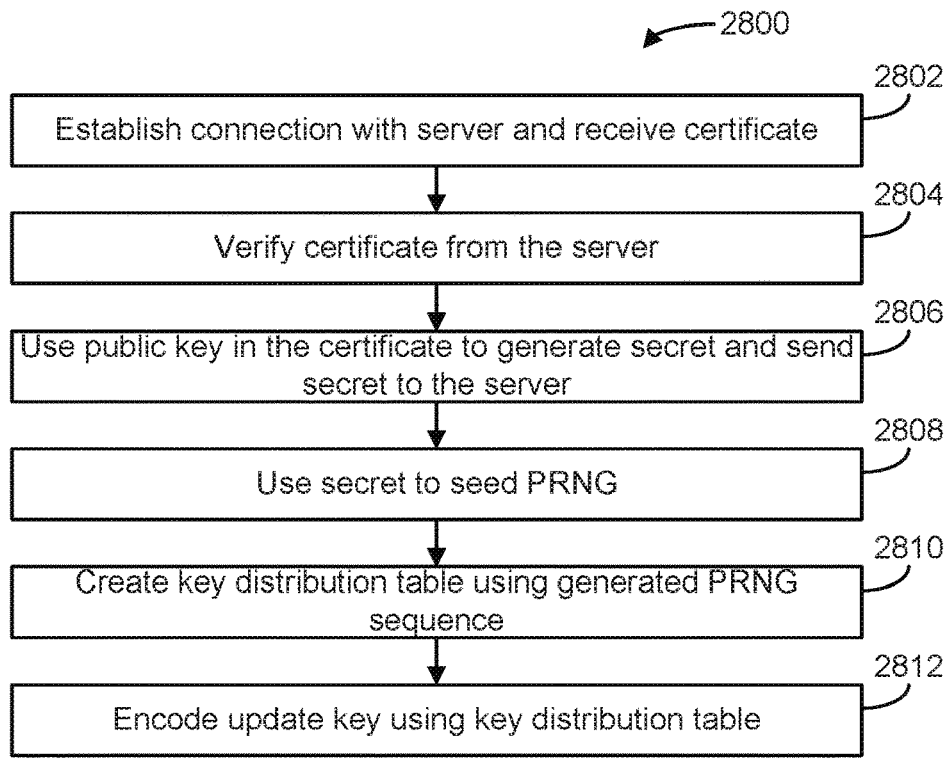
FIG. 64 is a process of secure transmission between a user device and an engine controller.
Figure 65:
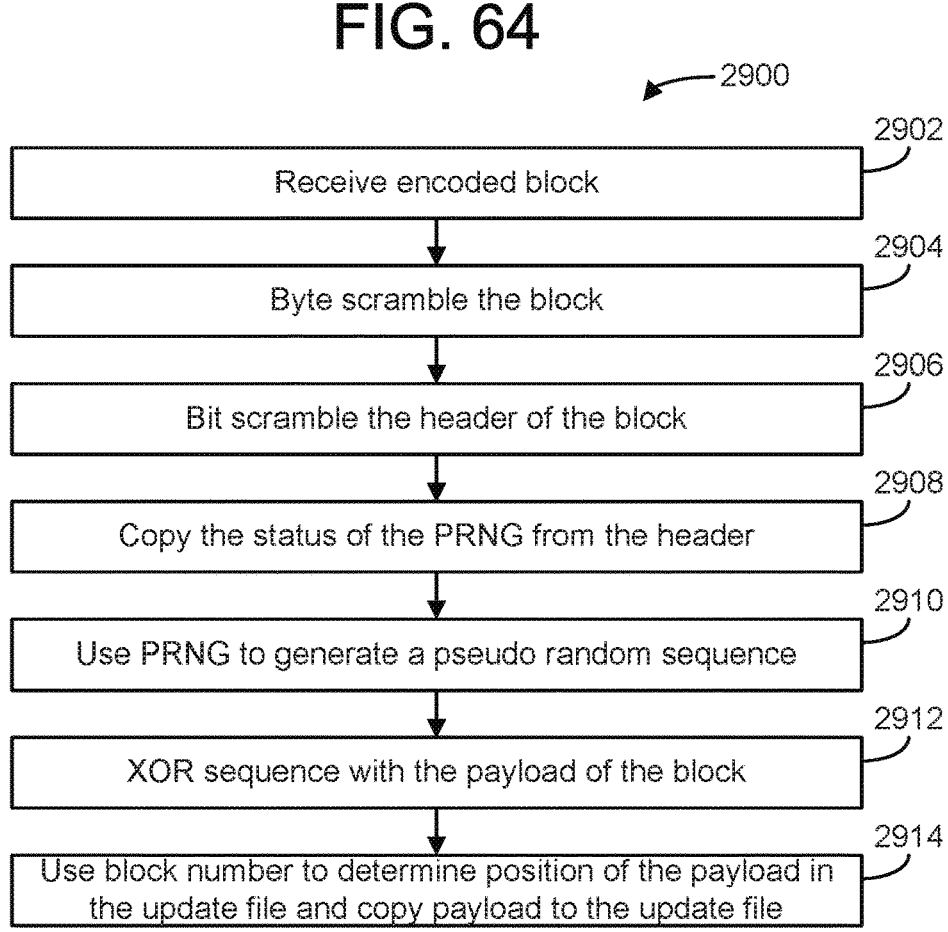
FIG. 65 is a process of decoding and assembling a file transmitted by the user device to the engine controller.

The systems and methods of FIGS. 58-62 may be used to, for example, provide software updates to various ECUs 2206 of a vehicle as well as engine controller 2202 itself. Referring also to FIGS. 63-65, systems and methods for providing information (such as software updates) from a system server to engine controller 2202 is shown in greater detail. The systems and methods of FIGS. 63-65 allow for securing the integrity and confidentiality of the files transmitted to controller 2202 from the server. The files may be transmitted via any type of connectivity method (e.g., WiFi, cellular, FM band, etc.), and may be adaptable for different connectivity conditions, for partial and fragmented updates, and for the retransmission of some or all blocks in the file. In various embodiments, engine controller 2202 may receive files directly from the system server, or may receive files from an intermediary user device configured to relay the files to the engine controller.

Figure 63A:
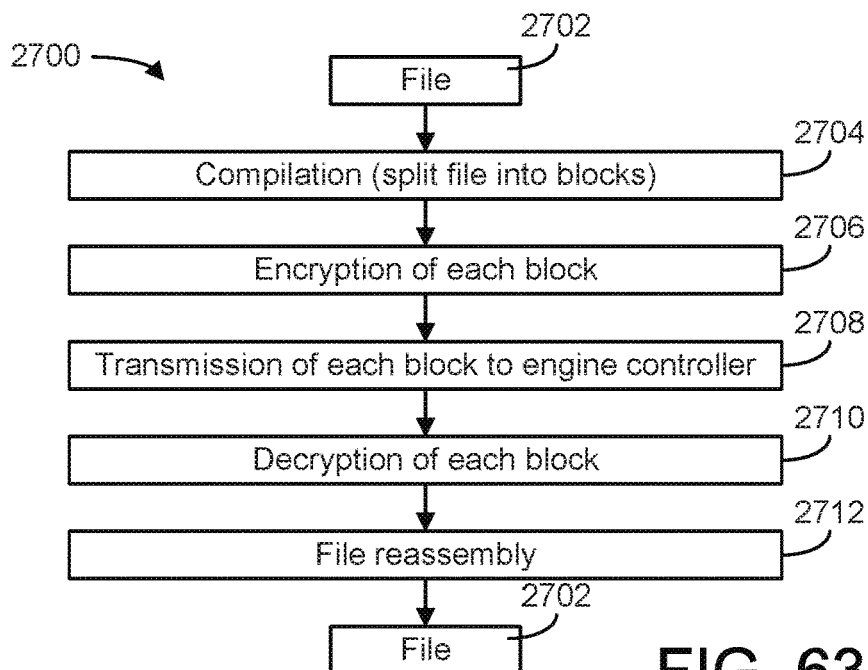
FIG. 63A is a process for compiling a file and distributing the file from a user device to an engine controller.

Referring to FIG. 63A, a process 2700 for compiling a file and distributing the file from a server to engine controller 2202 is shown. File 2702, at compilation block 2704, is split into multiple blocks. Each block is then independently encrypted (block 2706) and then transmitted to engine controller 2202 (block 2708). By independently transmitting each block, any missing blocks as a result of a transmission failure or interruption can be retransmitted. Engine controller 2202 decodes each block (block 2710) and reassembles file 2702 (block 2712).

Figure 63B:
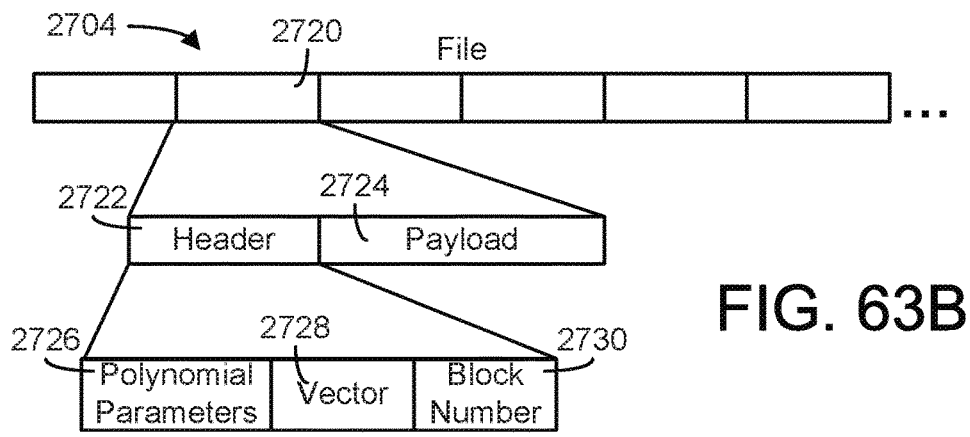
FIG. 63B illustrates a process for compiling the file of FIG. 63A.

The compilation process (block 2704) is shown in greater detail in FIG. 63B. File 2702 is shown split into multiple blocks 2720. Each block 2720 includes a header 2722 and a payload 2724. Each header 2722 may include polynomial parameters 2726, a vector 2728 representing its position in the pseudo random sequence, and its block number 2730. Polynomial parameters 2726 are used by the controller for generating a PRNG as generally described in the present disclosure. Block number 2730 identifies the position of block 2720 relative to other blocks in file 2702. Payload 2724 may generally include the file data, with the payload of the first block instead containing metadata for the update file, such as the number of blocks in the file and the block size for each block.

Figure 63C:
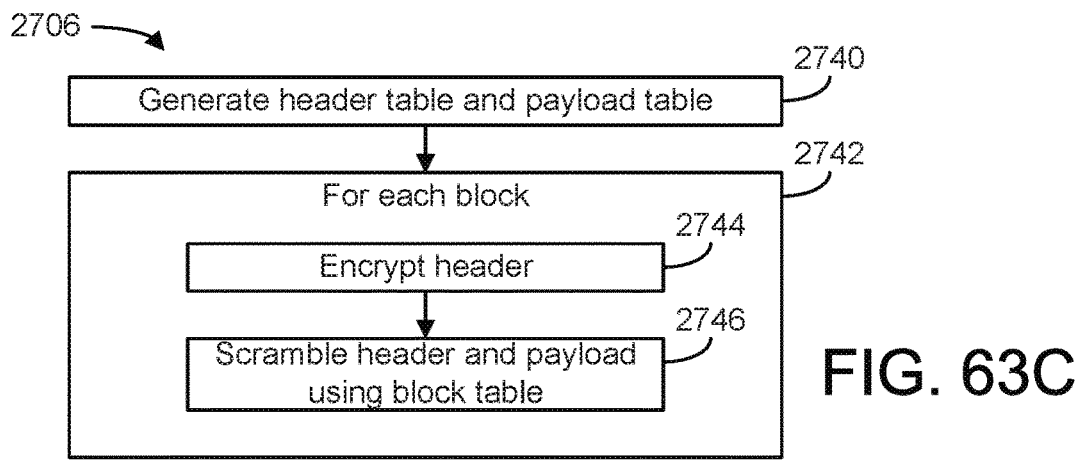
FIG. 63C illustrates a process for encrypting each block of the file of FIG. 63A.
Figure 63D:
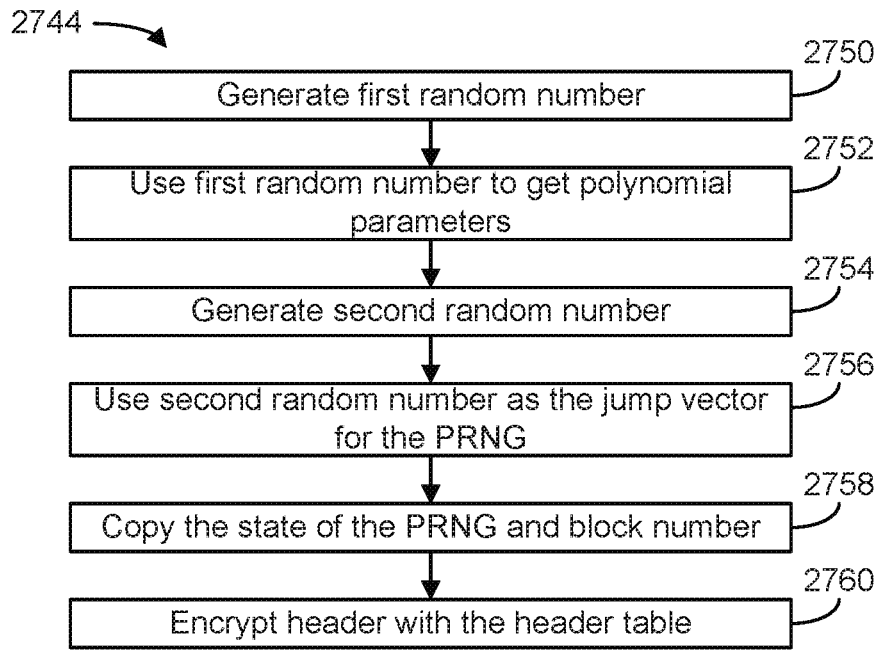
FIG. 63D illustrates the process of encrypting the header of each block of the file of FIG. 63A.

The encryption process (block 2706) is shown in greater detail in FIG. 63C. First, a header table and a payload table are generated (block 2740). For each block (block 2742), the header is encrypted (block 2744) and the header and payload are scrambled using the block table (block 2746). Referring also to FIG. 63D, block 2744 for header encryption is shown in greater detail.

Header encryption 2744 includes generating a random number (block 2750). In one embodiment, the number may be between 0 and $2^{32}$ (accommodating for a 32-bit random number). The random number is then used as the parameter to generate the polynomial parameter (block 2752). A second random number is generated (block 2754) and is used as the jump vector for the PRNG (block 2756), as described in process 1100 above. The number may be, for example, between 0 and $2^{127}-1$ (accommodating for the size of the payload). The state of the PRNG and the block number are copied (block 2758), and the header is encrypted (bit-scrambled) with the header table (block 2760), creating the encrypted header for the transmission.

Figure 63E:
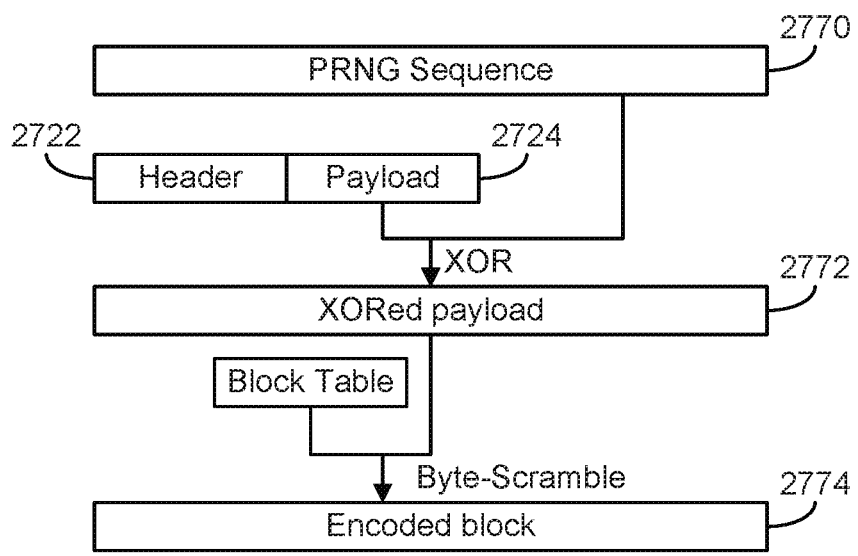
FIG. 63E illustrates the step of scrambling the header and payload of a block of the file of FIG. 63A.

Referring to FIG. 63E, the step of scrambling the header and payload of a block is shown. The scrambling step may correspond with block 2706 of FIG. 63A above. The PRNG generates a sequence 2770 of pseudo random numbers, as generally described in the present disclosure. Sequence 2770 is XORed with payload 2724 to create XORed payload 2772. XORed payload 2772 is then byte-scrambled with the block table to create the encoded block 2774 to be transmitted to the engine controller.

Referring now to FIG. 64, a transmission process 2800 between a server (or user device 2210) and engine controller 2202 is shown in greater detail. More particularly, process 2800 of FIG. 64 describes how to provision the car (i.e., providing file updates) using the public and private key encryption techniques generally described in the present disclosure. The communication between server or user device 2210 and engine controller 2202 may occur in designated area which is typically not a safe environment for communication (i.e., the server or user device 2210 and engine controller 2202 may only establish a connection in an area such as a dealer or manufacturer, or at a designated garage area, or the like). Engine controller 2202 may enable a safe environment mode in which individual sensor or ECU information cannot be read by any device in the area, by securing the communication link as described below. Process 2800 may include using special equipment at a dealer, manufacturer, or garage that is specifically configured to establish a secure connection between a server or user device 2210 and engine controller 2202.

Process 2800 includes the vehicle establishing a connection with a server (or user device 2210) and receiving a 509.x certificate (block 2802). In some embodiments, the server may generate or receive the update file (or other file) to be uploaded to the engine controller; in other embodiments the engine controller may directly connect to the user device and receive the update file from the user device. Process 2800 further includes verifying the 509.x certificate (block 2804). The 509.x certificate is an example certificate that can be received by the engine controller for the purposes of validating secure communications with the server.

Process 2800 further includes using the public key in the 509.x certificate to generate a secret and send a secret to the server (block 2806). The secret is also used to seed the PRNG of the engine controller (block 2808). The resulting PRNG sequence is used to create a KDT (block 2810), and the KDT is used to encode the update key (block 2812), the key including the header table and payload table.

In alternative embodiments, other methods may be used to establish communications with the server and to send the update key. For example, a session with the server can be established using Diffie-Hellman, New-Hope or Frodo secret exchange protocols, and then other protocols can be used by the engine controller to identify the server, such as via a password, public-private key, or by any other protocol used to create signatures.

Referring now to FIG. 65, a process 2900 of decoding and assembling an update file at the engine controller is shown. Process 2900 may be executed by engine controller 2202 after completing reception of each block of an update file (or other file) from the server or user device. Process 2900 describes the decoding of a single block received by the engine controller, and inserting the payload from the single block into an update file. The update file may consist of multiple blocks.

Process 2900 includes receiving an encoded block (block 2902) and byte scrambling the block (block 2904). The header of the block is bit scrambled with the header table stored by the engine controller (block 2906). The status of the PRNG is copied from the header (block 2908), and the PRNG is used to generate a pseudo random sequence (block 2910). The sequence is then XORed with the payload (block 2912). The block number from the header is used to calculate the offset for the payload in the block (i.e., to determine the correct position for each payload from each block relative to the other payloads) and copies the payload to the final assembled file (block 2914).

The order or sequence of any process or method steps may be varied or re-sequenced according to alternative embodiments. Other substitutions, modifications, changes and omissions may also be made in the design, operating conditions, and arrangement of the various exemplary embodiments without departing from the scope of the present invention.

The construction and arrangement of the elements as shown in the exemplary embodiments are illustrative only. Although embodiments of the present disclosure have been described in detail, those skilled in the art who review this disclosure will readily appreciate that many modifications are possible (e.g., variations in sizes, dimensions, structures, and proportions of the various elements, values of parameters, use of materials, orientations, etc.) without materially departing from the novel teachings and advantages of the subject matter recited. For example, elements shown as integrally formed may be constructed of multiple parts or elements. Some like components have been described in the present disclosure using the same reference numerals in different figures. This should not be construed as an implication that these components are identical in all embodiments; various modifications may be made in various different embodiments.

What is claimed is:

1. A communications device comprising: a communications interface;
a processor; and
a non-transient computer-readable memory medium operatively coupled to the processor, wherein the memory medium is configured to store instructions configured to cause the processor to:
retrieve a seed value;
receive a digital bit stream;
generate a stream of random bits, using the seed value as a seed to a pseudo random number generator (PRNG), wherein the stream of random bits contains at least as many bits as the digital bit stream;
shuffle bits of the stream of random bits to create a random bit buffer;
generate an obfuscated digital bit stream by applying a first exclusive OR (XOR) to the digital bit stream and the random bit buffer, wherein the obfuscated digital bit stream has the same number of bits as the digital bit stream;
receive a second digital bit stream;
generate a second obfuscated digital bit stream by performing a second XOR with the second digital bit stream and the random bit buffer, wherein only bits of the random bit buffer not used in the first XOR are used in the second XOR;
provide the second obfuscated digital bit stream to the communications interface if the second obfuscated digital bit stream has the same number of bits as the second digital bit stream; and
provide the obfuscated digital bit stream to the communications interface.

2. The communications device of claim 1, wherein the stream of random bits consists of a power of two number of bytes.

3. The communications device of claim 1, wherein the instructions are further configured to cause the processor to shuffle the bits of the stream of random bits such that the processor:
initializes the random bit buffer;
transverses the bits in the stream of random bits and for each bit that is set, calculates a destination bit location; and
flips the bit in the random bit buffer at the destination bit location.

4. The communications device of claim 3, wherein the instructions are further configured to cause the processor to initialize the random bit buffer such that the processor sets all of the bits of the random bit buffer to be the same value.

5. The communications device of claim 3, wherein the instructions are further configured to cause the processor to initialize the random bit buffer such that the processor sets all of the bits of the random bit buffer to be 0.

6. The communications device of claim 3, wherein the instructions are configured to cause the processor to calculate the destination bit location using a table lookup.

7. The communications device of claim 1, wherein the instructions are further configured to cause the processor to:
generate a second stream of random bits from the PRNG when the second XOR reaches the end of the random bit buffer but not all bits of the second digital bit stream have been XORed;
shuffle bits of the second stream of random bits to refill the random bit buffer; and
continue to generate the second obfuscated digital bit stream by applying a third XOR to the second digital bit stream and the random bit buffer, wherein first bits of the third XOR are the first bit of the random bit buffer and the bit after the last bit of the second digital bit stream used in the second XOR.

8. The communications device of claim 7, wherein the instructions are further configured to cause the processor to:
shuffle the bits of the stream of random bits using a lookup table to identify which bits to swap;
generate a shuffled lookup table by swapping a plurality of values in the lookup table based on a plurality of bits in the stream of random bits; and
shuffle the bits of the second stream of random bits using the shuffled lookup table to identify which bits to swap.

9. The communications device of claim 8, wherein the instructions are further configured to cause the processor to generate the shuffled lookup table by causing the processor to swap a prime number of values in the lookup table.

10. A computer-implemented method for obfuscating data comprising:
   retrieving a seed value;
   receiving a digital bit stream;
   generating a stream of random bits, using the seed value as a seed to a pseudo random number generator (PRNG), wherein the stream of random bits contains at least as many bits as the digital bit stream;
   shuffling bits of the stream of random bits to create a random bit buffer;
   receiving a second digital bit stream;
   generating a second obfuscated digital bit stream by performing a second XOR with the second digital bit stream and the random bit buffer, wherein only bits of the random bit buffer not used in the first XOR are used in the second XOR; and
   generating an obfuscated digital bit stream by applying a first exclusive OR (XOR) to the digital bit stream and the random bit buffer, wherein the obfuscated digital bit stream has the same number of bits as the digital bit stream.

11. The computer-implemented method of claim 10, further comprising:
   initializing the random bit buffer;
   traversing the bits in the stream of random bits and for each bit that is set, calculating a destination bit location; and
   flipping the bit in the random bit buffer at the destination bit location.

12. The computer-implemented method of claim 11, wherein initializing the random bit buffer sets all of the bits of the random bit buffer to be the same value.

13. The computer-implemented method of claim 11, wherein calculating the destination bit comprises using a table lookup.

14. The computer-implemented method of claim 10, further comprising:
   generating a second stream of random bits from the PRNG when the second XOR reaches the end of the random bit buffer but not all bits of the second digital bit stream have been XORed;
   shuffling bits of the second stream of random bits to refill the random bit buffer; and
   continuing to generate the second obfuscated digital bit stream by applying a third XOR to the second digital bit stream and the random bit buffer, wherein first bits of the third XOR are the first bit of the random bit buffer and the bit after the last bit of the second digital bit stream used in the second XOR.

15. The computer-implemented method of claim 14, further comprising:
   shuffling the bits of the stream of random bits using a lookup table to identify which bits to swap;
   generating a shuffled lookup table by swapping a plurality of values in the lookup table based on a plurality of bits in the stream of random bits; and
   shuffling the bits of the second stream of random bits using the shuffled lookup table to identify which bits to swap.

16. A non-transient computer-readable memory medium configured to store instructions thereon that when loaded by a processor cause the processor to:
   retrieve a seed value;
   receive a digital bit stream;
   generate a stream of random bits, using the seed value as a seed to a pseudo random number generator (PRNG), wherein the stream of random bits contains at least as many bits as the digital bit stream;
   shuffle bits of the stream of random bits to create a random bit buffer;
   generate an obfuscated digital bit stream by applying a first exclusive OR (XOR) to the digital bit stream and the random bit buffer, wherein the obfuscated digital bit stream has the same number of bits as the digital bit stream;
   receive a second digital bit stream;
   generate a second obfuscated digital bit stream by performing a second XOR with the second digital bit stream and the random bit buffer, wherein only bits of the random bit buffer not used in the first XOR are used in the second XOR;
   generate a second stream of random bits from the PRNG if the second XOR reaches the end of the random bit buffer but not all bits of the second digital bit stream have been XORed;
   shuffle bits of the second stream of random bits, if generated, to refill the random bit buffer; and
   continue to generate the second obfuscated digital bit stream, if a second stream of random bits has been generated, by applying a third XOR to the second digital bit stream and the random bit buffer, wherein first bits of the third XOR are the first bit of the random bit buffer and the bit after the last bit of the second digital bit stream used in the second XOR; and
   provide the second obfuscated digital bit stream to the communications interface if the second obfuscated digital bit stream has the same number of bits as the second digital bit stream; and
   provide the obfuscated digital bit stream to a communications interface.

17. The non-transient computer-readable memory medium of claim 16, wherein the instructions stored thereon further cause the processor to:
   shuffle the bits of the stream of random bits using a lookup table to identify which bits to swap;
   generate a shuffled lookup table by swapping a plurality of values in the lookup table based on a plurality of bits in the stream of random bits; and
   shuffle the bits of the second stream of random bits using the shuffled lookup table to identify which bits to swap.

* * * * *